(12) United States Patent
Paiz

(10) Patent No.: US 10,959,090 B1
(45) Date of Patent: Mar. 23, 2021

(54) PERSONAL SEARCH RESULTS

(71) Applicant: Richard Paiz, N. Miami Beach, FL (US)

(72) Inventor: Richard Paiz, N. Miami Beach, FL (US)

( * ) Notice: Subject to any disclaimer, the term of this patent is extended or adjusted under 35 U.S.C. 154(b) by 579 days.

(21) Appl. No.: 15/246,446

(22) Filed: Aug. 24, 2016

Related U.S. Application Data

(60) Division of application No. 15/175,861, filed on Jun. 7, 2016, which is a division of application No. 14/682,052, filed on Apr. 8, 2015, which is a division of application No. 14/623,559, filed on Feb. 17, 2015, which is a division of application No. 14/582,236, filed on Dec. 24, 2014, which is a division of application No. 14/578,439, filed on Dec. 21, 2014, now abandoned, which is a division of application No. 14/474,268, filed on Sep. 1, 2014, now (Continued)

(51) Int. Cl.
| | |
|---|---|
| *H04W 12/04* | (2021.01) |
| *H04L 29/06* | (2006.01) |
| *H04W 12/08* | (2021.01) |
| *G06F 16/9535* | (2019.01) |

(52) U.S. Cl.
CPC ........ *H04W 12/04* (2013.01); *G06F 16/9535* (2019.01); *H04L 63/04* (2013.01); *H04L 63/062* (2013.01); *H04W 12/08* (2013.01)

(58) Field of Classification Search
USPC .......................................................... 726/2
See application file for complete search history.

(56) References Cited

U.S. PATENT DOCUMENTS

| | | |
|---|---|---|
| 5,025,369 A | 6/1991 | Schwartz |
| 5,063,506 A | 11/1991 | Brockweil et al. |

(Continued)

FOREIGN PATENT DOCUMENTS

EP 0448800 A1 10/1991

OTHER PUBLICATIONS

Robertson, et al. "Cone Trees: Animated Visualization of Hierarchical Information", 1991.

(Continued)

*Primary Examiner* — Anthony D Brown
(74) *Attorney, Agent, or Firm* — Jonathan Torchman; Torchman IP LLC

(57) ABSTRACT

The search engine optimizer transforms input information interactively and works independently and in parallel with a browser and search engine supercomputer. The optimizer reorganizes the input, and provides an optimized version as an output. The output (Optimized, reorganized input) is sent to the search engine, which responds to the end user with search results. The optimizer recognizes each request as a pattern and stores the pattern in an advanced Glyph format. This permits the optimizer to use left brain English language and right brain geospatial key featured association equation to gain factor the best results, and then using deductive reasoning feedback equation attenuate content with confounding variables in order to stabilize and reduces sensitivity parameter variations due to the environment and identify a left and right side human brain checkmate combination required to achieve certitude.

20 Claims, 40 Drawing Sheets

Related U.S. Application Data abandoned, which is a division of application No. 14/028,508, filed on Sep. 16, 2013, now Pat. No. 9,355,352, which is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 12/778,228, filed on May 12, 2010, now Pat. No. 8,239,229, which is a continuation-in-part of application No. 11/584,941, filed on Oct. 23, 2006, now Pat. No. 7,809,659, and a continuation-in-part of application No. 12/146,420, filed on Jun. 25, 2008, now Pat. No. 7,908,263, and a continuation-in-part of application No. 11/584,271, filed on Oct. 20, 2006, now abandoned, which is a continuation-in-part of application No. 10/926,446, filed on Aug. 25, 2004, now Pat. No. 7,050,813, said application No. 12/778,228 is a continuation-in-part of application No. 12/764,934, filed on Apr. 21, 2010, now Pat. No. 8,676,667, which is a continuation-in-part of application No. 11/223,226, filed on Sep. 9, 2005, said application No. 12/778,228 is a continuation-in-part of application No. 12/764,934, which is a continuation-in-part of application No. 11/085,678, filed on Mar. 21, 2005.

(56) References Cited

U.S. PATENT DOCUMENTS

| | | |
|---|---|---|
| 5,585,839 A | 12/1996 | Ishida et al. |
| 5,671,363 A | 9/1997 | Cristofich et al. |
| 5,706,497 A | 1/1998 | Takahashi et al. |
| 5,762,552 A | 6/1998 | Vuong et al. |
| 5,790,935 A | 8/1998 | Payton |
| 5,794,210 A | 8/1998 | Goldhaber et al. |
| 5,809,282 A | 9/1998 | Cooper et al. |
| 5,819,258 A | 10/1998 | Vaithyanathan et al. |
| 5,832,069 A | 11/1998 | Waters et al. |
| 5,873,099 A | 2/1999 | Hogan et al. |
| 5,878,113 A | 3/1999 | Bhusri |
| 5,878,127 A | 3/1999 | Fleischer, III |
| 5,881,269 A | 3/1999 | Dobbelstein |
| 5,910,981 A | 6/1999 | Bhagat et al. |
| 5,917,899 A | 6/1999 | Moss et al. |
| 5,931,901 A | 8/1999 | Wolfe et al. |
| 6,028,924 A | 2/2000 | Ram et al. |
| 6,069,310 A | 5/2000 | James |
| 6,078,657 A | 6/2000 | Alfieri et al. |
| 6,088,733 A | 7/2000 | Kikuchi |
| 6,128,378 A | 10/2000 | Diener et al. |
| 6,219,652 B1 | 4/2001 | Carter et al. |
| 6,243,480 B1 | 6/2001 | Zhao et al. |
| 6,256,627 B1 | 7/2001 | Beattie et al. |
| 6,264,560 B1 | 7/2001 | Goldberg et al. |
| 6,282,653 B1 | 8/2001 | Berstis et al. |
| 6,330,672 B1 | 12/2001 | Shur |
| 6,345,182 B1 | 2/2002 | Fabritius et al. |
| 6,363,253 B1 | 3/2002 | Valentine et al. |
| 6,408,282 B1 | 6/2002 | Buist |
| 6,427,132 B1 | 7/2002 | Bowman-Amuah |
| 6,442,169 B1 | 8/2002 | Lewis |
| 6,445,785 B1 | 9/2002 | Chan et al. |
| 6,463,275 B1 | 10/2002 | Deakin |
| 6,490,345 B2 | 12/2002 | Fleischer et al. |
| 6,508,709 B1 | 1/2003 | Karmarkar |
| 6,510,419 B1 | 1/2003 | Gatto |
| 6,529,592 B1 | 3/2003 | Khan |
| 6,529,878 B2 | 3/2003 | De Rafael et al. |
| 6,601,044 B1 | 7/2003 | Wallman |
| 6,614,781 B1 | 9/2003 | Elliott et al. |
| 6,629,890 B2 | 10/2003 | Johnson |
| 6,661,884 B2 | 12/2003 | Shaffer et al. |
| 6,915,268 B2 | 7/2005 | Riggs et al. |
| 6,947,540 B2 | 9/2005 | Madoch et al. |
| 6,963,867 B2 | 11/2005 | Ford et al. |
| 7,006,988 B2 | 2/2006 | Lin et al. |
| 7,059,515 B2 | 6/2006 | White |
| 7,103,536 B1 | 9/2006 | Kanno |
| 7,499,914 B2 | 3/2009 | Dieb et al. |
| 7,552,395 B2 | 6/2009 | Neale et al. |
| 7,660,815 B1 | 2/2010 | Scofield et al. |
| 7,725,465 B2 | 5/2010 | Liao et al. |
| 7,756,850 B2 | 7/2010 | Keith, Jr. |
| 7,890,526 B1 | 2/2011 | Brewer et al. |
| 8,452,765 B2 | 5/2013 | Hoffman et al. |
| 8,903,800 B2 | 12/2014 | Kakade et al. |
| 9,118,655 B1 * | 8/2015 | Paczkowski ......... H04W 12/06 |
| 2002/0042793 A1 | 4/2002 | Choi |
| 2002/0049622 A1 | 4/2002 | Lettich et al. |
| 2002/0137217 A1 | 9/2002 | Rowe |
| 2003/0018547 A1 | 1/2003 | Steele |
| 2003/0050819 A1 | 3/2003 | Koenigbauer et al. |
| 2004/0024739 A1 | 2/2004 | Copperman et al. |
| 2004/0093325 A1 | 5/2004 | Banerjee et al. |
| 2005/0114324 A1 | 5/2005 | Mayer |
| 2005/0165753 A1 | 7/2005 | Chen et al. |
| 2006/0174120 A1 * | 8/2006 | Rippy ............... H04L 63/061 713/171 |
| 2006/0242098 A1 | 10/2006 | Wnek |
| 2007/0050393 A1 | 3/2007 | Vogel et al. |
| 2008/0168033 A1 | 7/2008 | Ott et al. |
| 2008/0195477 A1 | 8/2008 | Kennedy et al. |
| 2009/0100125 A1 | 4/2009 | McDowell |
| 2009/0282022 A1 | 11/2009 | Bennett |
| 2010/0017267 A1 | 1/2010 | Negron |
| 2011/0125743 A1 | 5/2011 | Immonen et al. |
| 2011/0145088 A1 | 6/2011 | Bonner et al. |
| 2011/0219295 A1 | 9/2011 | Adams et al. |
| 2013/0305333 A1 * | 11/2013 | Katzer ............... G06F 21/6245 726/7 |

OTHER PUBLICATIONS

Hearst, et al. "Cat-a-Cone: An Interactive Interface for Specifying Searches and Viewing Retrieval Results using a Large Category Hierarchy", 1997.
Zamir, et al. "Grouper: A Dynamic Clustering Interface to Web Search Results", 1999.
Dumais, et al. "Hierarchical Classification of Web Content", 2000.
Wen, et al. "Clustering User Queries of a Search Engine", 2001.
Yue, et al., "A Video Summarization Tool Using Two-Level Redundancy Detection for Personal Video recorders", 2010.
Unknown, American Banker, "Chemical Buys Trading Software from Reuters", ( v 154, n 145, p. 14, Dialog file 9, Accession No. 00500233), 1994.
Croneliusson, Roy, SAP-R3, Jan. 1999. Downloaded from https:llqupea.ub.gu.se/dspace/bitstream/2077/1359/1/hattab.IA7400.pdf downloaded on Mar. 26, 2008, 47 pages.
SAP-CAPS, 1999. Downloaded from http://web.archive.org/web/19991105101002/www.caps.com/products/sap/sapr3.htm, 3 Pages.
RoutePro, 1999, Downloaded from http://web.archive.org/web/20010627035933/www.caps.com/products/rprodsgrfrpdsgrfeat.htm, 2 pages.

* cited by examiner

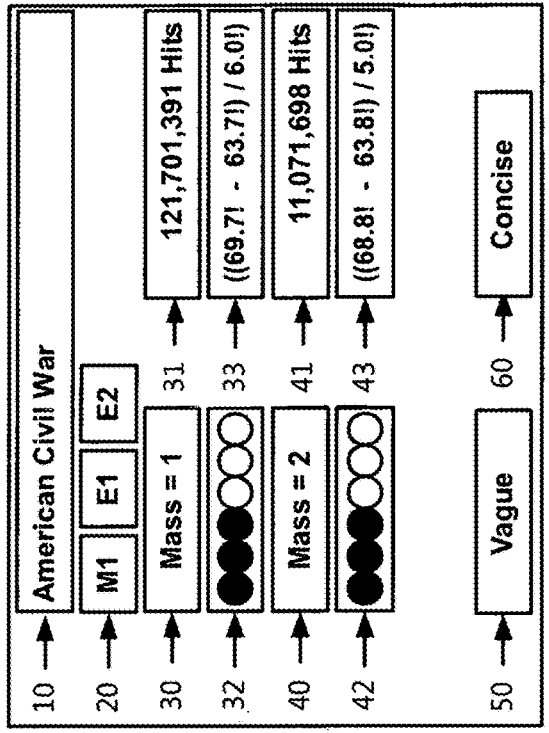
FIG. 5A
FIG. 5B
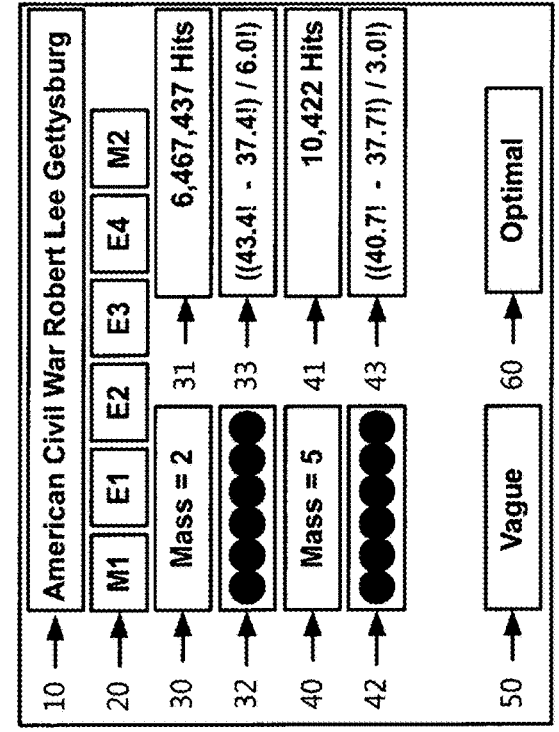
FIG. 5C
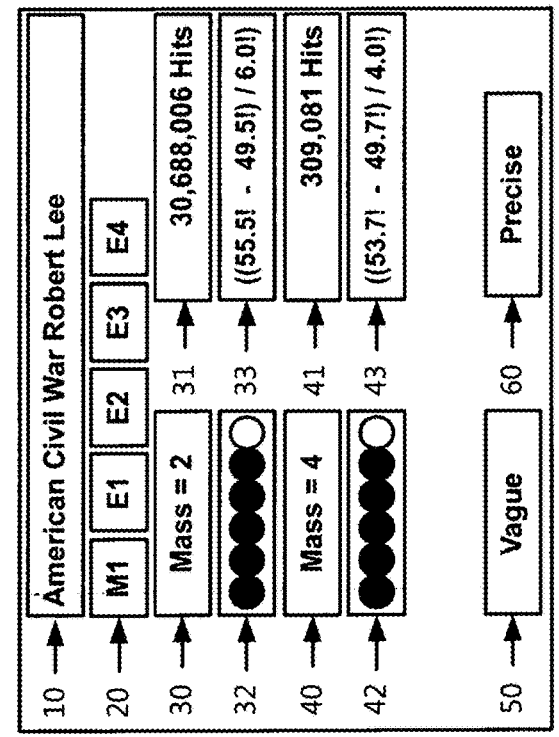
FIG. 5D

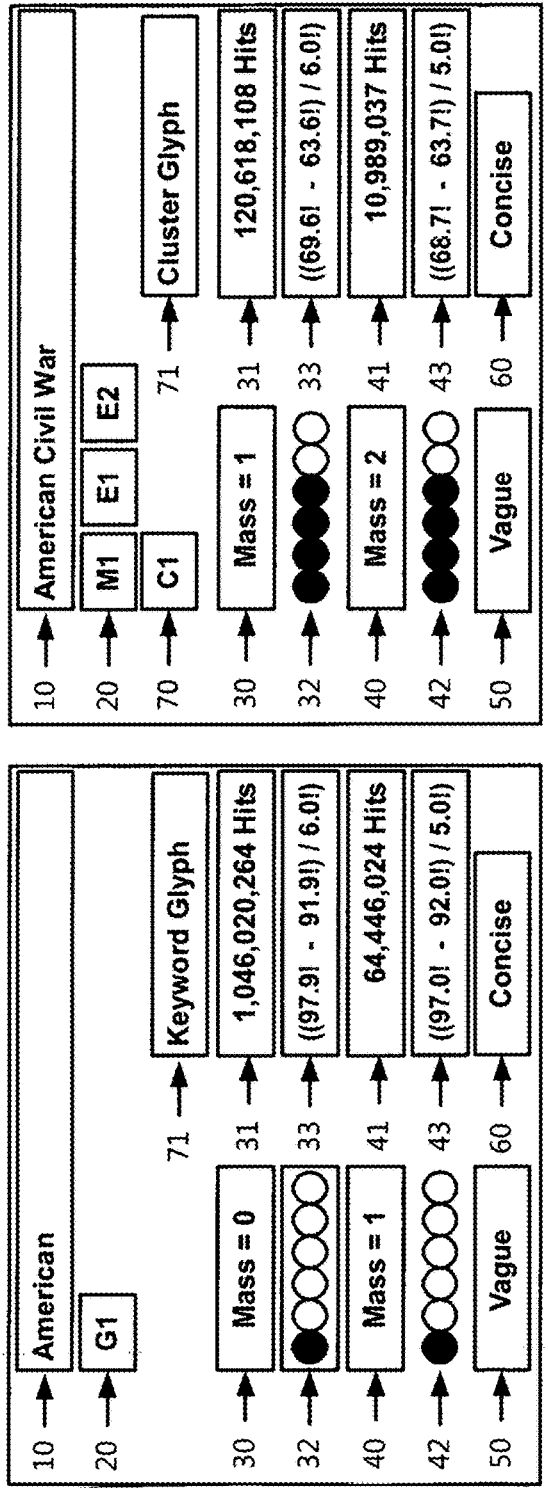
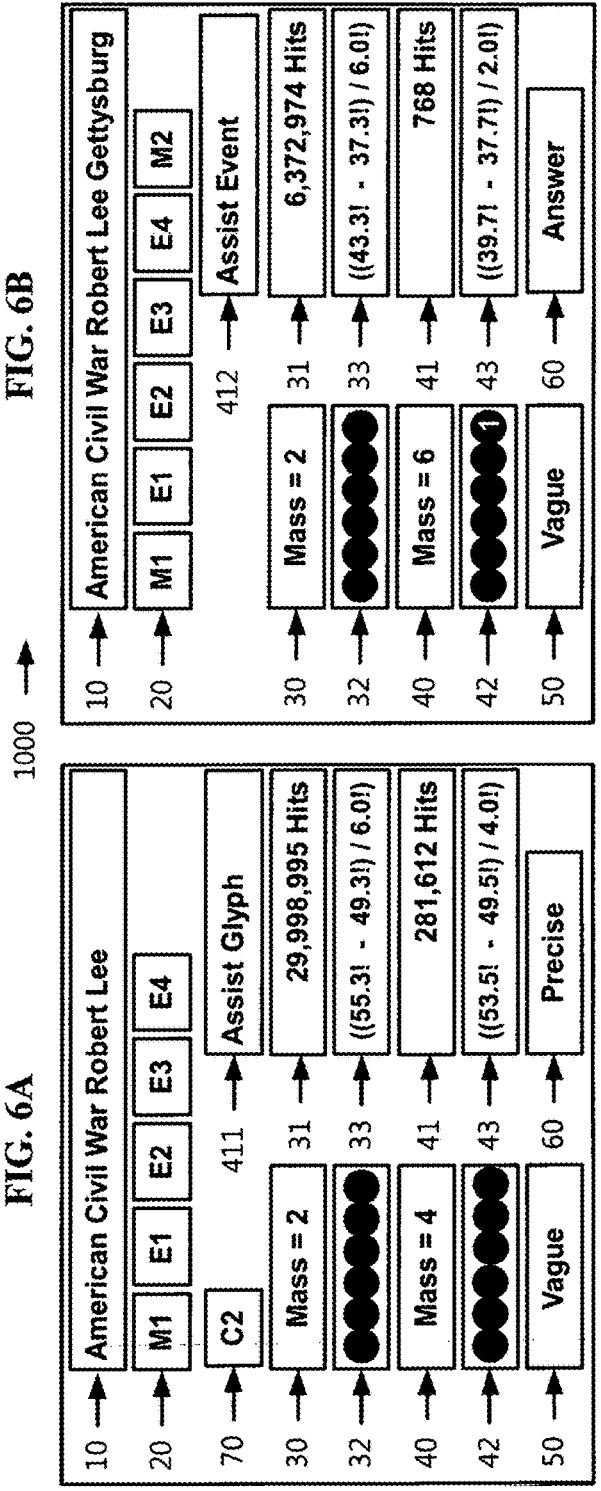
FIG. 6A FIG. 6B FIG. 6C FIG. 6D

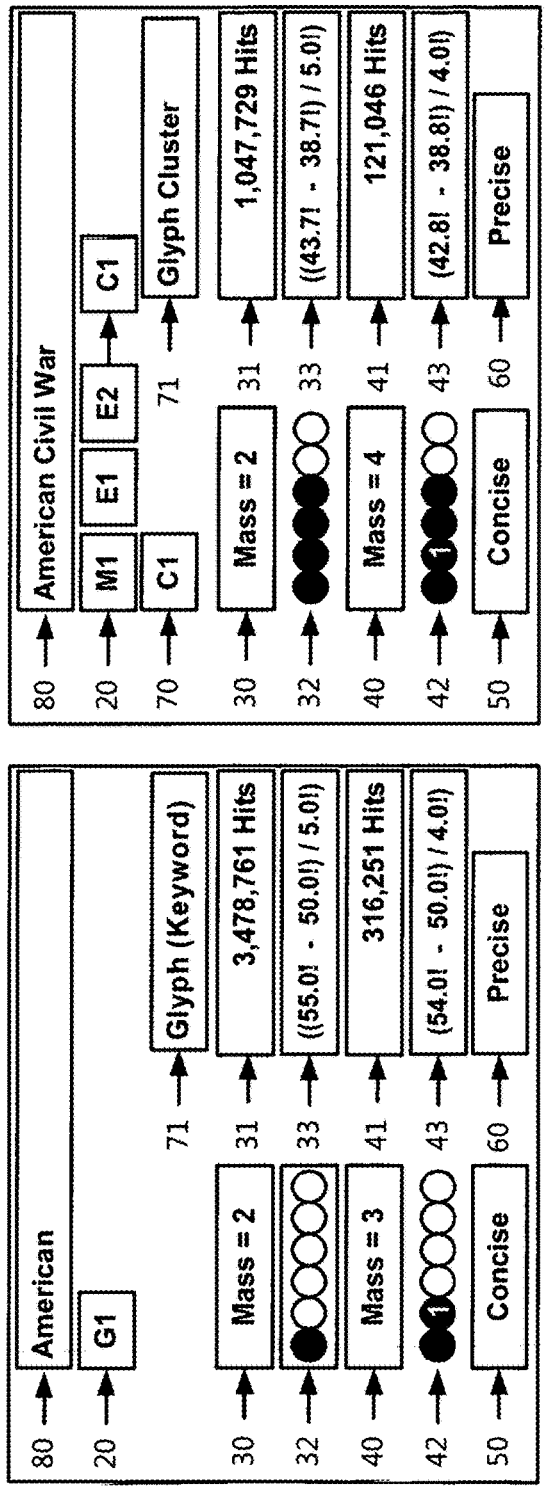
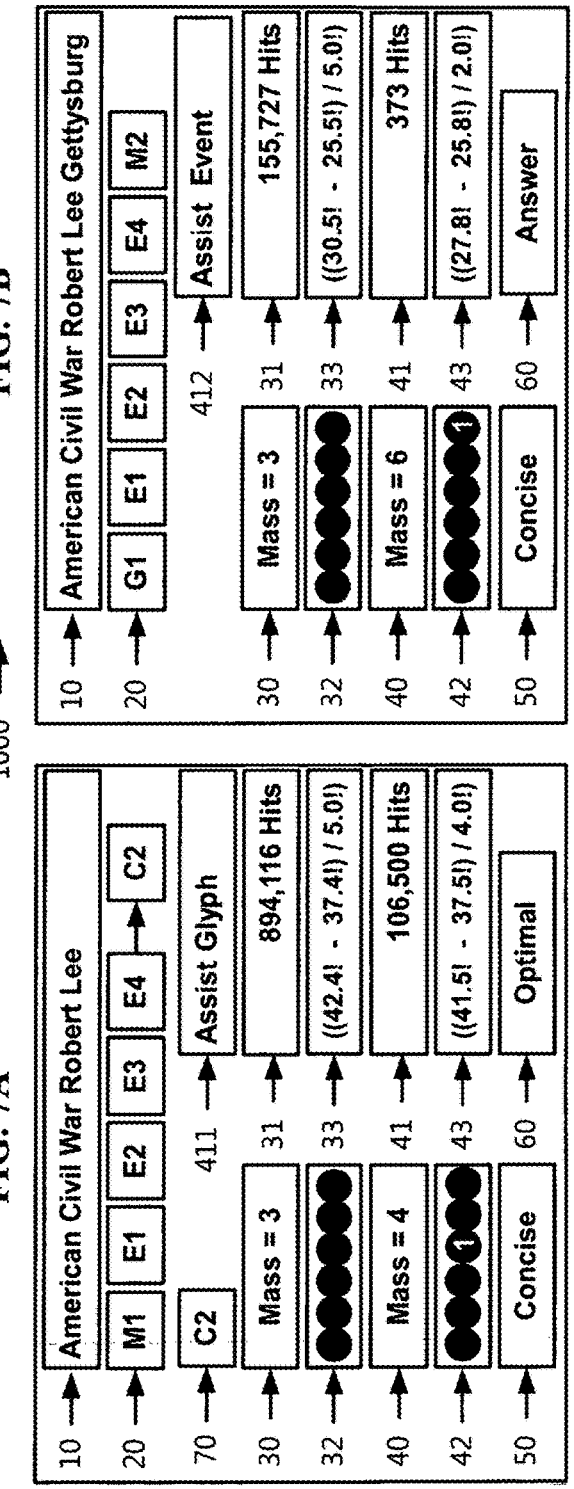
FIG. 7A
FIG. 7B
FIG. 7C
FIG. 7D

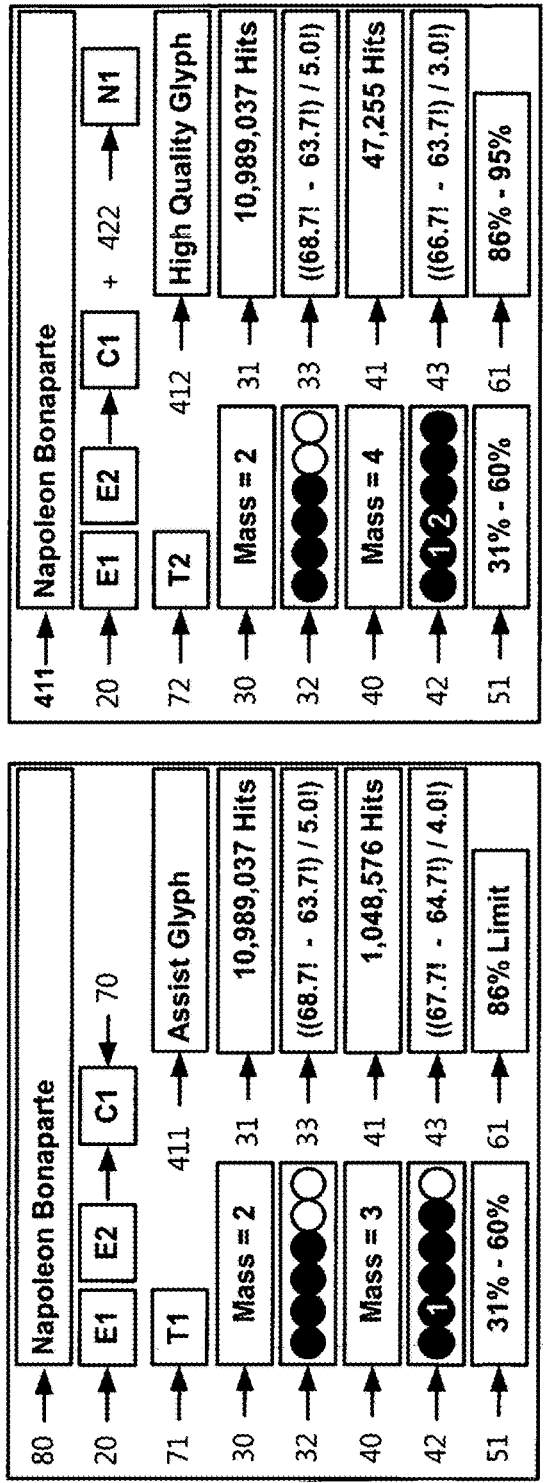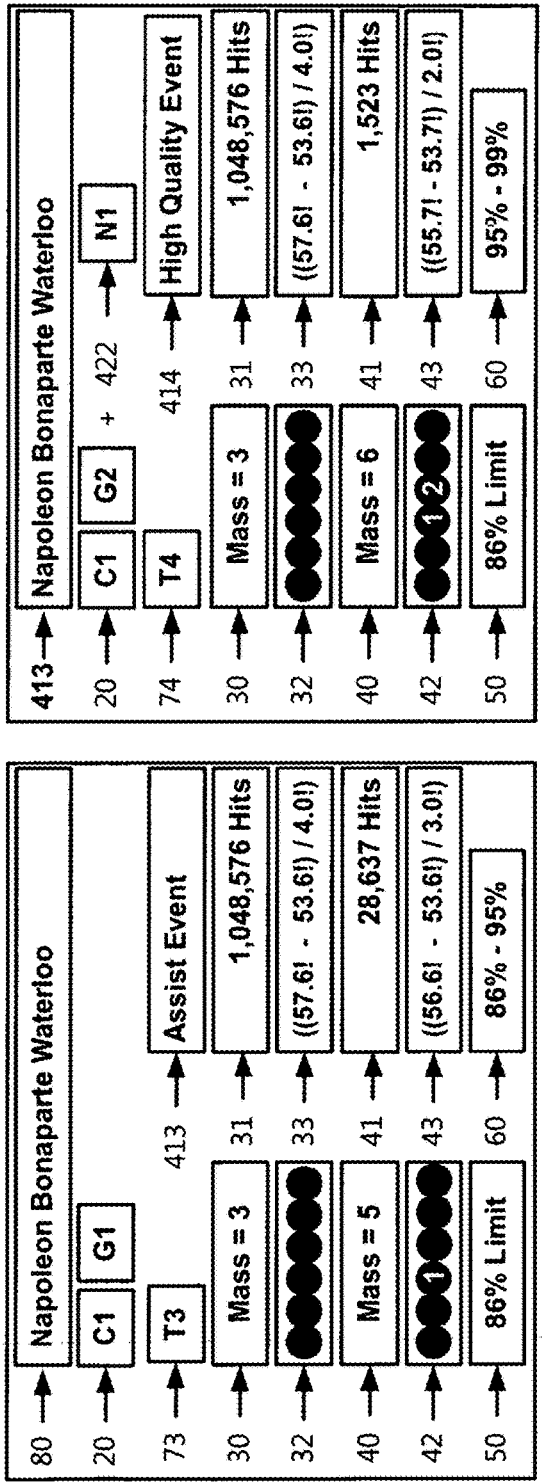
FIG. 9A  FIG. 9B  FIG. 9C  FIG. 9D

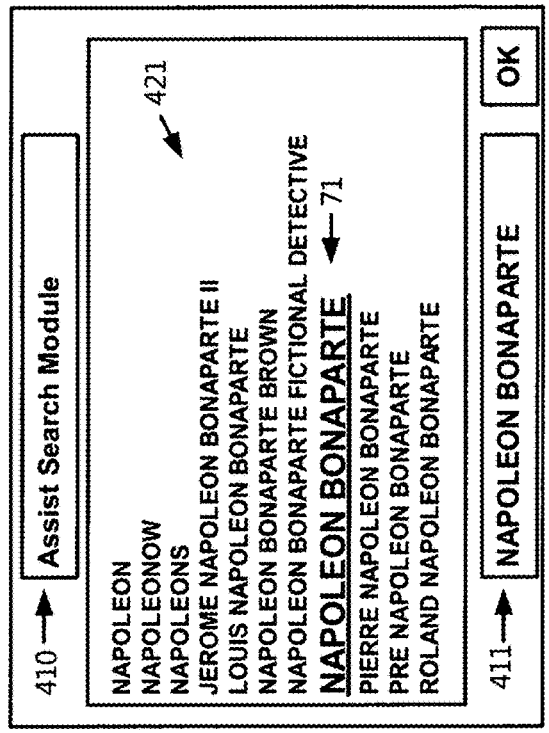
FIG. 10A
FIG. 10B
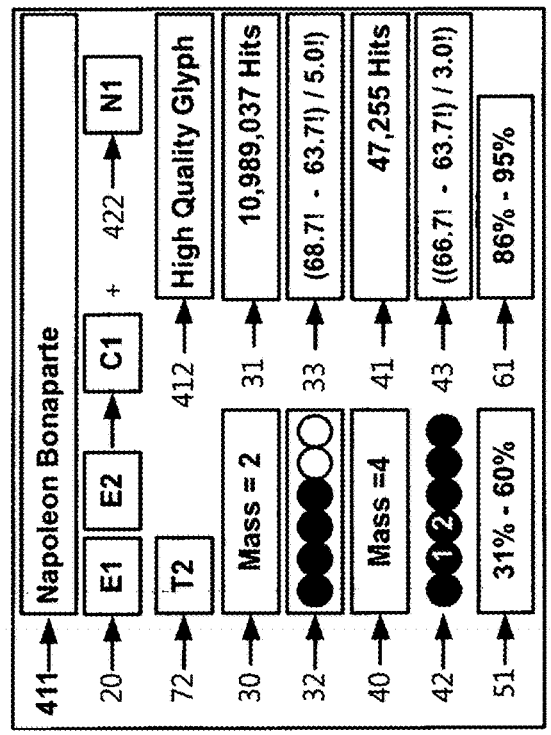
FIG. 10C
FIG. 10D

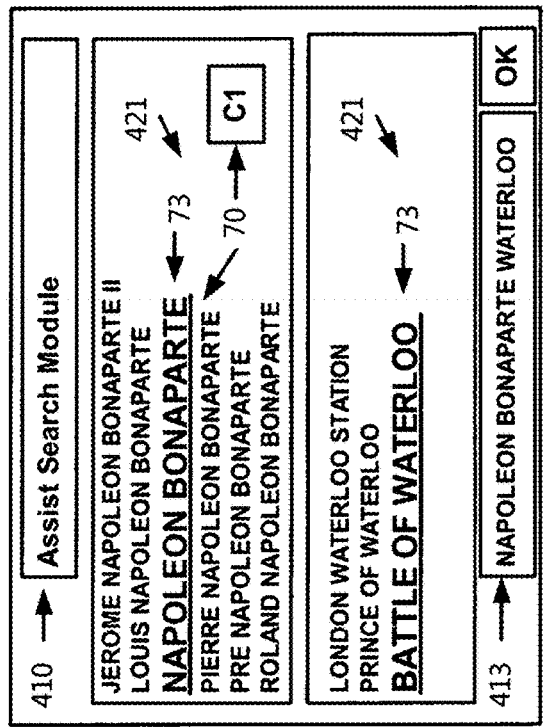
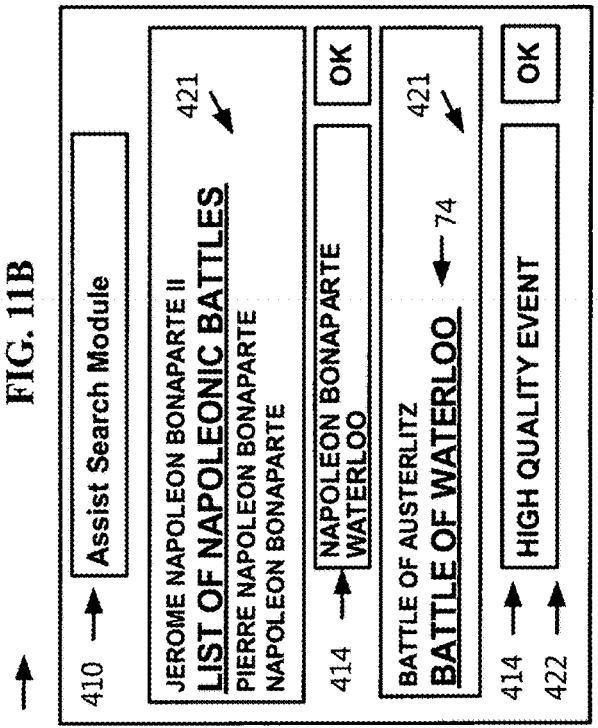
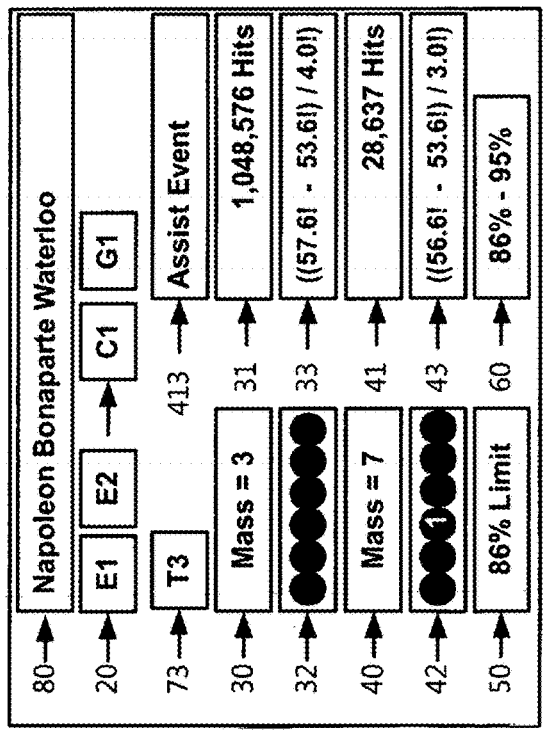
FIG. 11A
FIG. 11B
FIG. 11C
FIG. 11D

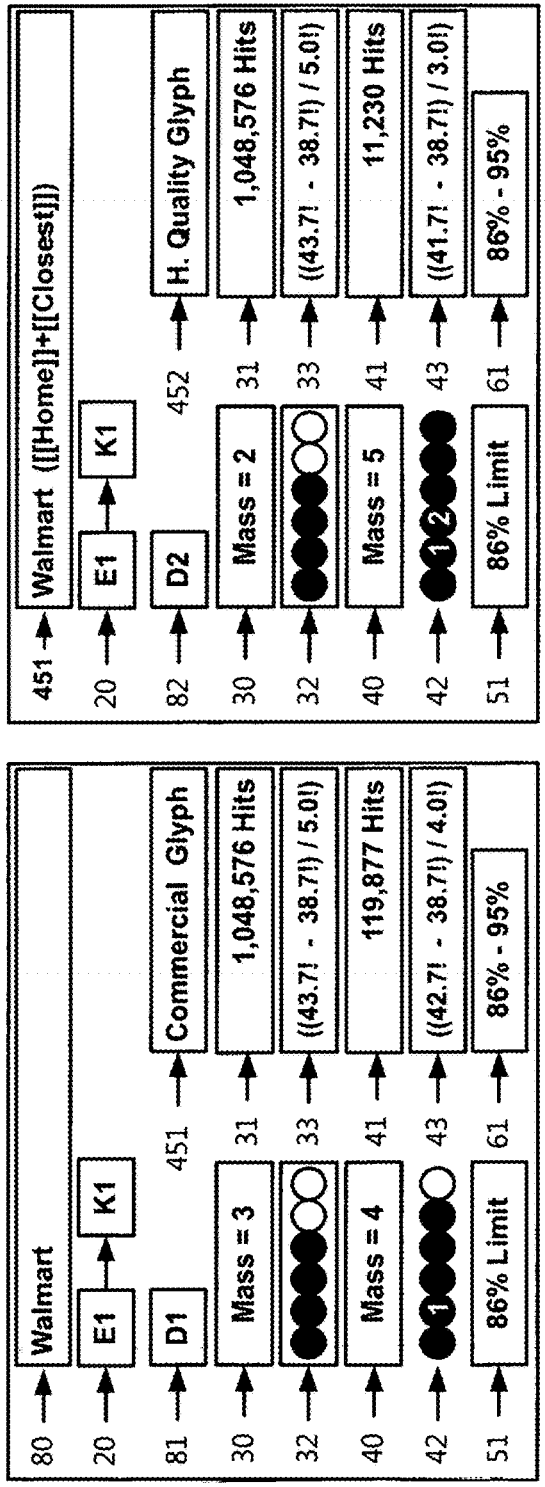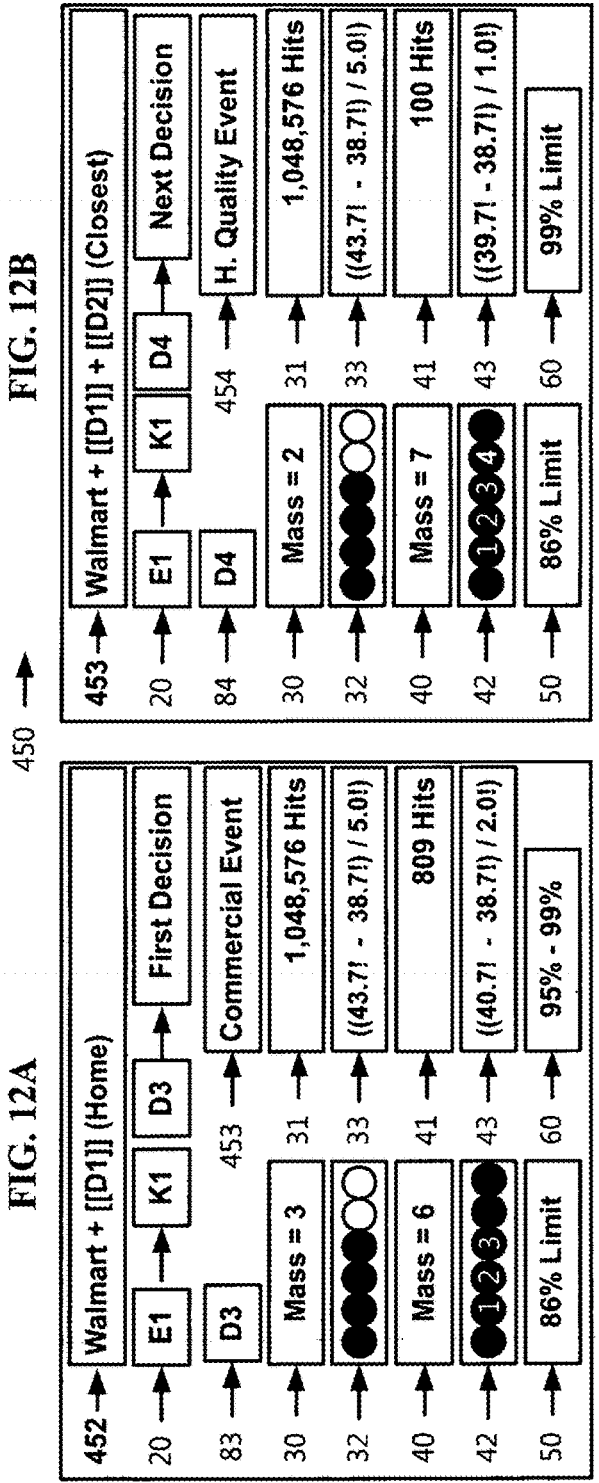
FIG. 12A
FIG. 12B
FIG. 12C
FIG. 12D

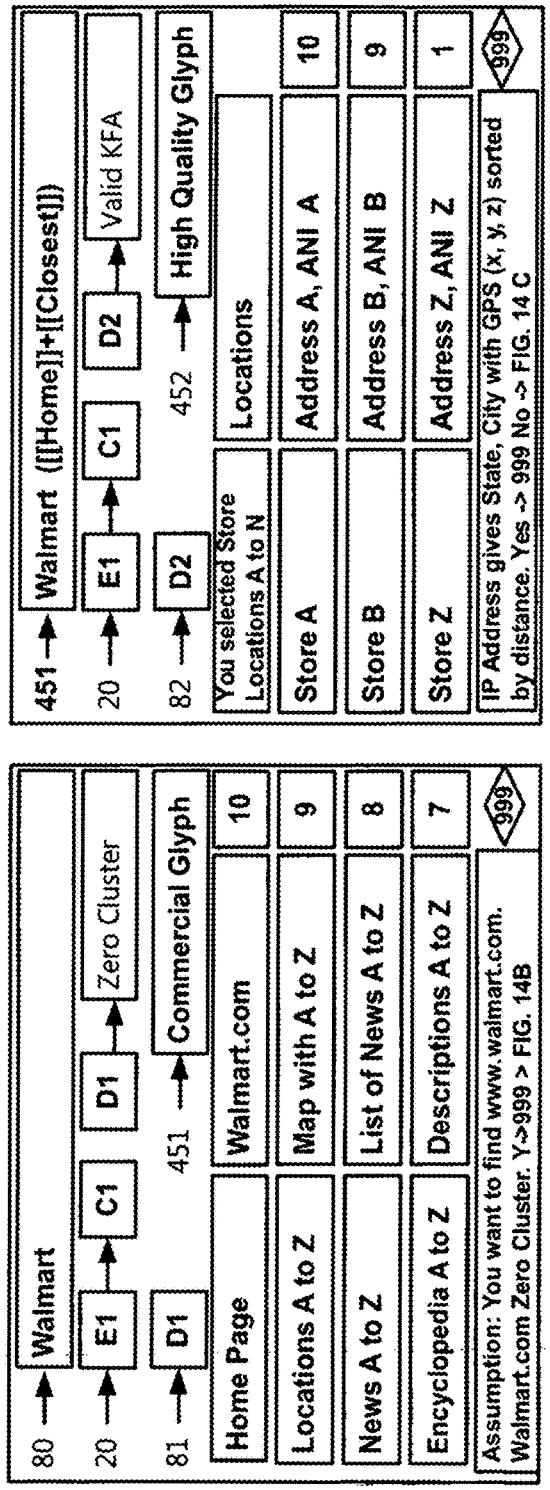
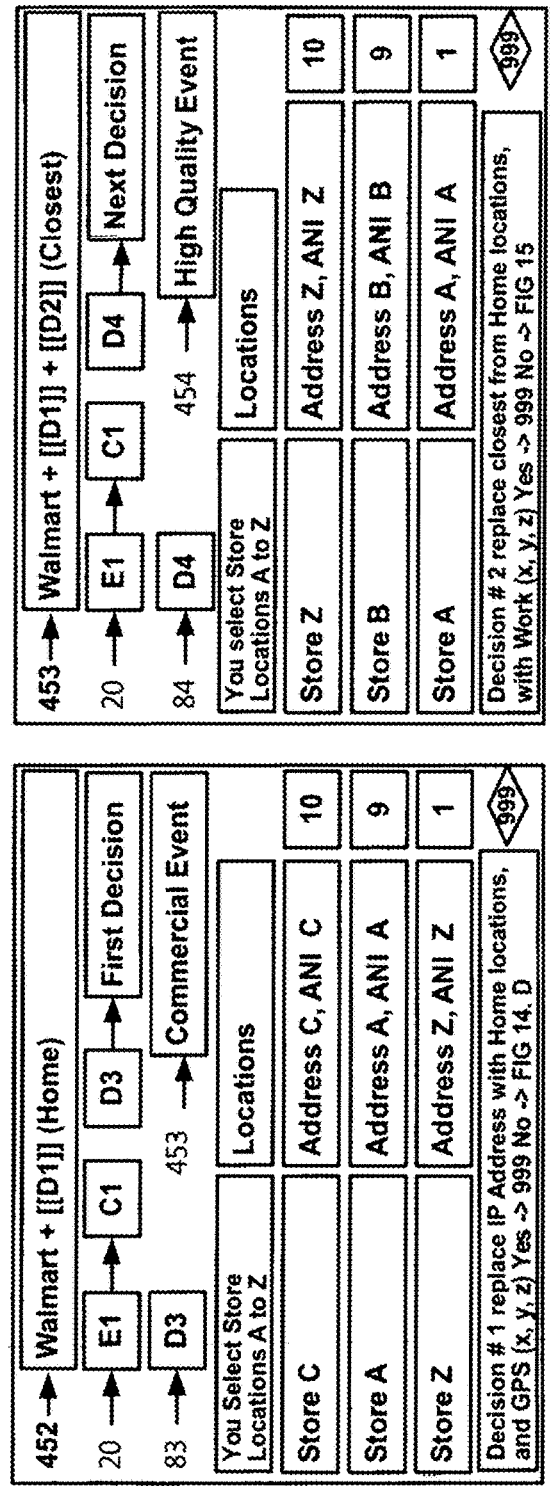

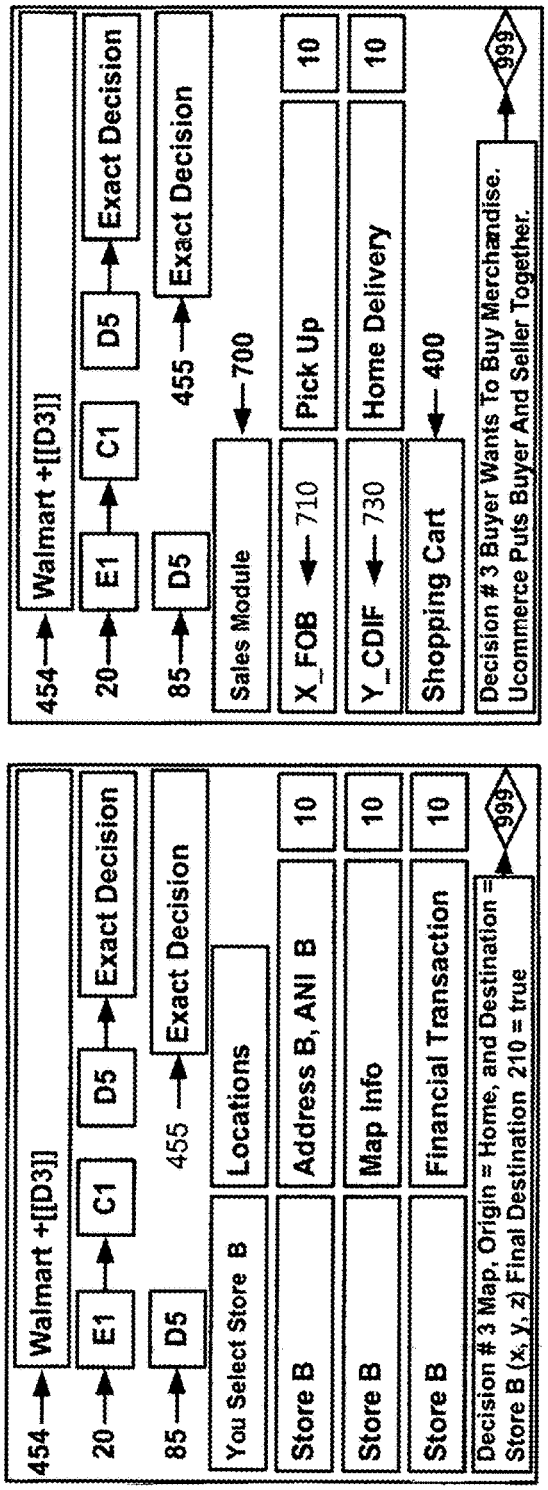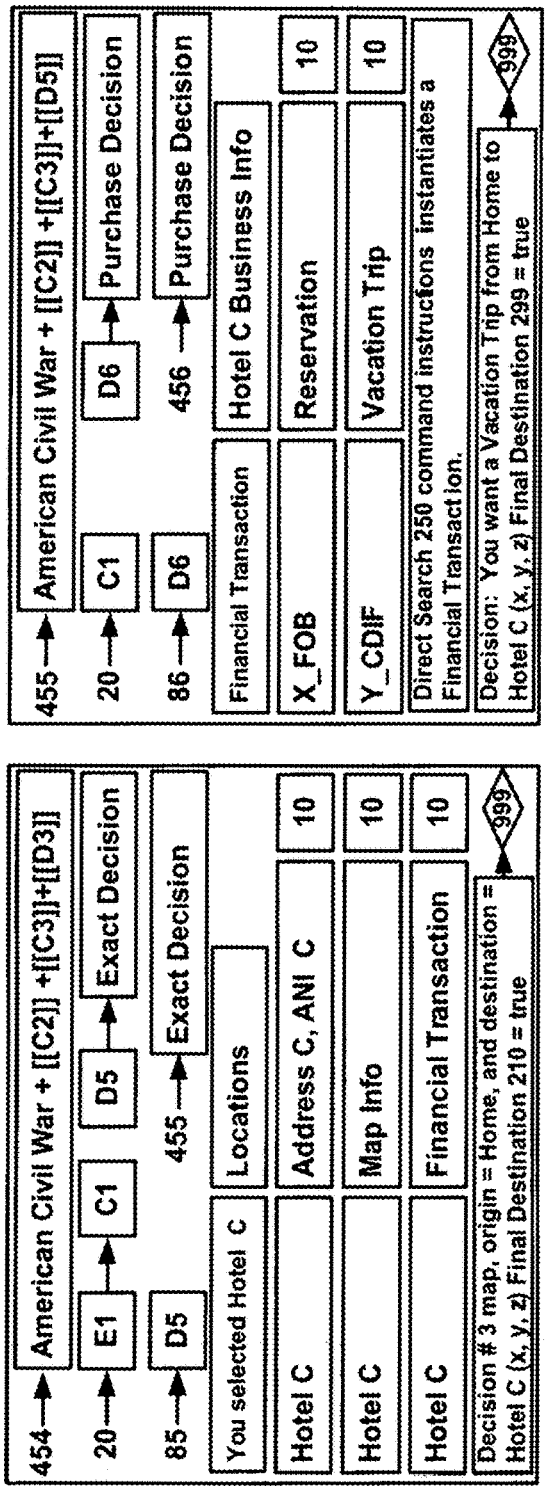
FIG. 16A  FIG. 16B  FIG. 16C  FIG. 16D

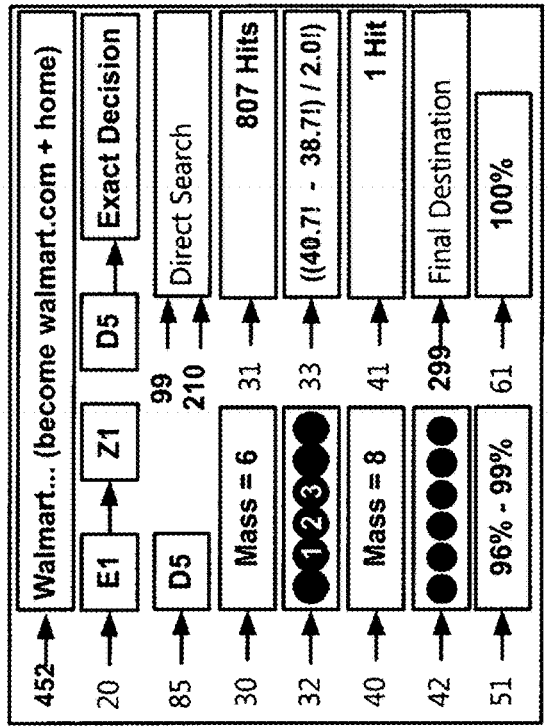
FIG. 17A
FIG. 17B
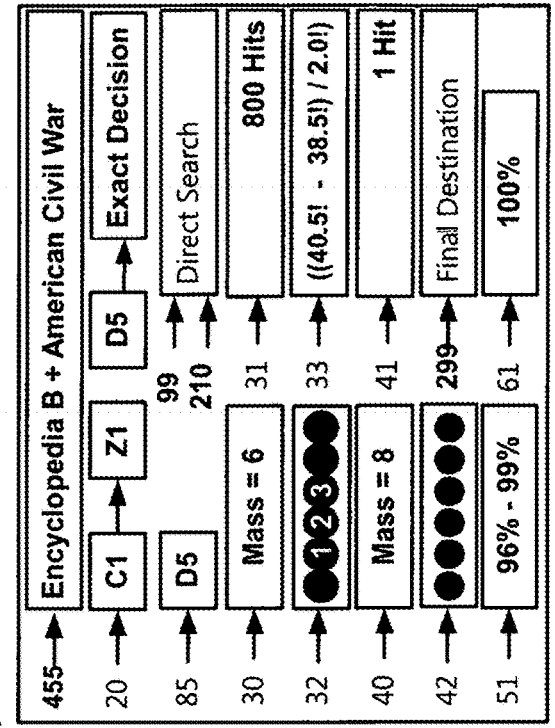
FIG. 17C
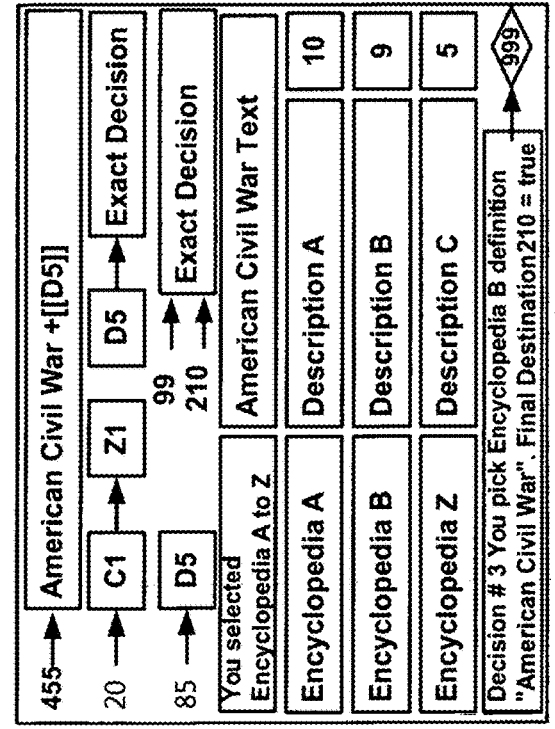
FIG. 17D

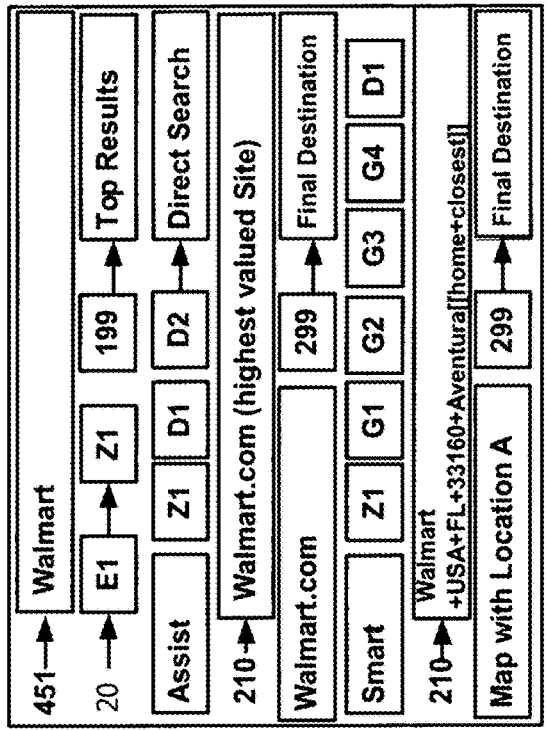
FIG. 18A
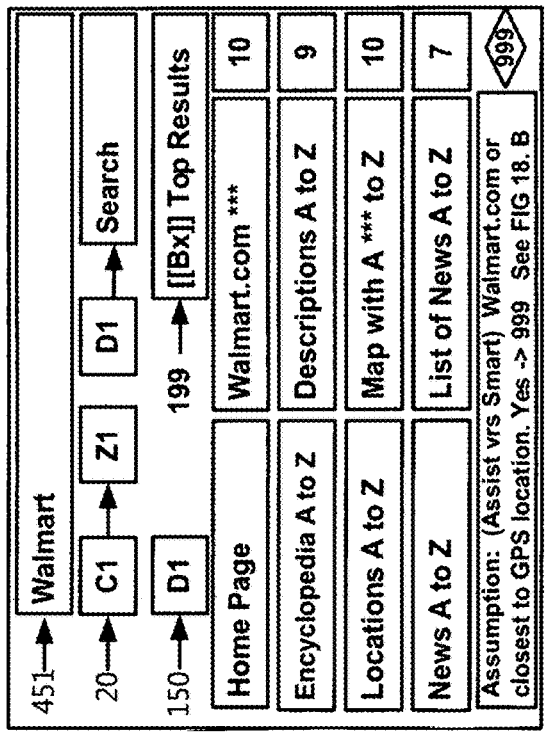
FIG. 18C
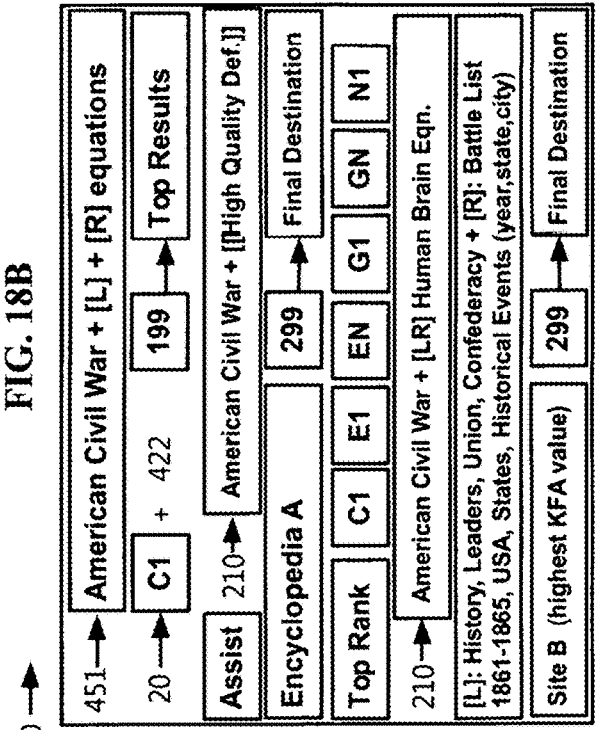
FIG. 18B
FIG. 18D

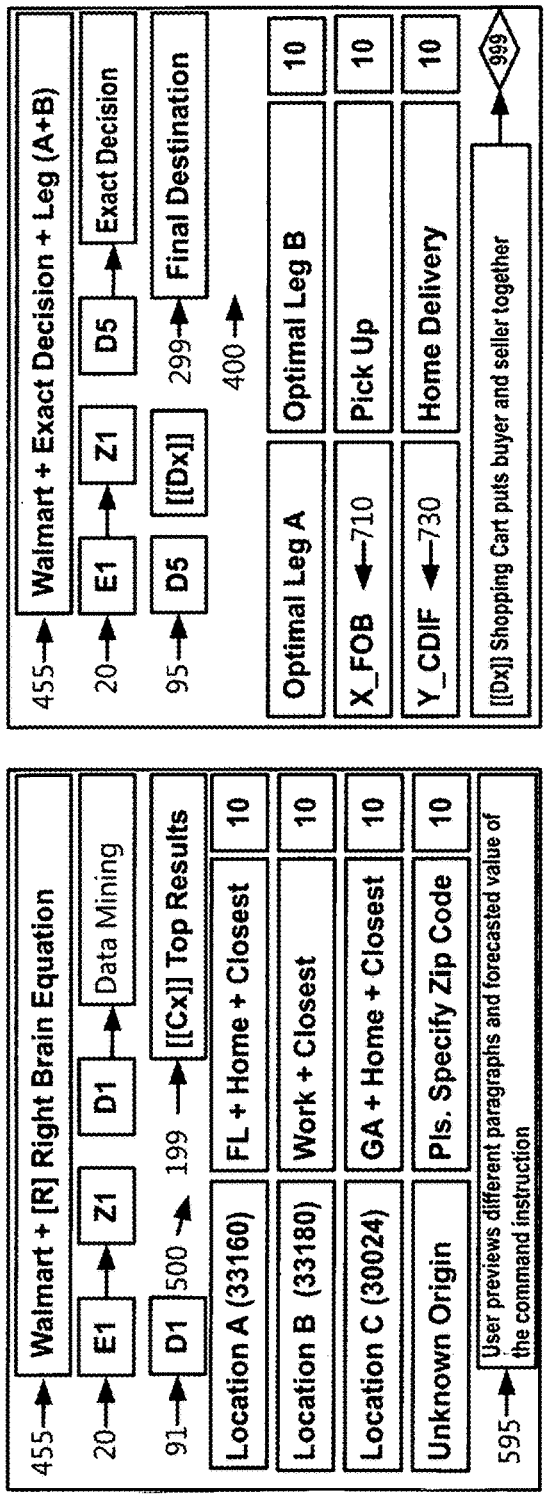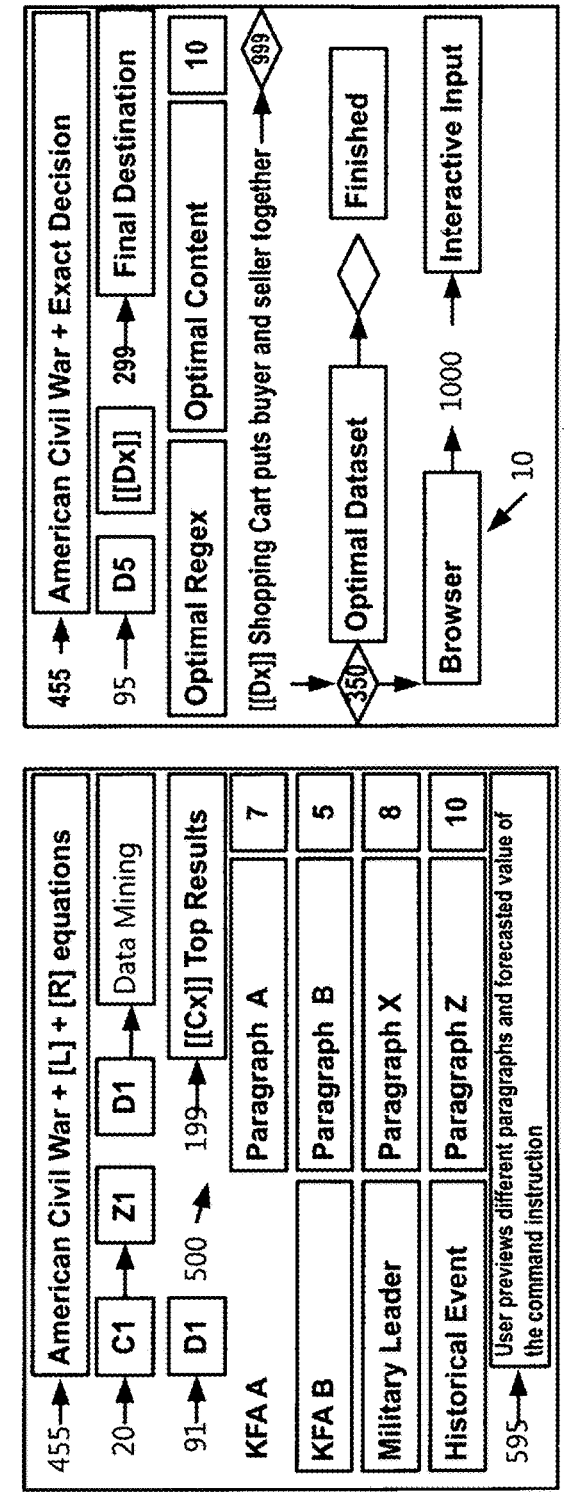
FIG. 19A
FIG. 19B
FIG. 19C
FIG. 19D

PERSONAL SEARCH RESULTS

CROSS REFERENCE TO RELATED APPLICATIONS

This Divisional Patent Application claims the benefit of:
A. co-pending U.S. patent application Ser. No. 15/175,861 filed on Jun. 7, 2016,
   wherein U.S. patent application Ser. No. 14/474,268 is a Divisional Application claiming the benefit of co-pending U.S. patent application Ser. No. 14/682,052, filed on Apr. 8, 2015,
   wherein U.S. patent application Ser. No. 14/682,052 is a Divisional Application claiming the benefit of co-pending U.S. patent application Ser. No. 14/623,559, filed on Feb. 17, 2015,
   wherein U.S. patent application Ser. No. 14/623,559 is a Divisional Application claiming the benefit of co-pending U.S. patent application Ser. No. 14/582,236, filed on Dec. 24, 2014,
   wherein U.S. patent application Ser. No. 14/582,236 is a Divisional Application claiming the benefit of co-pending U.S. patent application Ser. No. 14/578,439, filed on Dec. 21, 2014,
   wherein U.S. patent application Ser. No. 14/578,439 is a Divisional Application claiming the benefit of co-pending U.S. patent application Ser. No. 14/474,268, filed on Sep. 1, 2014,
   wherein U.S. patent application Ser. No. 14/474,268 is a Divisional Application claiming the benefit of co-pending U.S. patent application Ser. No. 14/028,508, filed on Sep. 16, 2013 (issued as U.S. Pat. No. 9,355,352 on May 31, 2016),
   wherein U.S. patent application Ser. No. 14/028,508 is a Continuation-In-Part claiming the benefit of co-pending U.S. patent application Ser. No. 14/013,018, filed on Aug. 28, 2013 (now abandoned),
   wherein U.S. patent application Ser. No. 14/013,018 is a Continuation-In-Part claiming the benefit of co-pending U.S. patent application Ser. No. 13/777,775, filed on Feb. 26, 2013 (issued as U.S. Pat. No. 8,977,621 on Mar. 10, 2015),
   wherein U.S. patent application Ser. No. 14/028,508 is a Continuation-In-Part claiming the benefit of co-pending U.S. patent application Ser. No. 13/247,964, filed on Sep. 28, 2011 (issued as U.S. Pat. No. 8,868,535 on Oct. 21, 2014),
   wherein U.S. patent application Ser. No. 13/247,964 is a Continuation-In-Part claiming the benefit of co-pending U.S. patent application Ser. No. 12/785,122, filed on May 21, 2010 (issued as U.S. Pat. No. 8,386,456 on Feb. 26, 2013),
   wherein U.S. patent application Ser. No. 12/785,122 is a Continuation-In-Part claiming the benefit of co-pending U.S. patent application Ser. No. 12/778,228, filed on May 12, 2010 (issued as U.S. Pat. No. 8,239,229 on Aug. 7, 2012),
   wherein U.S. patent application Ser. No. 12/778,228 is a Continuation-In-Part claiming the benefit of co-pending U.S. patent application Ser. No. 11/584,941 filed on Oct. 23, 2006 (issued as U.S. Pat. No. 7,809,659 on Oct. 5, 2010);
B. wherein U.S. patent application Ser. No. 12/778,228 is a Continuation-In-Part claiming the benefit of co-pending U.S. patent application Ser. No. 12/146,420, filed on Jun. 25, 2008 (issued as U.S. Pat. No. 7,908,263 on Mar. 11, 2011);
C. wherein U.S. patent application Ser. No. 12/778,228 is a Continuation-In-Part claiming the benefit of co-pending U.S. patent application Ser. No. 11/584,271, filed on Oct. 20, 2006 (now abandoned);
   wherein U.S. patent application Ser. No. 11/584,271 is a Continuation-In-Part claiming the benefit of co-pending U.S. patent application Ser. No. 10/926,446, filed on Aug. 25, 2004 (issued as U.S. Pat. No. 7,050,813 on May 23, 2006);
D. wherein U.S. patent application Ser. No. 12/778,228 is a Continuation-In-Part claiming the benefit of co-pending U.S. patent application Ser. No. 12/764,934, filed on Apr. 21, 2010 (issued as U.S. Pat. No. 8,676,667 on Mar. 18, 2014);
   wherein U.S. patent application Ser. No. 12/764,934 is a Continuation-In-Part claiming the benefit of co-pending U.S. patent application Ser. No. 11/223,226, filed on Sep. 9, 2005 (now abandoned);
E. wherein U.S. patent application Ser. No. 12/778,228 is a Continuation-In-Part claiming the benefit of co-pending U.S. patent application Ser. No. 12/764,934, filed on Apr. 21, 2010 (issued as U.S. Pat. No. 8,676,667 on Mar. 18, 2014);
   wherein U.S. patent application Ser. No. 12/764,934 is a Continuation-In-Part claiming the benefit of co-pending U.S. patent application Ser. No. 11/085,678, filed on Mar. 21, 2005 (now abandoned);
F. all of which are incorporated herein in their entireties.

FIELD OF THE INVENTION

The present invention relates generally to an Internet search engine optimizer method and system, hereinafter referred as optimizer. More particularly, the present invention relates to an interface product that works independently and in parallel with a browser client and search engine supercomputer server architecture that gathers, analyzes, and distills interactive input. The optimizer analyses input and transforms the input into a personalized search pattern. For each search pattern the optimizer continuously maintains and updates pre calculated and preprocessed array or collection of best-fit web page responses.

BACKGROUND OF THE INVENTION

The limitations, drawbacks and/or disadvantages of technologies are as follows: search engines are based on Boolean algebra eigenvector algorithms that are used to parse and filter information indices until the top page ranks are determined and displayed to the end user. Unfortunately, some specific keywords combinations may be too narrow and confound a search by hiding optimal results. search engines are predominately configured to perform static search patterns. Each search is processed from the ground up without taking into account many requests belonging to one reply. A session consists of consecutive related and unrelated search requests to reach the final destination.

The Internet searchable environment or (U) can be construed as a complex network with billions of web pages. The search engine supercomputer analyzes each web page, and then uses eigenvectors to determine the highest ranked pages from the end user's match criteria. As explained, in related subject matters "As the size of the environment increases the level of redundancy and tax burden of a system exponentially increases".

Transform Data: The supercomputer system cleans, standardizes and organizes the spaghetti of the environment by organizing the information into managerial hierarchical structured supercomputer (hereinafter referred as HIVE) that removes redundancy, latency and the tax burden.

Synchronize tasks: the HIVE is a decentralized supercomputer consisting of a plurality of nodes, which are specifically arranged in three tiers. The summit tier coordinates and executes global tasks. The middle tier coordinates and executes regional tasks. The lower tier coordinates and executes localized tasks and processes the lion share of noncritical transactions. The summit node of each tier synchronizes tasks by sending command instructions messages that assigns the fuzzy logic state of each node belonging to its chain of command.

Lateral and Vertical Synergy: A tier consisting of groups of nodes that are independent from other groups of nodes. Each tier partition performs mission critical tasks within their domain and works in parallel with other partitions of the same tier. Each node can shunt available resources using lateral and vertical synergy with parent, sibling or subordinate nodes to maximize available resources. Each node continuously analyzes its own environment current conditions and forward chains summary information until reaching the summit. At this point, the summit nodes rearward chain messages with command instructions that priorities resources and notify each subordinate with command instructions tasks constraints based on network conditions to avoid saturation, clog and eliminate the tax burden of the environment'.

Remove chaos and anarchy: Once the 'spaghetti of the environment' is eliminated the HIVE creates command messages that are also known as summary reports that coordinate and synchronize each node to operate at maximal output capacity. Each node operates without adversely affecting the network flow of data. The HIVE maximizes available throughput and limits the exponential rate of growth of complexity as the size of the environment increases.

Convert requests into Ideas: Search engines dependency on Boolean algebra use inductive reasoning popularity scores to find the top results. In contrast, the HIVE using deductive reasoning to interpret interactive input as being part of an idea being formulated by both the left and the right sides of the brain. When a request is incomplete the HIVE probabilistically supplies and inserts missing gaps of information. Related art teaches that a Vector CDR can be expressed as the summation of a plurality of valid vectors. The HIVE correlates a plurality of partial vectors and creates a resultant vector containing the top (n) pages.

Heartbeat: The Summit tier gives a heartbeat to the HIVE. The X_FOB and Y_CDIF Inventory Control Bitmaps are referred as summary report objects, with pre-calculated look up information to eliminate redundant and resource intensive calculations.

BRIEF SUMMARY OF APPLICANT'S RELATED APPLICATIONS

Search engines use Boolean algebra and eigenvector algorithms to parse and filter information indices until the top page ranks are determined and displayed as output. Unfortunately, some specific keywords combinations may be too narrow and confound a search by hiding optimal results. Search engines are predominately configured to perform single static search patterns. Each search is processed from the ground up, analyzing the searchable environment, without taking into account many requests belonging to one session. A session consists of consecutive related and unrelated search requests while randomly surfing the web.

The optimizer in parallel keeps in existence for each search pattern its corresponding improved environment that contains all relevant bound pages. Each improved environment possesses a relative master index. The optimizer continuously purifies and synchronizes the plurality of relative master index that permits to match/merge and then correlate the Internet's master index in real time.

The optimizer continuously scans and detects the Internet searchable environment for new content with significant difference quality to update each search pattern's improved environment relative master index and top (n) pages as output. The optimizer dynamically gains factors and attenuates the content of each page based on the end user's usage pattern of behavior. Existing master index have an absolute rank value for each page.

The optimizer rank value is dynamically adjusted by matching independent variables and related keywords belonging to the search pattern to generate a content value. The optimizer "cherry picks" the best content value web pages as output. The output is forward chained back to the end user's terminal and displayed.

The optimizer is a method and system for simulating Internet browser search capacities that cleans, standardizes, organizes, and transforms the massive amount of data into a lingua franca comprising of valid keywords, term clusters, and unique geospatial patterns contained in the Internet collectively known as patterns that exist in page. The comprehensive collection of search patterns with their relative master index are stored and continuously updated as web crawlers detect significant changes in the environment.

Each search pattern consists of at least one independent variable, e.g. (I), (J), (K), (X), (Y) and (Z). Search patterns with 0 independent variables use randomly surfing the web techniques that find the final destination within the massive (U) or Internet environment.

Related Applications (U.S. patent application Ser. No. 10/926,446/Issued U.S. Pat. No. 7,050,813)

Partial Differential Equation Vectors Model: Solves solutions with two or more independent variable. The solution requires an equation with a plurality of independent variables. Thus we replace the traditional vector with Partial Differential Equation Vectors.

For example, using set theory, the telecommunications environment U can be divided into three independent networks: Fixed (X), IP Telephony (Y) and Wireless (Z). A Simple Call exists when the call uses a single network (X, Y or Z), whereas a complex Call exists when the call must use more than one independent network environment to complete the call.

For example, a call uses three different networks Fixed, IP Telephony and Wireless (I, J, K), each independent variable solves the billing entity and resultant vector for the call. The Switch controlling the call uses its Partial A and Partial B functions to create a final resultant vector that includes all the circuits belonging (I, J, K) for just one call. Yes, they are three independent billable calls. One per network, yet in fact there is only one call.

Related Applications: (U.S. patent application Ser. No. 10/852,394

Computer Network System: consists of a plurality of nodes, where each one is programmed with Artificial Intelligence to perform predefined tasks that are logistical rationalized based on the current conditions of the environment. The computer network system is synonymous with Superset (U). The cluster is divided into three geospatial tiers: a) Global, b) Regional, and c) Local. Each tier has multiple functionalities such as a) Provisioning, b) Total Quality Management or (TQM), c) Data Manipulation, d) Management Information Systems (or MIS), e) Expert Information Systems (or EIS) and f) Inventory Control.

Computer Network System Nodes: All nodes are autonomous and in real time analyze, evaluate, gather and process information from the environment. From incipiency upon receiving the fuzzy logic piece of information that triggers a new task or update pending activities. Each node is assigned to Superset (I), Set (I, J), or Subset (I, J, K) cluster tier, and to the geospatial domains (X) or global, (Y) or regional, and (Z) local to map independent variables (I, J, K, X, Y, Z) that build the managerial hierarchy as follows:

Managerial Hierarchy: The summit tier allows users to have access to their information in real time. The middleware tier geographical manages physical warehouses. The lower tier controls a plurality of points of presence belonging to $3^{rd}$ parties and collectively constitutes the workhorse of the system.

Node Synchronization and Buffer Resources: Every predefined cycle each node synchronizes the latest inventory. Nodes request siblings for any excess buffer resources to complete a task using vertical and lateral synergy. Parent nodes use their chain of command to coordinate their subordinates. Thus, all nodes synergistically collaborate to process tasks and collectively mimic a global online supplier.

Eliminates the Spaghetti Phenomena: The global online supplier gathers, distills, analyzes and then standardizes raw information into primed *lingua* franca data so that information certainty is achieved and thus removes the chaos and anarchy or spaghetti phenomena.

Primes Vector CDR: *Lingua* franca messages are vectors and contain the vector trajectory and all transactional segments information. Legacy systems send all transactional segments to centralized billing data warehouses that match/merge each transactional component and then correlate the information into a billing entity. Whereas the computer network uses artificial intelligence to assign a hierarchical owner and plots circuit by circuit the vector trajectory and only activates relevant nodes to the transaction so that nodes can communicate amongst themselves via forward and reward chaining. Nodes send all dynamic and fixed costs to hierarchical owner so it can correlate the billing entity absent of a centralized billing system.

Avoids Taxing the Throughput: The computer network system monitors in real time the limited resources and capacities of the network to avoid taxing available throughput. Each node can update resources as soon as new relevant messages from the environment are detected.

Uses Synergy to Maximize Throughput: Upon receiving environment command instructions each node can manage the flow of information of their subordinates from predefined point A to point B routes to avoid saturation. The computer network maximizes throughput by permitting each node via synergy to shares resources with other nodes that have substantial buffer resources to eliminate the tax burden and waste.

Analyzes Network Traffic: Network traffic is analyzed as the informational traffic is measured based on the latest command instructions and known routing throughput limitations of each given domain. The summit nodes of each tier perform the nonobvious task synchronizing and managing their subordinates to use synergy to minimizing waste before permitting data to be transmitted through their chain of command.

Computer Network System Reaches Informational Certainty: Nodes remove waste at incipiency one transaction at a time, so that the computer network system can be considered a real time invention.

Computer Network System Stabilizes the Flow of Information: Summit and Middleware nodes stabilize the flow of information and update the XLDB database with trending statistics used to optimize resources and available bandwidth. Each node of the managerial hierarchical synergy works in parallel with others nodes to work as a single unit permitting the computer network to create a virtual instance of the organizational environment.

Computer Network System is a Real Time System: Once the 'spaghetti phenomena' is eliminated, informational certainty is achieved removing the need for a central mainframe. Consequently, a real time solution consists of synergistically synchronizing all the computer network system functions.

Computer Network System Evaluates Network Resources: Each node has its own location identification means and must be assigned to one geospatial specific domain cluster such as local, regional or global. Each activity and task is processed in parallel, starting from the point of origin and ending at the point of destination. The computer network system rearward chains the routing vector information through the simulation network to the point of origin and analyzes and evaluates the best usage of network resources.

Related Applications (U.S. patent application Ser. No. 11/584,941/Issued U.S. Pat. No. 7,809,659)

XCommerce, Deductive reasoning Supercomputer: Is a method that simulates the entire superset of potential valid interactive input regular expression requests construed during an Internet browser search and converting the results set into a vector based statistical data that enable efficient and accurate searching. XCommerce simulates, standardizes and partitions the Internet into a plurality of concurrently working environment using a managerial hierarchical method of indexing and searching as follows:

Managerial Hierarchical Index Relationships: A request is broken down into keywords and clusters, and then converts them into a search pattern that optimally minimizes the quantity of relevant pages.

Determining what is Relevant and Irrelevant: Pages that match a relationship index are relevant, and those that do not are irrelevant. Irrelevant web pages are discarded completely from analysis.

Partition the Environment into Blocks: The environment is subdivided into a plurality of blocks that are arranged based on managerial hierarchical levels as follows:

Each search pattern restricts the geometric rate of growth of the Internet searchable environment by creating the relevant environment that is used by all managerial relationship levels when purifying the search process.

The Internet searchable environment is considered a Super Block and is partitioned into a three level managerial hierarchy. First: the primary index relationship creates blocks that maps an improved environment. Second: the secondary index relationship creates sub blocks that maps an optimal environment. Third: the tertiary index relationship creates mini Blocks that maps an optimal solution.

Identifies Static Search Patterns: The computer network system determines if the search pattern already exist and if yes obtains the top (n) pages from the databases and sends the output to the end user.

Calculates Dynamic Search Patterns: Uses managerial hierarchical relationship indices to create optimal size partitions and compares remaining key featured associations to determine if they match against the content of the top (n) pages. When a match occurs each page is gain factored by each key featured association vector value and then the optimizer picks the top (n) pages with the highest values.

Finds New Search Patterns: Stores each new search patterns and top (n) pages.

Displays Top (n) pages: Sends and displays the output to the end user's terminal.

Related Applications (U.S. patent application Ser. No. 12/146,420/Issued U.S. Pat. No. 7,908,263)

A search engine optimizer, hereinafter referred as Cholti, gathers interactive input from a browser. The optimizer reorganizes the interactive input as optimal input that is sent to the search engine, and then the output is sent to the end user. Each request is converted into a search pattern and stored as a mathematical equation that mimics the left (linguistics) and right (geospatial) side of the brain.

Related Applications (U.S. patent application Ser. No. 12/785,122/Issued U.S. Pat. No. 8,386,456)

Lottery Mathematics: Cholti and XCommerce teaches how to improve accuracy of a requests by using independent variables (I, J or K) to map and create managerial hierarchical partitions of the Internet environment such as: from top to bottom Superset (I), Set (I, J) and Subset (I, J, K) datasets. For this application Lottery Mathematics is hereinafter referred to as Logic Mathematics.

Hot and Cold Analysis: Uses logic mathematics to estimate the size of the environment as the end user types interactive input and assigns primary independent variable (I) to the filter with the following formula: $(x!-(x-6)!)/6!$ For example: the number of permutations for a 10 number draw is $(10!-4!)/6!$ $4!=24$, $6!=720$ and $10!=3,628,800$. $(3,628,800/24)/720=210$ permutations. Thus, each grid has 1/210 in being the outcome. The English language estimated master index size of the environment in the year 2013 is Logic_305_Basis or 1,099,511,627,776 or $(2^{40})$ pages hereinafter for simplicity 1 trillion.

For example: The number of permutations for a 305 number draw is 1 trillion or $305!-(305-6)!/6!$ The quality of the Glyph that represents (I) or primary index relationship determines the Mass. For example, If the keyword Civil=(I) the Mass=1, and if cluster "American Civil War"=(I) the Mass=2.

TABLE 1

Size of environment based on Mass

| | |
|---|---|
| a. | Mass = 0 (Logic_305_Basis = 1 trillion) or 305! – (305 – 6)!/6! |
| b. | Mass = 1 (Logic_100_Basis = 1,192,052,400) or 100! – (100 – 6)!/6! |
| c. | Mass = 2 (Logic_70_Basis = 131,115,985) or 70! – (70 – 6)!/6! |
| d. | Mass = 3 (Logic_50_Basis = 15,890,700) or 50! – (50 – 6)!/6! |
| e. | Mass = 4 (Logic_40_Basis = 3,838,380) or 40! – (40 – 6)!/6! |
| f. | Mass = 5 (Logic_30_Basis = 593,775) or 30! – (30 – 6)!/6! |
| g. | Mass = 6 (Logic_20_Basis = 38,760) or 20! – (20 – 6)!/6! |
| h. | Mass = 7 (Logic_15_Basis = 5,005) or 10! – (10 – 6)!/6! |
| i. | Mass = 8 (Logic_6_Basis = 1) or final destination. |

I. Simulating the Human Brain:

Human Brain: Each linguistic Glyph is assigned to the left side [L] of the brain and each geospatial Glyph is assigned to the right side [R] of the brain and the Anchor is the best common denominator Glyph.

The dominant tendency of each request is given a left side brain [L] linguistic, and right side brain [R] geospatial tendency, and then Cholti reorganizes, maps and plots the glyphs to create a managerial hierarchical relationship index.

Human Brain Intelligence: transforms each search pattern and identifies independent variables based on mass partitions of the Internet and creates Join, Simple, Hybrid, complex and optimal Pyramids.

Human Brain Wisdom: Analyzes the top (n) pages and expands each [AX], [BX] and [CX] Glyph equation with key featured association dependent variables.

Cholti picks one of four search strategies: [LL], [LR], [RL], and [RR], which have different set of business rules to analyze the Internet and limits partitions not to exceed 1 billion or $(2^{30})$ pages and thus eliminates the principal confounding variable, which is the exponential rate of growth of the environment.

For example, the environment grows geometrically to 20 billion, or 40 billion or 100 billion or 1 trillion pages, but once the dominant tendency is selected the relevant environment will always be a Logic_100_Basis or 1,192,052,400 pages, while making most pages irrelevant.

II. [L+R] Managerial Relationship Events

If the independent variable (I) is represented by the Historical Event "American Civil War" {1863}, where "American Civil War" is the left side of the brain variable (I) and 1863 is the right side of the brain (X), and are merged to a single event or superset (I!) with Mass=3. The double event or set (I, J)!! with mass=5 and independent variables (I, J, X, Y), and finally for triple event or Subset (I, J, K)!!! with Mass=8 consisting of left side of the brain [L] independent variables (I, J, K) and right side of the brain [R] independent variables (X, Y, Z).

First Significant Event or (FSE): is a vague search that maps an improved environment, where the Internet searchable environment (a, b, c, d, e, f) becomes (FSE, b, c, d, e, f) with superset (I) dataset. IV is the abbreviation for independent variables.

TABLE 2

FSE Size of environment based on Mass

| | |
|---|---|
| a. | Mass = 1 (Logic_100_IV_1 or 75,287,520) or 100! – (100 – 5)!/5! |
| b. | Mass = 2 (Logic_70_IV_1 or 12,103,014) or 70! – (70 – 5)!/5! |
| c. | Mass = 3 (Logic_50_IV_1 or 2,118,760) or 50! – (50 – 5)!/5! |

Second Significant Event or (SSE) is a concise search that maps an optimal environment, where the Internet search environment (a, b, c, d, e, f) becomes (FSE, SSE, c, d, e, f) with Set (I, J) dataset.

TABLE 3

SSE Size of environment based on Mass

| | |
|---|---|
| a. | Mass = 1 (Logic_100_IV_2 or 3,921,225) or 100! – (100 – 4)!/4! |
| b. | Mass = 2 (Logic_70_IV_2 or 916,895) or 70! – (70 – 4)!/4! |
| c. | Mass = 3 (Logic_50_IV_2 or 230,300) or 50! – (50 – 4)!/4! |
| d. | Mass = 4 (Logic_40_IV_2 or 91,390) or 40! – (40 – 4)!/4! |
| e. | Mass = 5 (Logic_30_IV_2 or 27,405) or 30! – (30 – 4)!/4! |

Third Significant Event or (TSE) is a precise search that maps an optimal solution, where the Internet environment (a, b, c, d, e, f) becomes (FSE, SSE, TSE, d, e, f) with Subset (I, J, K) dataset.

TABLE 4

TSE Size of environment based on Mass

| | |
|---|---|
| a. | Mass = 1 (Logic_100_IV_3 or 161,700) or 100! − (100 − 3)!/3! |
| b. | Mass = 2 (Logic_70_IV_3 or 54,740) or 70! − (70 − 3)!/3! |
| c. | Mass = 3 (Logic_50_IV_3 or 19,600) or 50! − (50 − 3)!/3! |
| d. | Mass = 4 (Logic_40_IV_3 or 9,880) or 40! − (40 − 3)!/3! |
| e. | Mass = 5 (Logic_30_IV_3 or 4,060) or 30! − (30 − 3)!/3! |
| f. | Mass = 6 (Logic_20_IV_3 or 1,140) or 20! − (20 − 3)!/3! |
| g. | Mass = 7 (Logic_15_IV_3 or 445) or 10! − (10 − 3)!/3! |

Fourth Significant Event or (QSE) is a search that maps the optimal answer. The Internet environment (a, b, c, d, e, f) becomes optimal answer (FSE, SSE, TSE, QSE, e, f).

TABLE 5

QSE Size of environment based on Mass

| | |
|---|---|
| a. | Mass = 1 (Logic_100_IV_4 or 4,950) or 100! − (100 − 2)!/2! |
| b. | Mass = 2 (Logic_70_IV_4 or 2,415) or 70! − (70 − 2)!/2! |
| c. | Mass = 3 (Logic_50_IV_4 or 1,225) or 50! − (50 − 2)!/2! |
| d. | Mass = 4 (Logic_40_IV_4 or 780) or 40! − (40 − 2)!/2! |
| e. | Mass = 5 (Logic_30_IV_4 or 435) or 30! − (30 − 2)!/2! |
| f. | Mass = 6 (Logic_20_IV_4 or 190) or 20! − (20 − 2)!/2! |
| g. | Mass = 7 (Logic_15_IV_4 or 45) or 10! − (10 − 2)!/2! |

Gamma Functions

Cholti and XCommerce teach how to create search patterns that improve the accuracy of a request. The likely and unlikely analysis uses Gamma functions to solve for the size of the environment.

For example, the end user types 1863 American Civil War, and the optimizer maps using left side of the brain [L] term cluster "American Civil War" and with right side of the brain [R] 1863 to create "American Civil War" {1863}. The "War between the States" is also synonymous with the American Civil War, and thus "between the" which are dependent variables since they have a Mass less than 1. The dominant tendency and the keyword "States" which has a Mass of 1+ is likely. The keywords {1861, 1862, 1864 and 1865) are Unlikely. The likely and unlikely Gamma function values are as follows: "American Civil War" {1863}=50!-(50-5)!/5! or 2,118,760 pages. Plus "States" likely analysis: =49.9!-(49.9-5)!/5! or 2,096,762 pages. Plus unlikely analysis: =49.86!-(49.86-5)!/5! or 2,088,014 pages.

Search Pattern Variables

Independent Variables: The IV Numbers are the control variables or independent variables that determine the Circle of Accuracy, which in turn limit the size of the environment.

Dependent Variables: The Dependent Variables (hereinafter DV) Numbers are the observable variables or dependent variables, and are considered strong filters.

Complement Variables: The Complement Variables (hereinafter CV) Numbers are the measured variables or dependent variables, and are considered weak filters.

TABLE 6

Gamma function adjustment of the Logic Basis

| | | | |
|---|---|---|---|
| a. | Independent/Control Variables | (IV Numbers) | +1.00 |
| b. | Dependent/Observable Variables | (DV Numbers) | +0.100 |
| c. | Dependent/Complement Variables | (CV Numbers) | +0.010 |

Partial Differential Equations: When using partial differential equations usually the solution is not unique due to the fluid and dynamic conditions of the search process, and ergo input combination usage behavior directly affects the size of the environment (or boundary of the region) where the solution is defined.

Related Applications (U.S. patent application Ser. No. 11/085,678)

The Valorized Optimal Advertisement 2013 maximizes customer satisfaction and measures accuracy and media value to the corporate sponsor as follows:

Rule #1 GPS Location: Obtains GPS coordinates from smart devices or approximates Area Code, and Zip Code based on IP Address or end user preferences.

Rule #2 Credits: May be purchased, obtained from viewing advertisements or purchasing products, or consensual sharing information with corporate sponsors.

Rule #3 Commercial Glyph: Identifies usage patterns and then match between corporation and individual based on a profile that uses demographics and purchase patterns.

Rule #4 Anonymous: The individual information is kept anonymous.

Rule #5 Consensual: By means of command instruction decisions the individual grants permission of what exact information is disclosed in return for financial compensation.

Rule #6 End User Profile: Shopping cart correlates purchasing, trending and usage patterns with actual advertisement command instruction decision and demographics.

Rule #7: Links: Based on the End User's Profile and the commercial glyph the shopping cart offers targeted links that yield sponsored web pages;

Rule #8: ANI: Based on the End User's Profile and the commercial glyph the shopping cart offers targeted Automatic Number Identification (ANI) that instantiates a call between End User and Sponsor;

Rule #9: Safety: For each financial transaction the shopping cart obtains GPS location, device specific information, and when required a photograph and password.

Rule #10: Territories and Laws: Limit what advertisements are available.

Rule #11: summary report: The shopping cart uses the managerial hierarchical relationship index to obtain the human brain equation that contains the probabilistic weight of each valid Glyph to gain factor or attenuate advertisements decisions.

Related Applications (U.S. patent application Ser. No. 13/247,964)

Simulation Comparison

'Boolean Algebra: End user types the input "Napoleon" or (I) and the inductive reasoning search engine assigns a "1" when a match occurs, and sums up the number of unique occurrences which is equal to 8,000,000 pages. Like always there is good, bad and ugly content. Based, on the business model of the search engine companies the lion share of their profit comes from advertisement, we will assign as (J) the commercialization process, which shrinks the environment to 10,000 pages, and the further distill by using the page quality value to create an environment of 100 pages. At this point, selecting the top (n) result is really easy, by just automatically selecting the pages with the highest page rank and then sends the output to the end user's browser. In this case, the top site will always be wikipedia.com since Ask.com and Powerset technologies made a great emphasis of the content quality value of this site and then search engine industry followed. Encyclopedia Britannica is (2) and Encarta is (3) have a 10 in quality value and have a very high page rank.

Cholti: determines that "Napoleon" is the anchor and commercial keyword and using the human brain strategy creates an [LL] environment of 8,000,000 pages that possess Super Site (a, b, c) characteristics, which is used to create the Simple Pyramid and [AX] macro page that converts "Napoleon" into "Napoleon Bonaparte" and adds "France", "General" and "Emperor" to the Advanced Glyph equation with magnitude of 7. At this point Cholti uses super site (d) actual content characteristics, to create the hybrid pyramid and [BX] macro page that adds "Austerlitz", "Waterloo", "Blucher" and "Wellington", and "1801 to 1815" to the improved Glyph equation with magnitude of 10. Cholti now uses super site (e) trending characteristics, to create the complex and [CX] macro page that adds a collection of key featured associations to the optimal Glyph equation with magnitude of 15. Now Cholti performs the 'cherry picking' process to select the top (n) pages by reading, deciphering, analyzing the actual content.

The Real Difference: Wikipedia.com will always be the optimal web page for the static and vague search, whereas Cholti has three paths (a) (static ranking) for concise searches Wikipedia.com is automatically the optimal response, (b) (actual content) for precise searches if the end user typed additional keywords, and Cholti determines that Encyclopedia Britannica is the best fit content, then Wikipedia.com is demoted from the automatic $1^{st}$ position and sent to the $2^{nd}$ position. (c) (TQM levels of satisfaction) for optimal searches where wikipedia.com had the top spot, but did not satisfy, and after the $2^{nd}$ request Encyclopedia Britannica had the top spot, and also did not satisfy, for the $3^{rd}$ request the top responses for the request (1-2) are demoted, and now Encarta Encyclopedia the other high quality content has the top spot.

Cholti is dynamic and personalized whereas existing search engines are static. TQM is the heart and soul of the technology and thus customer satisfaction. Yes, accuracy is directly related to the time from beginning to end, and the amount of knowledge and work required from the end user to reach the final destination, Cholti previews the entire content in behalf of the human to minimize time and using deductive reasoning reduces the amount of gray matter required to reach the final destination to maximize satisfaction.

The present inventions overcomes these "issues" or greatly improved the search optimally by doing the following: Generally stated end user's requests are converted into the Mayan style glyphs that have left side and right side of the brain characteristics. The system understands that each request on its own can be optimally satisfying, and also knows that some require trial and error method. To solve this dilemma the optimizer creates super glyphs that have weighted value for a plurality of instances within a session.

Cholti Method 2013

Build the Summary Report Objects

A. Simulate entire superset of potential valid interactive input regular expression construed during an Internet browser search and then organizing and distributing the searchable environment using at least one index relationship and then hierarchically creating a chain of command comprising of super blocks, blocks, sub blocks, mini blocks and elements. Index refining each position to create a partial master index that maps an improved environment and then assigning a unique value from highest to lowest to each site and web page.

Create the Search Patterns

B. Assigning to each unit (or position) of the chain of command a search pattern.

C. Storing each valid search pattern into the 'CORE List' database.

D. Setting a vector value to search pattern based on estimated environment size and the partitioning the interactive input into keywords and clusters that are transformed into glyphs. Then assigning a vector value to each Glyph depending if they are independent, dependent or complement variables. Independent variables are synonymous with index relationships.

Create the Improved Environments

E. Each position of the chain of command is a partition of the Internet searchable environment and can be referenced from the 'CORE List' using index relationships. The index relationships of each search pattern are used to create an improved environment.

F. Assigning a unique value lowest to highest each site and web page belonging to each position of the chain of command or unit object.

Likelihood Analysis

G. The simulation measures inductively each position using the Likelihood Analysis applying associative and transitive relationships to synthesize linguistic and geospatial information key featured associations. The key featured associations and transitives are dependent and complement variables that are used to gain factor the vector value of each page.

Relevancy Analysis

H. The simulation measures deductively each position using the relevancy analysis applying associative and transitive relationships to identify confounding variables. Assigning to each unit object a feedback equation that attenuates content with confounding variables in order to stabilize and reduces sensitivity parameter variations due to the environment.

Store the Information of Each Position (or Unit Object)

I. The simulation assigns a unique value lowest to highest each site and web page, a gains factor value for each Glyph belonging to key featured association and feedback equation, and stores the latest top (n) results or summary report in the 'CORE LIST' database.

Interactive Input

A. Identify each keyword and cluster interactively belonging to the input and immediately convert input into index relationships.

B. Query the 'CORE LIST' to map the most probable position (or unit object).

C. Display to end user the estimated environment size of the input and the improved environment size using the most probable position.

Static Output: Determine if the most probable position contains the final destination and if yes then Display to the end user the summary report object. The output is readily available and preprocessed no further calculations are required.

Dynamic Output: obtains the key featured association and transitives and feedback equation of the most probable position (or unit object) and correlate the results. The assign a vector value to each page, using the hot algorithm that applies the resultant key featured association equation to gain factor each page and the cold algorithm resultant feedback equation that attenuates the vector value of each page.

D. Display to end user the top (n) results with the highest vector value.

Assisted Input

A. Identify each keyword interactively and offer assisted input command instruction to the end user. Each assisted input maps the index relationship belonging to a unit object.

B. Obtain decision from end user and the selected unit object from 'CORE List'

C. Display to end user the estimated environment size of the assisted input and the improved environment size of the unit object (or position).

D. Display to the end user static output.

Smart Input

A. Obtain the right side of the brain check mate combination GPS coordinates and identify the commercial Glyph of the interactive input. Then transform the commercial Glyph and GPS coordinates into smart input and derive the index relationship that maps a unit object.

B. Query the 'CORE LIST' to map the most probable unit objects.

C. Display to end user the estimated environment size of the smart input and the improved environment size of the unit object.

D. Determine if a valid Static output exist . . . If yes the output is readily available and no further calculations are required. If no create the dynamic output and display Personal Input A. Identify interactive, assisted and smart input and convert input into an index relationship that maps a unit object (or position).

B. Query the 'CORE LIST' to map the most probable position.

C. Offer a Personal Input list of command instruction to the end user. Each element of the list is obtained by performing the hot/cold analysis of the most probable position.

D. Obtain Personal input decisions from end user.

E. Interactively display to end user the estimated environment size of the personalized input and the improved environment of the unit object (or position).

F. Once the confounding variables are eliminated from the search process Display to the end user the final destination and no further calculations are required.

Improved Environment (Simplification)

Once input maps a search pattern with at least one index relationship the environment is considered to be improved. The primary index relationship based on dominant tendency is the anchor that picks a relevant environment that was built using a reverse chain of command algorithm to map between 1 or 2 billion pages. For example, an animal would include vertebrate or invertebrate, mammals or birds.

For example, when Tiger is selected at least one relevant environment is available, first is Animal relevant environment, another is the Military relevant environment, and finally the Sports relevant environment. Animal is [LL], Military is [LR], and Sports [RR] search patterns. Why do you ask? Well [LL] is Tiger that is an animal, whereas [LR] is a tank that was used in WWII (1939-1945), whereas [RL] Detroit Tigers is a commercial Glyph or smart input that contains a right brain checkmate. Nevertheless, each unit objects of Tiger yield an improved environment, since each valid unit object is considered its own environment. Each improved environment has a partial master index that maps each page and site with a value.

Optimal Solution

Once the input of a search pattern yield the final destination, the human brain has a left side and right side checkmate combination that yields an optimal element or a single page where n=1. Thus, the top (n) results belonging to any position of the entire valid superset of keyword regular expressions chain of command is an optimal solution. When n=1 the search pattern is considered a Direct search.

BRIEF SUMMARY OF THE INVENTION

Existing Boolean algebra search engines mimics inductive reasoning Watson like criminal investigation methods to find the best results, whereas the HIVE solves for the optimal answer using Sherlock Holmes deductive reasoning approach to decipher the content of each page to find the final destination within the best results.

The Internet searchable environment must be organized by the HIVE supercomputer into a chain of command comprising of superblocks, blocks, sub blocks, mini blocks and elements depending on the amount of independent variables contained in each search pattern. Each position of the chain of command belonging to the entire superset of regular expressions is stored in the 'CORE List' database. The HIVE upon detecting a new valid and unique input creates a new unit object in the 'CORE List' database.

The optimizer system is the client side of the architecture and behaves in the same manner as traditional browser that is able to identify interactive input and map the input into a search pattern. Now the search pattern module obtains the static or dynamic output derived from the most probable unit object for the search pattern. The output is sent to the end user browser and displays the top (n) result on the end user's browser require no further calculation and bypassing the search engine capacities.

Each unit object search pattern contains the independent variables to create the improved environment, the key featured association and feedback equations, and summary report object or the preprocessed top (n) results.

The left side of the brain equation is a managerial hierarchical index relationship dataset, hereinafter referred as the dataset module, which creates the improved environment using rules of linguistics and semantics. The right side of the brain equation is the secondary method, which creates the improved environment by using geospatial information. Each time, the optimizer system, detects a significant change, the dataset module, updates search pattern module. The shopping cart system interacts with the user via the Assist module that facilitates a list of assist input command instructions that refine the interactive input. Furthermore, the human brain module upon detecting commercial input inserts smart input and the corresponding GPS information. Finally, the human brain module facilitates a list of TQM personal input command instruction that eliminate the confounding elements of the search process.

The optimizer and shopping cart systems, continuously measures the interactive input and will show a (+), (++), (+++) or its graphical equivalent to notify by how much can the Assist module, can improve the search. (+) denote independent variables. When the shopping cart figures out a direct request it will display a (++++++) or its graphical equivalent to inform the user the final destination was found. The human brain module is designed to find the final destination. This is done before, now, or after a search or direct search is executed when the user is interacting with the search engine optimizer system to improve the search.

The optimizer systems has the data mining module that "Cherry Picks" the best results, and then dynamically updates the dataset module, while randomly surfing the web. The shopping cart system upon obtaining from the human brain module a direct search (++++++) command instruction that yields the final destination, facilitates the sales module that puts buyers and sellers together.

The sales module performs financial transactions using X_FOB and Y_CDIF methods. The X_FOB method furnishes free content, offers paid content using the proceeds derived from the advertisement module, and makes the paid product available upon the checkout command instruction is received, and the transaction is executed and the user is TQM satisfied.

The Y_CDIF method makes best P/U product, and Y_CDIF Rush makes best rush P/U product available upon the checkout command instruction is received, and the transaction is executed and the user is TQM satisfied.

The advertisement module displays advertisement to the end user and compensates them with credits or currency for watching or sharing their information and feedback to the corporate sponsor. The credits in turn can be used to purchase licensed P2P audio, digital and video works. The sales module maintains in real time inventory control of product and licenses, manages credits and funds, and also keeps tract of command instructions, works and advertisements the end user downloads, selects, picks, plays and reviews.

The advertisement module offers a list of corporate sponsors command instruction comprising targeted links and target ANI arranged and prioritized using supply side economics (bids). Furthermore, displays targeted advertisements to view free content, valorized optimal advertisements to view and make consent or advertisement decisions that permit the sharing of information with corporate sponsor and in turn receive credits or currency to view, download or purchase intellectual property audio, digital and video works for free or at a discounted price.

These and other features, aspects, and advantages of the invention will be further understood and appreciated by those skilled in the art by reference to the following written specification, claims and appended drawings.

BRIEF DESCRIPTION OF THE DRAWINGS

Various exemplary embodiments of this disclosure will be described in detail with reference to the following figures, wherein:

FIG. 5 presents an exemplary search engine optimizer system interacting with user via a browser;

FIG. 6 presents another exemplary search engine optimizer system interacting with user via a browser;

FIG. 7 presents another exemplary search engine optimizer system interacting with user via a browser;

FIGS. 9A-9D present an exemplary assist module diagram that measures accuracy based on assist input;

FIGS. 10A-10D present an exemplary assist module diagram that measures accuracy based on command instructions;

FIGS. 11A-11D present an exemplary assist module diagram that builds assisted input;

FIGS. 12A-12D present an exemplary human brain module diagram that measures accuracy based on command instructions;

FIGS. 14A-14D present an exemplary human brain module diagram that interactively builds input;

FIGS. 16A-16D present an exemplary human brain module diagram that builds a direct search;

FIGS. 17A-17D present an exemplary shopping cart system that measures the accuracy of smart input;

FIGS. 18A-18D present exemplary shopping cart system that measures the accuracy of personal input;

FIGS. 19A-19D present another exemplary shopping cart system that measures the accuracy of personal input;

Like reference numerals refer to like parts throughout the various views of the drawings.

DETAILED DESCRIPTION OF EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention by commonly known definitions. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
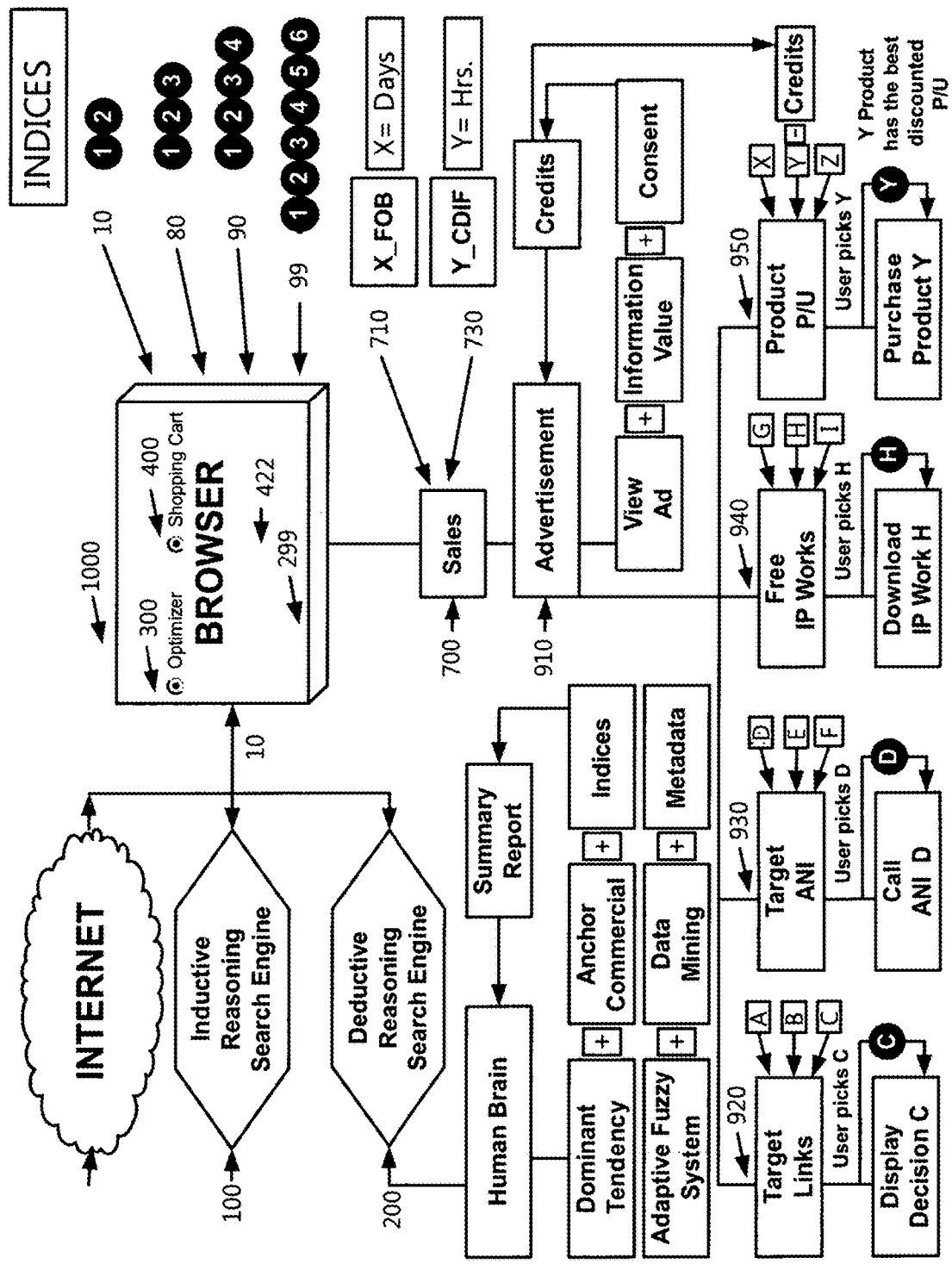
FIG. 1 presents an exemplary integrate shopping cart and optimizer system.

FIG. 1 presents an exemplary integrated shopping cart and optimizer 1000 system using the Internet searchable environment 1 comprising of an optimizer 300 and shopping cart 400 that transform interactive, assisted and smart input (10, 80, 90) into personal input 99.

The interactive, assisted, smart and personal input (10, 80, 90, 99) uses inductive reasoning 100 and deductive reasoning 200 search engines in order find index relationships that optimally shrink the size of the environment. The human brain equation correlates left brain [L] English language and right brain [R] geospatial key featured association equation that gain factors the Top Results 199, and then using deductive reasoning feedback glyphs equation 422 that attenuates content with confounding variables in order to stabilize and reduces sensitivity parameter variations due to the environment determines the final destination 299. Responsive to the interactive, assisted, smart and personal input (10, 80, 90, 99) upon determining the user's intent to perform a financial transaction the sales module 700, puts buyers and sellers together using X_FOB 710 and Y_CDIF 730 methods.

The advertisement module 910 uses interactive, assisted, smart and personal input (10, 80, 90, 99) summary report objects 299 to figure out the best target links 920, target ANI 930, targeted advertisements 940 to view free content, valorized optimal advertisements 950 to consensually view, TQM rate and make command instruction that permit the sharing of information with corporate sponsor and in turn receive credits or currency to view, download or purchase intellectual property audio, digital and video works for free or at a discounted price.

The shopping cart system 400 offering a list of target links 920 and billing the corporate link owner upon detecting the command instruction decision to display the link. For example, the end user is shown a list of corporate sponsor links (A, B, C). End user selects command instruction C, sending the user to corporate sponsor link C. The advertisement module 910 now bills corporate sponsor C, for performing the targeted advertisement.

The shopping cart system 400 offering a list of target ANI 930 and billing the corporate ANI owner upon detecting the command instruction decision that instantiates a call. For example, the end user is shown a list of corporate sponsor ANI or telephone numbers (D, E, F). End user selects command instruction D, now a call is instantiate between end user (origin) and corporate ANI D (destination). The advertisement module 910 now bills corporate sponsor D, for performing the targeted telephone call.

The shopping cart system 400 offering a list of links with free IP works 940 and bills the Site owner upon detecting the command instruction decision to display the link. For example, the end user is shown a list of corporate sponsors that will pay for a free view, listen and/or download of a licensed IP digital, audio or video work (G, H, I). End user selects command instruction H, views the corporate sponsor H advertisement. The advertisement module 910 now bills corporate sponsor H, for showcasing their advertisement, and the end user can freely view, listen and/or download the licensed IP digital, audio or video work that corporate sponsor H purchased.

The shopping cart system 400 offering a list of valorized optimal advertisement 950 with a list of available discount prices upon using coupons, watching sponsored advertisement, and or sharing personal information with corporate sponsor using X_FOB 710 and Y_CDIF 730 methods. For example, the End user is shown a list of corporate sponsors that will pay for a free view, listen and/or download of a licensed IP digital, audio or video work (X, Y, Z). End user selects command instruction Y, views the corporate sponsor Y advertisement. The advertisement module 910 now bills corporate sponsor Y, for showcasing their advertisement, and the end user can freely view, listen and/or download the licensed IP digital, audio or video work that corporate sponsor Y purchased.

At this point, the end user decides to purchase the product that paid for the free license. Instantiating a transactional advertisement and the end user will receive further credits should they consent to share information with corporate sponsor X. The shopping cart system 400 will negotiate for the best P/U, and request for additional licensing credits based on the sale. Let us suppose, corporate sponsor X campaign credits the end user with 50 cents for viewing their advertisement, and may credit the end user up to 1 dollar depending on the amount of shared information while filling a survey. Now, then what if the end user decides to purchase 100 products, and due to the dollar amount of the sale the user may wind up receiving shipping and handling free, supplement credits to purchase more licensed IP digital, audio or video works, and of course a better P/U. The shopping cart system 400 in this case can document that corporate sponsor X advertisement was displayed, and as a direct consequence the end user consented to purchase 100 products from corporate sponsor X. The advertisement module 910 and the sales module 700 collaborated in performing a documented transactional advertisement.

Figure 2:
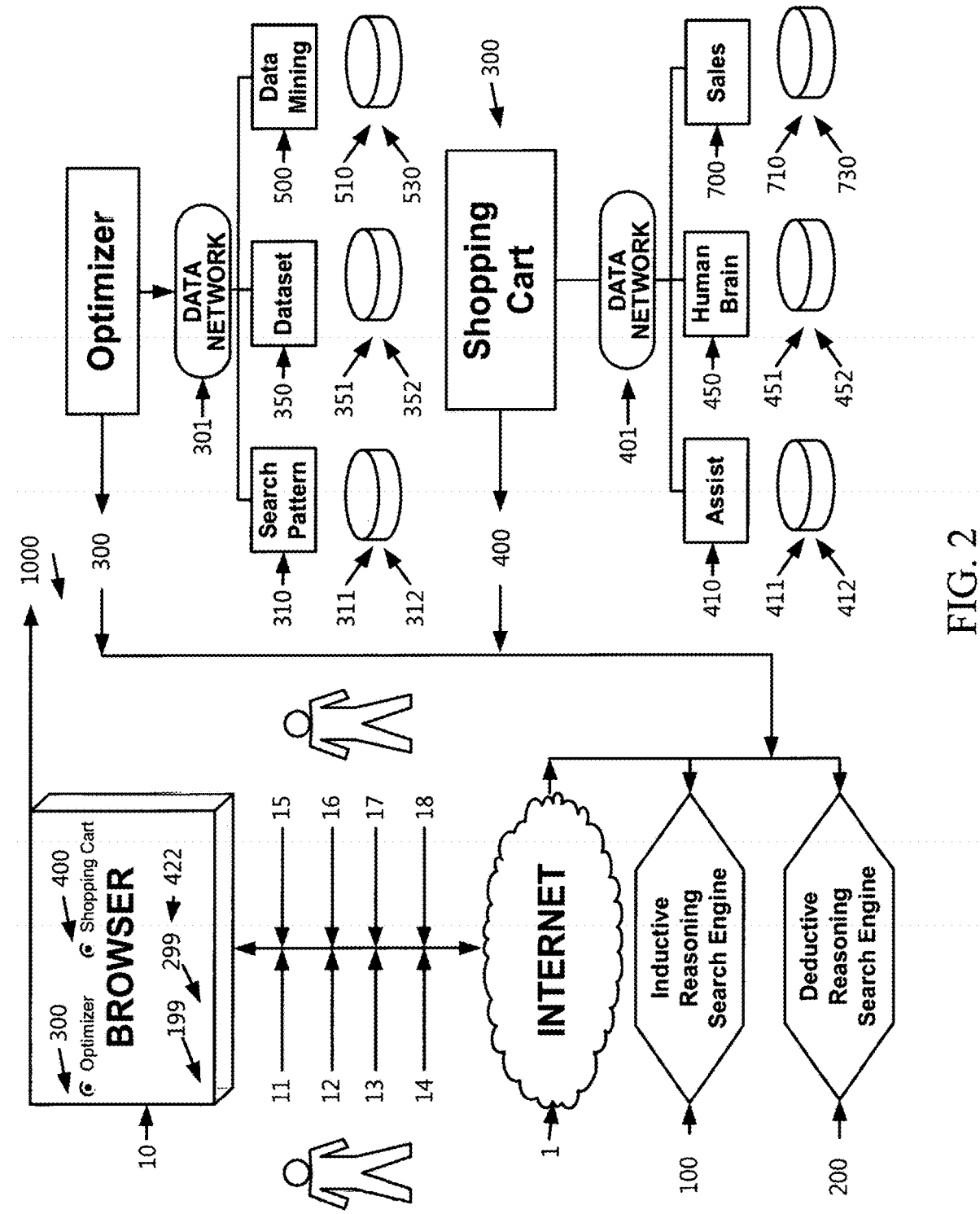
FIG. 2 presents an exemplary search engine optimizer system

FIG. 2 presents an exemplary search engine optimizer 1000 system using the Internet searchable environment 1 comprising of an optimizer 300 and a shopping cart 400 system working in parallel that includes terminals 11, 12, 13, 14, 15, 16, 17, 18 computers, inductive reasoning 100, and deductive reasoning search engines 200, computer networks 301 and 401. The optimizer system 300 has a computer network 301 consisting of search pattern 310, dataset 350, data mining modules 500, with databases 311, 312, 351, 352, 510, and 530. The shopping cart system 400 has a computer network 401 consisting of assist 410, human brain 450, and sales modules 700, with databases 411, 412, 451, 452, 710, and 730. As used herein, the term "module" is intended to include one or more computers configured to execute one or more software programs configured to perform one or more functions.

As used herein, the term "computer" is intended to include any data processing device, such as a desktop computer, a laptop computer, a mainframe computer, a parallel cluster supercomputer, a server, a hand held device, or any such device able to process data. The aforementioned components of the search engine optimizer system 1000 represent computer hardware and/or computer-implemented software configured to perform the function described in detail within below. The components of the search engine optimizer system 1000 may be implemented on one or more communicatively connected computers.

The term "communicatively connected" is intended to include, but is not limited to, any type of connection, whether wired or wireless, in which data may be communicated, including, for example, a connection between devices and/or programs within a single computer or between devices and/or programs on separate computers.

As used herein, the term "inductive reasoning" search engine 100 is intended to include any search engine supercomputer that ranks and measure the popularity score of each Site and Page belonging to Internet searchable environment 1 and performs "static searches". As used herein, the term "static search" is intended to include a single search, whereas the term "dynamic search" comprises one or more searches belonging to a session. "static searches" use glyphs, and "dynamic searches" use super glyphs. The term "glyph" comprises the statistical vector components of a valid keyword and/or clusters that are used to identify relevant pages. The term cluster is a combination of two or more words that placed in an exact order have a significant meaning. For example, the "American", "Of", "States" and "United" is best known for the cluster "United States of America". The term "super glyph" is applied to glyphs that are gain factored when using the hot/cold analyses of the incorporated references.

As used herein, the term "deductive reasoning" search engine 200 is a method for simulating the entire potential superset of interactive input 10 mapping each position (or unit object) of the chain of command with a search pattern. Each search pattern may have up to six index relationships that are used to plot each unit object that create an improved environment. Each search pattern has a key featured association and feedback used to probabilistically weight the improved environment, converting the results sets into a summary reports object that enables efficient and accurate searching. Each index relationships eliminate pages from the search process, and dependent and complement variables to gain factors pages.

Before any calculation the Internet searchable environment 1 is partitioned using language, and then divided into four quadrants, that mimic the human brain. The left brain uses linguistic and the right brain geospatial index relationships to create improved environment. The anchor or primary index relationship is the best common denominator filter.

The optimizer 300 is communicatively connected to a browser 10 by users 11, 12, 13, 14, 15, 16, 17, 18 while they are performing a web search. The search pattern module 310 scans, distills and converts interactive input during a web search into keywords and term clusters that are then transformed into vector glyphs. The dataset module 350 arranges, analyzes, and prioritizes glyphs into a managerial hierarchical index relationship.

Index relationships create improved environments. The data mining module 500 analyzes and weights each document by paragraph and sentence using the key featured association and feedback equation to figure out the content value of each page. The optimizer system 300 cherry picks the top (n) pages 199 with the highest weighted value.

The shopping cart system 400 is communicatively connected to a browser 10 by users 11, 12, 13, 14, 15, 16, 17, 18 while they are performing a web search. The assist module 410 interactively facilitates a list of assisted input 80 command instructions with keywords and term clusters that simplifies building a search, and can serves as a bona fide spellchecker when encountering a misspelled word within the input. The human brain module 450 obtains the key featured association and feedback equation 422 from the 'CORE List' and measures improved environment and figures out the final destination 299. The sales module 700 performs financial transactions using X_FOB 710 and Y_CDIF 730 methods.

In operation of the search engine optimizer system 1000, a user at the terminal 11 may input a search request using the browser 10. The search request consists of interactive input 10 created or assisted input 80 copied from existing document by the user. Having received the search request from the browser 10, the terminal 11 may communicate with the search engine optimizer system 1000 via the Internet searchable environment 1 using the optimizer system 300 in accordance with the search request.

For example, for each search request, the search pattern module 310 and dataset module 350 uses index relationship to create the improved environment. Allowing the search engine optimizer system 1000 to search the databases 311-352 via the data network 301 and retrieve search results. The data mining module 500 analyzes the search results obtained from search engines 100 and 200, and perform the process of "Cherry Picking" the best responses 199. The output display is a formatted object that may be a graphical representation of the search request that is capable of being adjusted and modified by a user and by the search engine optimizer system 1000, and will be described in greater detail below. The search engine optimizer system 1000 then communicates with the terminals 11, 12, 13, 14, 15, 16, 17, 18 via the browser 10 to display the output.

In operation of the search engine optimizer system 1000, a user at the terminal 11 may input a search request using the browser 10. The search request consists of interactive input 10 created or assisted input 80 copied from existing document by the user, or the voice text equivalent obtained from smart input 90 technologies. Having received the search request from the browser 10, the terminal 11 may communicate with the search engine optimizer system 1000 via the Internet 1 and also interact with the shopping cart system 400. For example, for each search request, the shopping cart system 400 uses the assist module 410 to identify assisted input that in turn is converted into a mathematical equation that filters the Internet searchable environment 1 into an improved environment.

The human brain module 450 creates the managerial index relationship that allows the search engine optimizer system 1000 to search the databases 411, 412, 451, 452 via the data network 401 and retrieve search results. The Sale module 700 analyzes the search results obtained from search engines 100 and 200, and finds the final destination 199. Using the X_FOB method 710 that considers each page of the Internet as a no cost In hand inventory the search engine optimizer system 1000 then communicates with the terminal 11 via the 10 to display the output as well as the retrieved search results to the user. Alternatively, puts buyers and seller together using the Y_CDIF method 730 and performs a financial transaction.

The search engine optimizer system 1000 may also provide suggestions assisted input 80 and smart input 90 command instructions to the user to index refine the dataset 350. For example, the search engine optimizer system 1000 may use the data mining module 500 to analyze the search results and sales module 700 using smart input GPS coordinates to interact with the user to obtain command instructions that eliminates confounding variables to create an improved dataset 350. The improved dataset 350 and corresponding statistical information becomes the output object that is displayed on the user's browser 10.

It should be understood that responsive to the interactive input, the terminal 11 may send the changes to the search engine optimizer system 1000, repeatedly until the user is satisfied with the search results Responsive to the interactive input the terminal 11 upon determining the user's intent to perform a financial transaction the search engine optimizer system 1000, puts buyers and sellers together using X_FOB 710 and Y_CDIF 730 methods incorporated by reference.

Figure 3:
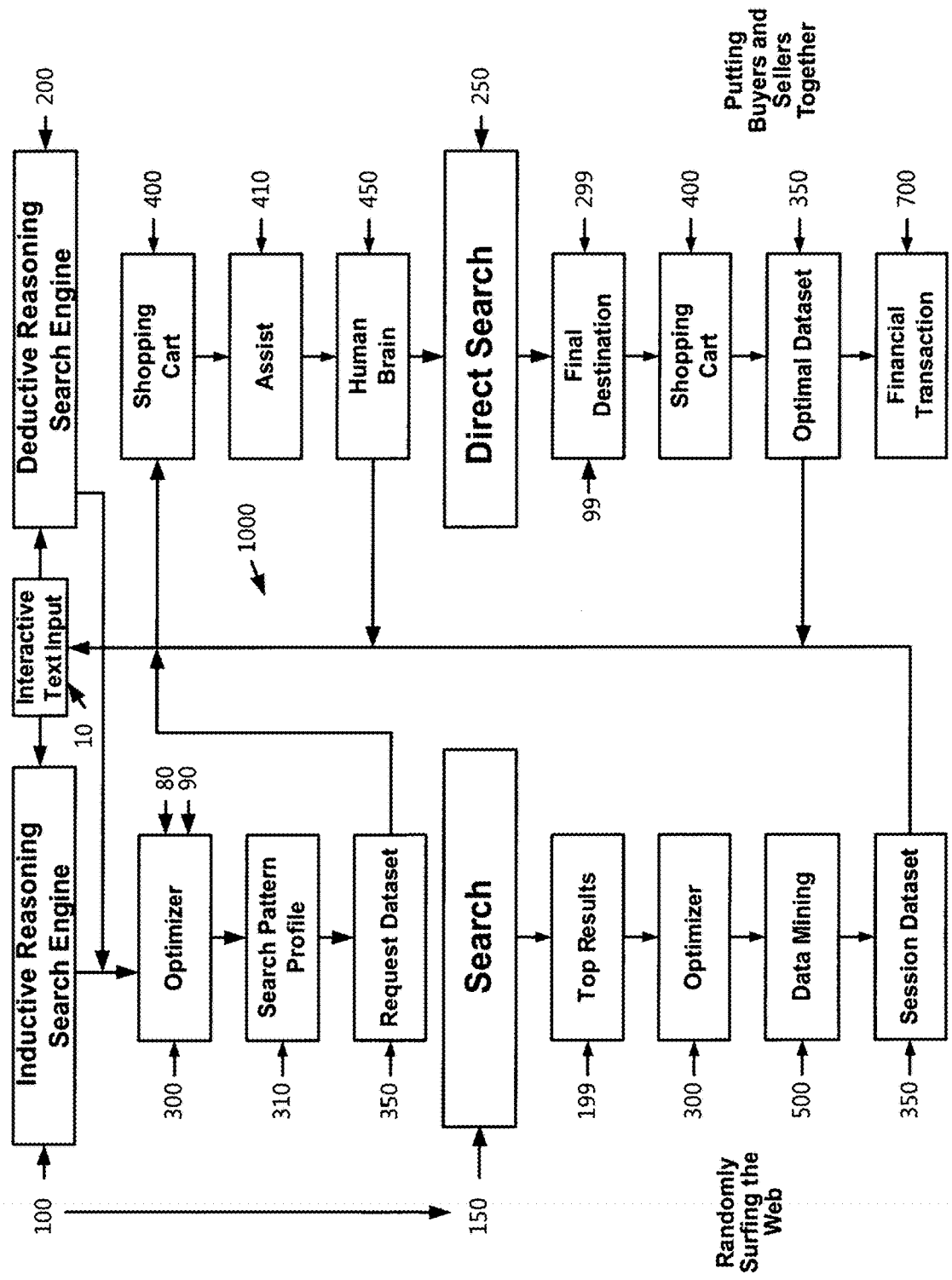
FIG. 3 presents a flow diagram outlining an exemplary process for the search engine optimizer system.

FIG. 3 presents a flow diagram of the search engine optimizer system 1000 working with an inductive reasoning search engine 100, (e.g. BING®, GOOGLE® or YAHOO®) and/or Deductive reasoning search engine 200, (e.g. XCommerce). The optimizer system 300, helps a user using an inductive reasoning search engine 100 to interactively build a search request that is broken up into keywords and clusters that are converted into glyphs. The optimizer system 300 creates a search pattern profile 310 based on the interactive input 10 entered by the user.

The search pattern profile 310 is a mathematical equation representation of the interactive input entered by the user. The search pattern profile 310 is converted into a request dataset 350. The request dataset 350 is a managerial hierarchical relationship index that maps the improved environment by index refining irrelevant pages and finding dependent and complement variables also known as key featured association to gain factor relevant pages.

Search Patterns

Each search pattern contains index relationship that map a unit object to the superset of keyword regular expressions chain of command. The index refinement process eliminates web pages from calculation to map the improved environment and creates a partial master index that ranks each page and site. Each search pattern stores the preprocessed output that is displayed on the end user's browser absent of any calculation by passing search engine capacities, and the key featured association and feedback equations that are used to measure pages.

The optimizer system 300, can also help a user using a deductive reasoning search engine 200 to interactively build a search request. Upon detecting changes in the interactive input the shopping cart system 400, is made available with a list of assisted and smart input command instructions. In this way, assisted input command instructions are readily available to begin a request. The search engine optimizer system 1000 will search in its database for assisted input 80 and smart input 90 command instructions. In this case, the assist module 410 displays a list of valid glyph that will serve as the basis of the search. This permits the end user to type . . . Am, and selects from the valid list of glyphs "American" and then to continue by typing C and from the list of valid glyphs selects "American Civil War". The assisted input 80 "American Civil War" becomes text input.

For example, the assist module 410 converts the commercial glyph "Walmart" (WALMART®) and incorporates the user's GPS location coordinates to create smart input 90. The newly created smart input 90 "Walmart" (WALMART®) becomes text input.

At any time the end user can click on the shopping cart graphical display and instantiate the human brain module 450, to help the end user using the latest request dataset 350 to create new set of command instructions that improve the accuracy and precision of the search engine optimizer system 1000. The accepted end user's instructions yield: Search 150 or direct search 250.

The search 150 is sent to either an inductive reasoning 100 or deductive reasoning search engine 200, and the top results 199 are displayed on the end user's terminal. The optimizer system 300 uses the data mining module 500 to analyze the top results 199 and creates a session dataset 350 with dynamic instead of statics values glyphs, since the first request failed to reach the final destination 299. This iterative process of randomly surfing the web may be repeated until the user is satisfied with the top results 199 that now becomes the final destination 299 and stops requiring further refinement.

The direct search 250 bypasses randomly surfing the web process and maps the final destination 299 for a final decision. Now, that the personal input 99 precisely plots output we need to know what the user really wants. The financial transaction module 700 can now perform X_FOB, a free of cost inventory in hand, financial transaction by furnishing the checkmate combination information the user wants, for example, the address Information, telephone and directions to a business location. In addition, once the final destination 299 is found the shopping cart 400 becomes a traditional cart using the financial transaction module 700 and based on the user's approved instructions puts buyer (user) and seller (best priced supplier) together and performs a Y_CDIF transaction. Note: free downloads are considered X_FOB financial transactions since they are considered free of cost Inventory In Hand.

Figure 4:
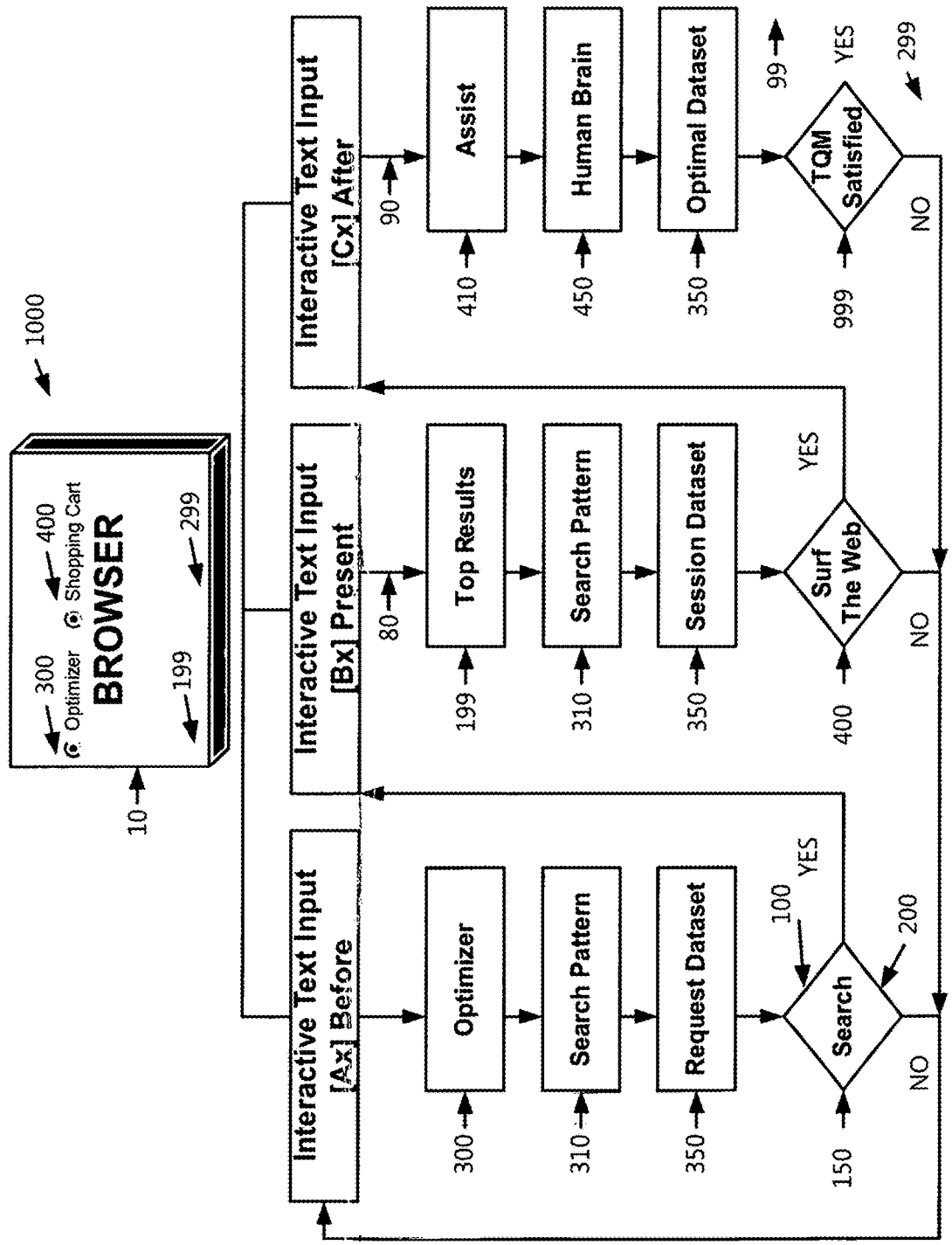
FIG. 4 presents an exemplary block diagram of the optimizer subsystem.

FIG. 4 presents an exemplary block diagram of the search engine optimizer 1000 subsystem, interacting with a user using a browser 10 in real time. Interactive analysis means at incipiency. In this case, the optimizer 300 and shopping cart 400 systems are continuously analyzing output and translating the information into the computerized version of the Mayan Cholti language, that uses the left side [L] and right side [R] of the brain to break down an idea. First: we must analyze the tense of the analysis of the interactive text analysis, and assign accuracy limits. Any initial analysis [Ax] before the search command instruction is sent to a search engine 100 or 200, and the accuracy is the lowest since it is an estimate.

A second analysis [Bx] that is automatically, performed once a search engine 100 or 200 responds with the top results 199. A post factum analysis [Cx] is performed by the human brain module 450, to identify additional key features associations. Thus, the initial analysis [Ax] is before, the second analysis [Bx] is present, and the post factum analysis [Cx] is after interactive input that solves for the top results 199.

A personal input [Dx] is the new features to the cross references related applications. The personal input [Dx] cherry picking process mirrors what Sir. Isaac Newton did by assigning limits such as zero and infinity when developing modern calculus to improve Euclidian geometry and later the quantum physics advancements Albert Einstein did for non-Euclidean geometries in particular the theory of general relativity.

To reach 100% precision, we must remove the confounding components of the search, these are assumptions that search engines 100 and 200 do not take into account, these assumptions are based on Total Quality Management levels of customer satisfaction, and thus require the system to ask and obtain confirmation command instruction, to solve for direct searches that yield the final destination 299.

What is new for the search engine optimizer system 1000, consists of the shopping cart system 400 functions that permit during the initial analysis [Ax] before, the second analysis [Bx] present, and the post factum analysis [Cx] after to eliminate the confounding variables of the search process, that will permit to solve for the final destination 299. Based on the tense the search process has implicit confounding variables: the initial analysis [Ax] before has at least 3, the second analysis [Bx] present has at least 2 and the post factum analysis [Cx] after has at least 1 confounding variables and thus Table 7 applies.

TABLE 7

Precision limits by input type

| | |
|---|---|
| [Ax] | interactive input: 2 indices with 86% accuracy and 1 million pages. |
| [Bx] | assisted input: 3 indices with 95% accuracy and 10,000 pages. |
| [Cx] | smart input: 4 indices with 99% accuracy and 100 pages. |
| [Dx] | personal input: 6 indices with 100% accuracy and 1 page. |

The interactive input [Ax] before: The optimizer system 300 scans the browser's interactive input 10, and the search pattern module 310 breaks the input into keywords and optimally into term clusters that are transformed into glyphs that are then arranged in a managerial hierarchical manner upon identify the independent variables within a request that will be used to create a request dataset 350. This process is done until the end user performs a search command instruction 150 that sends the interactive input to a search engine 100 or 200.

The assisted input [Bx] present: The optimizer system 300 now scans the top results 199, and the search pattern module 310, analyzes each page to find key featured associations and the best fit paragraph content and dynamically calculates, prioritizes, arranges and find missing gaps of information within the search pattern that will be used to create a session data 350. The static glyphs become dynamic super glyphs and the interactive input 10 becomes assisted input 80, since the search engine optimizer system 1000 will analyze at least one request belonging to a session. At this point the end user can quit the search, or use the shopping cart system 400.

The smart input [Cx] after: A NO command instruction means the user will continue to randomly surf the web and a YES activates the Assist module 410 that interact with the human brain module 450 triggering total quality management customer satisfaction command instructions feedback that eliminates confounding variables and creates the optimal dataset 350. If the optimal dataset 350 has NO checkmate combination that yields the final destination 299 the user continues randomly surfing the web the assisted input 80 becomes smart input 90. If YES the smart input 90 becomes personal input 99 and the user is TQM Satisfied 999.

Hereinafter, TQM command instructions will now become independent variables that will be used by to solve for the final destination and thus interactive text input will no longer consist of text and analysis of the top results 199, but will include decisions that eliminate confounding elements of the search process.

FIGS. 5 to 7 presents an exemplary search engine optimizer 1000 system interacting with user via a browser, where FIG. 5 reflects the flow of the original reference application, FIG. 6 its continuation and FIG. 7 what is new. Each of these figures interact with a browser 10 and the user discretion through assisted input 80 that store and display the interactive text input of an user while directly and/or randomly surfing the web. Each keyword and cluster term is converted into a glyph 20, where the first letter the side of the brain that is preferably used when solving for a solution. E denotes English language based and is used by the left side of the brain, G denotes geospatial and is used by the right side of the brain, and M denotes mixed and can be used by both sides of the brain, and D denotes total quality management decision that eliminate confounding variables of the search process.

Each request is assigned an inductive reasoning mass value 30 that ranges from 0 to 8 (where 8 reflects certainty, and 0 the spaghetti phenomena of chaos and anarchy). Each request is assigned an inductive reasoning estimated environment size value 31 that ranges from 1 to one trillion (where 1 reflects certainty, whereas and one trillion ($2^{40}$) the spaghetti phenomena of chaos and anarchy). Each request is assigned an inductive reasoning logic grid 32 and gamma function equation 33. Each request is assigned a deductive reasoning mass value 40 that ranges from 0 to 8 (where 8 reflects certainty, whereas 0 relevant). Each request is assigned a deductive reasoning estimated environment size value 41 that ranges from 1 to one billion ($2^{30}$) (where 1 reflects certainty, whereas and one billion what is relevant). Each request is assigned a deductive reasoning logic grid 42 and gamma function equation 43.

Using the number of independent variables within a request an inductive reasoning category 50 and a deductive reasoning category 60 are displayed as follows:

0=Vague,
1=Concise,
2=Precise,
3=Optimal and
4=Answer searches.

Optimal and Answer searches have at least one probabilistic total quality management command instruction that enables them to exceed the 86% accuracy threshold.

FIGS. 5 through 7 highlight the interactive text input process of a user to create the final request "American Civil War Robert Lee Gettysburg". (A) Start with the user starting the process typing a single keyword in this case "American". (B) The user continues to typing interactive input 10 or uses assisted input 80 to improve the text input to "American Civil War" the term cluster. (C) The user continues to typing in the browser 10 or uses assisted input 80 to improve the text input to "American Civil War Robert Lee" by adding the "Robert Lee" term cluster. (D) The user continues to type interactive input 10 or uses smart input 90 to improve the input to "American Civil War Robert Lee Gettysburg" by adding the geospatial and relevant "Gettysburg" keyword.

Cholti converts the keywords into term clusters 70 that is part of the search pattern, where M1+E1+E2 becomes C1 or "American Civil War" and E3+E4 becomes C2 or "Robert Lee". C1 is converted into assist glyph 411, that becomes the primary index relationship that should yield the final destination, and thus the final destination will include the assisted input 80 "American Civil War" within its content. During the interactive process the system determines that the two clusters 70 and M2 or "Gettysburg" are directly related. Since, M2 or Gettysburg is geospatial or smart input 90 the system creates an assist event 412 or "Battle of Gettysburg", and finds the missing gaps of information and by adding Pennsylvania, Gettysburg GPS location coordinates, Jul. 1, 1863 time stamp, order of battle, and historic sites.

Now, Cholti uses the smart input 90 to perform the user's search, and if the user wants generic description of the Battle of Gettysburg, the answer will reside in an encyclopedia or high quality content site, otherwise the search will continue and the user will continue to surf the web, until the real purpose of the search is known.

Figure 8:
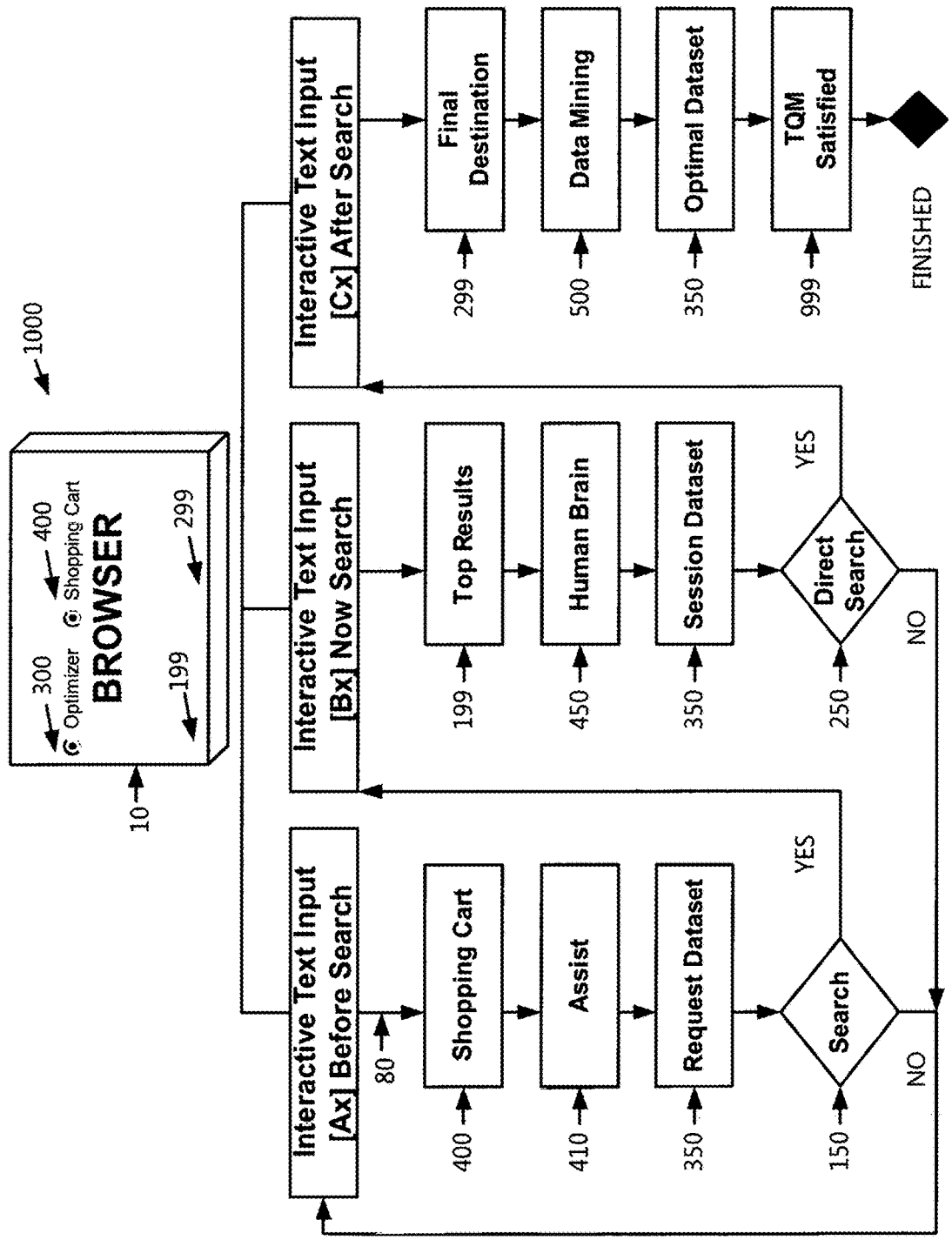
FIG. 8 presents an exemplary block diagram of the shopping cart system.
Figure 13A:
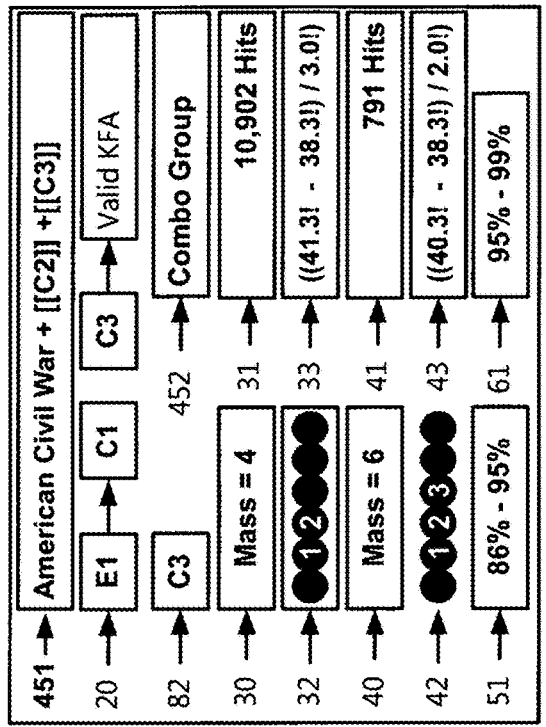
FIGS. 13A-13D present an exemplary human brain module diagram that measures accuracy based on input.
Figure 13B:
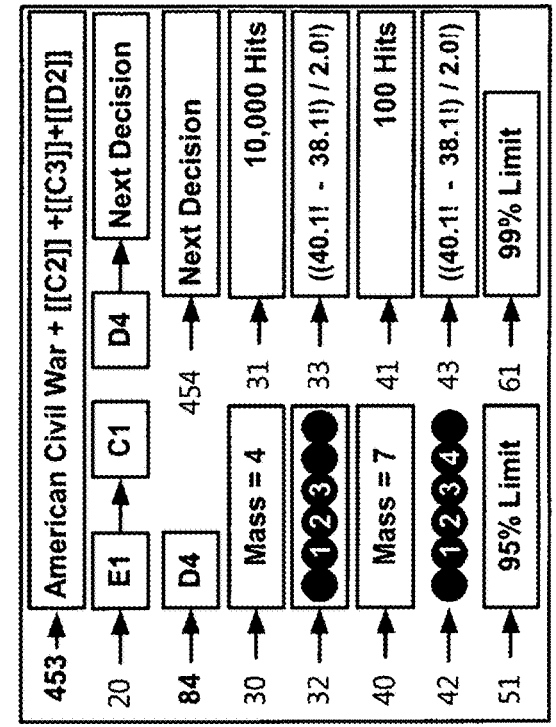
Figure 13C:
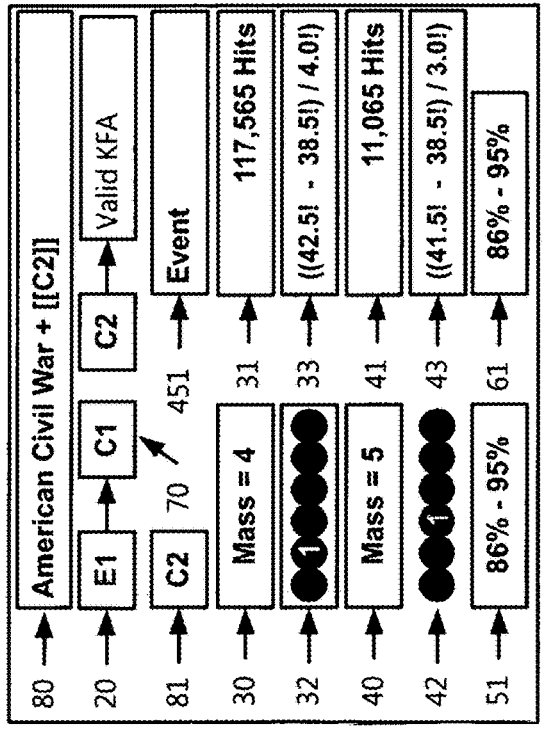
Figure 13D:
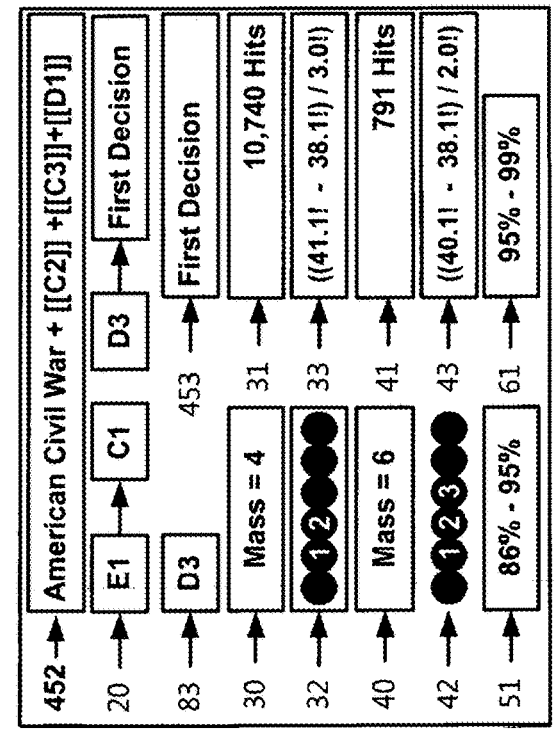

FIG. 8 shows an exemplary block diagram of the shopping cart system 400 as the search engine optimizer 1000 gathers the browser's interactive input 10, while randomly surfing the web. The interactive input [Ax], before the user selects from a list of assisted input 80 command instruction offered by the assist module 410 and then the optimizer subsystem 300, creates a request dataset 350 using the selected command instruction corresponding managerial index relationships. The assisted input [Bx], now the user command instructs a search 150, and will receive as output the top results 199 and will continue to surf the web, with assistance of the human brain module 450, that will dynamically match/merge at least one request into a session, and create a session dataset 350, and will gain factor key featured association based on their frequency and nearness to the managerial index relationships.

The human brain module 450 will offer additional keywords and decisions as command instruction to figure out a Direct request 250 that yields the final destination 299. Each command instruction is accompanied with the content derived from the analysis of the top results 199 and the corresponding gained factor value (from 0 bad to 10 optimal) of the session dataset 350. Now the data mining module 500 analyzes the final destination 299, since the user no longer need to randomly surf the web. Using the smart input [Cx] after interactive text input creates an optimal dataset 350 that also includes the user accepted command instructions, and thus the input now maps and plots the output. The search process is finished and the user is TQM satisfied 999.

FIGS. 9 through 19 have the following common elements: Glyph conversion 20 of the user interactive text input, and the corresponding inductive reasoning search statistics mass 30, estimated environment size 31, displayed output logic grid 32, gamma function 33, and accuracy 51 and immediately after the corresponding deductive reasoning search statistics mass 40, estimated environment size 41, displayed logic grid 42, and gamma function 43 and accuracy 61.

By default the search engine optimizer system 1000, updates and displays inductive reasoning statistics logic grid 32 and accuracy 51 as the end user interactively inputs text, and upon detecting a valid request dataset 350 and displays deductive reasoning statistics logic grid 42 and accuracy 61. The search engine optimizer system 1000 uses an accuracy algorithm from (0-100.00) based on the request dataset 350 and estimated environment size to display 51 and 61 accuracy output as an integer ##% or float ##.## % value format. The system converts keywords into cluster 70, such as M1+E1+E2 into C1 or "American Civil War".

The assist module 410 decisions are as follows: T1 or 71 represents a keyword or term cluster. T3 or 73 represents an event comprising of two independent variables. T2 or 72 enhances T1 or 71 by having a quality filter to gain factor pages. T4 or 74 enhances T2 or 72 by having quality filter to gain factor pages. T3 or 73 and T4 or 74 from the command instructions of the assist list 421 figures out and expands the left brain [L] and right brain [R] glyph equations with the feedback glyphs equation 422 or N1 that attenuates content with confounding variables in order to stabilize and reduces sensitivity parameter variations due to the environment.

Human brain module decisions 450 are as follows: TQM personal input command instruction D1 or 81 represents a commercial glyph. TQM personal input command instruction D3 or 83 represents a commercial glyph with default GPS coordinates. TQM personal input command instruction D2 or 82 enhances TQM personal input command instruction D1 or 81 by having a quality filter to gain factor pages. TQM personal input command instruction D4 or 84 enhances TQM personal input command instruction D2 or 82 by having quality filter to gain factor pages. TQM personal input command instruction D5 or 85 is an exact decision that creates a direct search 250, and yields the final destination 299.

FIG. 9 presents an exemplary Assist module 410 diagram that measures accuracy. In FIG. 9A, the user using assisted input 80 selects an assist glyph 411 and the command instruction 71 makes the interactive text input "Napoleon Bonaparte" or C1 that is a cluster 70. In FIG. 9B, the user using assist glyph 411 selects a high quality glyph 412 and the command instruction 72 makes the text input "Napoleon Bonaparte". In FIG. 9C, the user picks an assist event 413 to improve FIG. 9A by adding "Waterloo" and the command instruction 73 makes the interactive text input "Napoleon Bonaparte Waterloo". In FIG. 9D, the user picks a high quality event 414 to improve FIG. 9 B by adding "Waterloo" and the 74 command instruction makes the interactive text input "Napoleon Bonaparte Waterloo".

Both FIG. 9C and FIG. 9D use request dataset 350 and corresponding managerial index relationships to build the left brain [L] and right brain [R] equations based on the smart input 90 historical event that took place in Waterloo, Belgium on Jun. 15, 1815, and yes Emperor of France Napoleon Bonaparte and Allied Commander Duke of Wellington as well as their chain of command are part of the equation used to gain factor the content of the top results 199. FIG. 9 presents the interaction input [Ax] before analysis. Both FIG. 9B and FIG. 9D have feedback glyphs equation 422 or N1 that attenuates confounding variables when vectoring content value.

FIG. 10 presents an exemplary assist module 410 diagram that measures accuracy based on command instructions. In FIG. 10A, the user using assisted input 80 selects an assist glyph 411 and the command instruction 71 makes the interactive text input "Napoleon Bonaparte". In FIG. 10B, the user using assist list 421 selects an assist glyph 411 and the command instruction 71 makes the interactive text input "Napoleon Bonaparte". In FIG. 10C, the user using assist glyph 411 selects a high quality glyph 412 and the command instruction 72 makes the interactive text input "Napoleon Bonaparte". In FIG. 10D, the user using assist list 421 selects a high quality glyph 412 and the command instruction 72 makes the assisted input 80 "Napoleon Bonaparte". Both FIG. 10C and FIG. 10D have feedback glyphs equation 422 that attenuates confounding variables when vectoring content value.

FIG. 11 presents an exemplary Assist module 410, diagram that interactively builds input. In FIG. 11A, the user using assisted input 80 selects an assist event 413 and the command instruction 73 makes the interactive text input "Napoleon Bonaparte Waterloo". In FIG. 11B, the user uses assist list 421 to correlate "Napoleon Bonaparte" and "Battle of Waterloo" into and assist event 413 and the command instruction 73 makes the interactive text input "Napoleon Bonaparte Waterloo". In FIG. 11C, the user using assist event 413 selects a high quality event 414 and the command instruction 74 makes the smart input 90 "Napoleon Bonaparte Waterloo". In FIG. 11D, the user uses assist list 421 to correlate "Napoleon Bonaparte" and "Battle of Waterloo" into high quality event 414 and the command instruction 74 makes the input "Napoleon Bonaparte". Both FIG. 11C and FIG. 11D have feedback glyphs equation 422 that attenuates confounding variables when parsing and vectoring content value. "Napoleon Bonaparte Battle of Waterloo" is valid.

FIG. 12 presents an exemplary human brain module 450 diagram that measures accuracy based on command instructions. In FIG. 12A, the user using assisted input 80 selects commercial glyph 451 and the command instruction 81 makes the interactive text input "Walmart" (WALMART®). In FIG. 12B, the user using commercial glyph 451 selects a high quality glyph 452 and the command instruction 82 makes smart input 90 "Walmart" (WALMART®). In FIG. 12C, the user picks a commercial event 453 to improve FIG. 12A by adding leg (A) (origin) GPS coordinates and the command instruction 83 makes the interactive text input "Walmart" (WALMART®)+leg (A)". In FIG. 12D, the user picks a high quality event 454 to improve FIG. 12C by adding leg (B) (destination) GPS coordinates and command instruction 84 makes smart input 90 "Walmart" (WALMART®)+legs (A+B)".

FIG. 13 presents an exemplary human brain module 450 diagram that measures accuracy based on input. In FIG. 13A, the user using assisted input 80 selects event 451 and the command instruction 81 makes the interactive text input "American Civil War+C2", where C2 is a valid key featured association. In FIG. 13B, the user using event 451 selects a combo group 452 and the command instruction 82 makes the input "American Civil War+C2+C3", where C3 is a valid key featured association. In FIG. 13C, the user the combo group 452 in FIG. 13B by selecting D1 the first decision 453 and the command instruction 83 makes the input "American Civil War+C2+C3+D1", and D1 is the first decision 453. In FIG. 11D, the user improves the first decision 453 in FIG. 11C by selecting D2 the next decision 454 and command instruction 84 makes assisted input 80 "American Civil War+C2+C3+D2", and D2 is the next decision 454.

FIG. 14 presents an exemplary human brain module 450 diagram that measures input. In FIG. 14A, the user using assisted input 80 selects commercial glyph 451 and the command instruction 81 makes the smart input 90 "Walmart" (WALMART®), where D1 is a valid zero cluster. In FIG. 14B, the user using commercial glyph 451 selects a high quality commercial glyph 452 and the command instruction 82 makes the smart input 90 "Walmart" (WALMART®). In FIG. 14C, the user picks a commercial event 453 to improve FIG. 14B by validating leg (A) (origin) GPS coordinates and the command instruction 83 makes the smart input 90 "Walmart" (WALMART®)+leg (A)". In FIG. 11D, the user picks a high quality event 454 to improve FIG. 14C by validating leg (B) (destination) GPS coordinates and the command instruction 84 makes the smart input 90 "Walmart" (WALMART®)+legs (A+B)".

FIG. 15 presents another exemplary human brain module 450 diagram that interactively builds input. In FIG. 15A, the user using assisted input 80 selects assist glyph 451 and the command instruction 81 makes the interactive text input "American Civil War+C2", where C2 is a valid key featured association. In FIG. 15B, the user using assist event 452 selects a combo group and the command instruction 82 makes the text input "American Civil War+C2+C3", where C3 is a valid key featured association. In FIG. 15C, the user using combo group 453 selects D1 the first decision and the command instruction 83 makes the assisted input 80 "American Civil War+C2+C3+D1", and now D1 is the first decision 453.

Figure 15A:
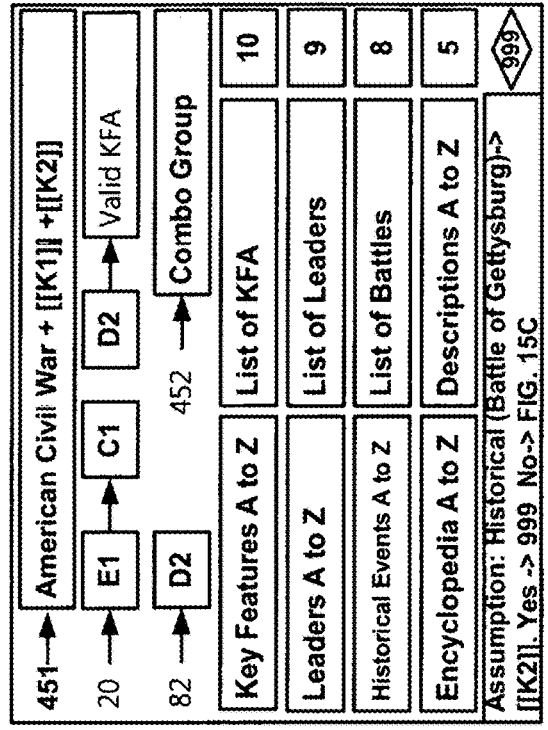
FIGS. 15A-15D present another exemplary human brain module diagram that interactively builds input.
Figure 15B:
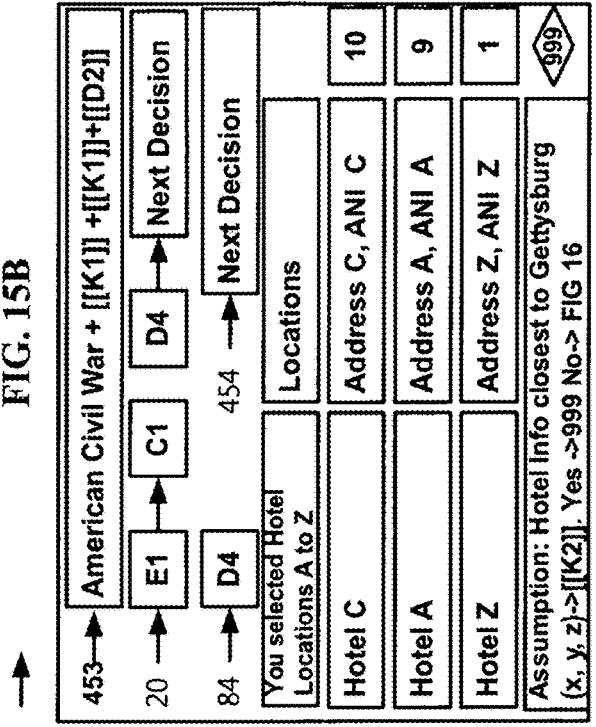
Figure 15C:
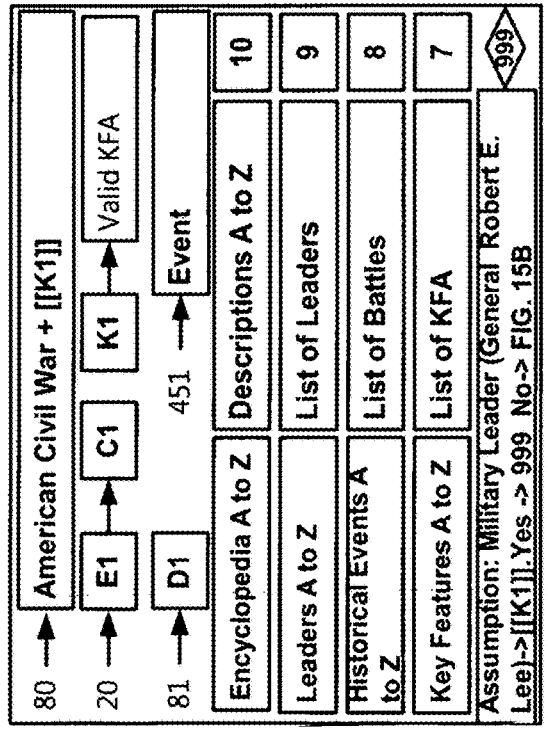
Figure 15D:
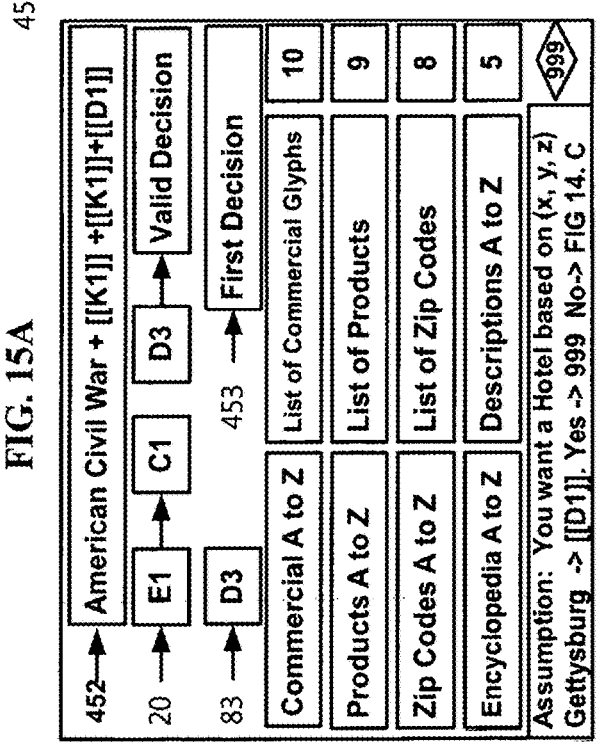

In FIG. 15D, the user improves the first decision 453 of FIG. 15C by selecting D2 the next decision 454 and the command instruction 84 makes the assisted input 80 "American Civil War+C2+C3+D2", and D2 is the next decision 454.

FIG. 16 presents an exemplary human brain module diagram that builds a direct search. FIG. 16A is a continuation of FIG. 16D, where the user created a high quality commercial event 454 by selecting an exact decision 455 and the command instruction 85 makes a direct search 210 that yields to the final destination, in this case the personal input 99 has a map with driving directions to a particular store. FIG. 16B is another continuation of FIG. 16D, where the user is linked to the sales module 700 enabling X_FOB 710 and Y_CDIF 730 financial transaction methods. FIG. 16C is a continuation of the personal input 99 "American Civil War+C2+C3+D2", where D2 is the next decision 454, and C2 and C3 are related key featured associations of the "American Civil War" in this case C2 is Robert Lee, and C3 is the Battle of Gettysburg, and the command instruction 85 makes an exact decision 455.

Once the shopping cart system 400 creates a direct search 210, the sales module 700 is activated and enables the X_FOB 710 and Y_CDIF 730 financial transaction methods. In FIG. 16D the user makes a Purchase Decision 456 and the command instruction 86 commercializes with personal input 99 that permits the user to perform a financial transaction.

At this point, the search process is over, and the sales module 700 puts buyers and sellers together and now behaves as an online shopping cart, since the user performed a Purchase Decision 456. The final destination 299 obtained from the exact decision 455 contains the personal input 99 that possess the destination Hotel C geospatial information, and also the user's point of origin, in this case a X_FOB 710 method reservation is offered, or alternatively a Y_CDIF 730 Vacation trip is offered that includes air travel, car rental, insurance and room accommodation information.

FIG. 17 presents an exemplary shopping cart system that measures the accuracy of smart input 90. FIG. 17A and FIG. 17C are examples of the user interaction with the shopping earl system 400 to obtain an exact decision 455 and the command instruction 85 makes a personal input 99 that builds a direct search 250. In FIG. 17A the shopping cart system 400 transforms the commercial cluster "Walmart" (WALMART®) or C1 into Z1 the Zero Cluster or "Walmart" (WALMART®).com. In FIG. 17C the shopping cart system 400 transforms the cluster "American Civil War" or C1 into Z1 the Zero Cluster or "American Civil War"+High quality definition. Once, the shopping cart obtains personal input 99 with an exact decision 85 or D5, the system reaches optimal precision.

FIG. 17B measures the accuracy of FIG. 17A, and FIG. 16D measures the accuracy of FIG. 17C, in both cases the personal input 99 is measured against the final decision 85.

FIG. 17A is based on smart input 90 "Walmart" (WALMART®) the shopping cart offers a list of options such as home page, location A to Z based on the IP Address, news, and high quality definition searches with an accuracy of 96% to 99%. Now, to reach certainty the shopping cart system 400 obtains the personal input 99 with an exact decision 85 that creates a direct search 210 that yields the final destination 299.

FIG. 18 presents exemplary shopping cart system that measures personal input 99. In FIG. 17A the user using assisted input 80 selects assist glyph 451 and the command instruction 81 makes the interactive text input "Walmart" (WALMART®), where "Walmart" (WALMART®) is transformed into the commercial cluster C1. When the user selects the search 150 command instruction, "Walmart" (WALMART®) or the commercial cluster C1 is transformed into a Zero Cluster or Z1 for "Walmart.com" (WALMART®) that yields the top results 199.

Furthermore Zip Code of the IP Address GPS coordinates becomes the smart input 90 point of origin in order to create a map that shows locations prioritized based on distance. FIG. 18B the search engine optimizer system determines that FIG. 18A has two direct search 210 paths and analyzes both outcomes. The first direct search 210 path, upon receiving the search 150 command instruction, becomes an inductive reasoning assist search using Zero Cluster Z1 or "Walmart.com" (WALMART®) to figure out the first final destination 299.

The second direct search 210 path, upon receiving the search 150 command instruction, becomes an inductive reasoning smart input 90 using zip code of the GPS coordinates as right brain [R] checkmate equation used to figure out the second final destination 299. The first path uses assisted input 80 and yields "Walmart" (WALMART®) .com, and the second path uses smart input 90 and yields Location A. Since, two or more final destination 299 exist, one or both of the path are automatically confounding. This is the reason of the present invention is to figure out the personal input 99 using the TQM command instruction that identify the true final destination 299.

In FIG. 18C the user using assisted input 80 selects the assist glyph 451 and the command instruction 81 makes the interactive text input "American Civil War". When the user selects the search 150 command instruction, the input is sent to a search engine and the output displayed becomes the top results 199. FIG. 18D the search engine optimizer system determines that FIG. 18C has two direct search 210 paths and analyzes both outcomes.

The first direct search 210 path, upon receiving the search 150 command instruction, becomes an inductive reasoning assisted input 80 high quality definition using the commercial cluster C1 or "American Civil War" to figure out the first final destination 299. The second direct search 210 path, upon receiving the search 150 command instruction, becomes an inductive reasoning page rank search using popularity score used to figure out the second final destination 299.

The first path uses assisted input 80 and yields Encyclopedia_A.com, and the second path uses the popularity score yields Site A. Since, two or more final destinations 299 exist, one or both of the path are automatically confounding. This is the reason of the present invention is to figure out the personal input 99 using TQM command instruction that identify the true final destination 299.

The personal input 99 takes into account the left brain [L] equation (E1 to EN) key featured associations, and right brain [R] equation (G1 to GN) key featured association, and then gain factors the top results 199, and determines that Site B has the best content and is the final destination 299. Finally, site B is further justified by using the deductive reasoning means of the feedback glyphs equation 422 or N1 that attenuates content with confounding variables in order to stabilize and reduces sensitivity parameter variations due to the environment.

FIG. 19 presents another exemplary shopping cart system that measures personal input 99. FIG. 19A shows the user select "Walmart" (WALMART®) that becomes the Zero Cluster Z1 or "Walmart" (WALMART®).com", using smart input 90, search engine optimizer system 1000, determines using the data mining module 500 that confounding elements to the search process exist, and minimally the leg A or point of origin zip code is required to improve the search. FIG. 19B the user selects personal input 99 that contains an exact decision 85, validating legs (A+B), origin and destination, and yields the final destination 299.

Search Becomes a Sale

Once input maps and directly plots the output the search process is over. Now, the shopping cart system 400, offers the sales module 700 that puts buyers and sellers together using X_FOB 710 and Y_CDIF 730 means provided a financial transaction is required. By default the lion share of most final destination 199 is free content, address information or mapping instructions and sales module 700 is skipped. For the exceptions FIG. 20 and FIG. 21 incorporate the X_FOB 710 and Y_CDIF 730 means to further improve TQM Satisfaction 999.

FIG. 19C shows the user select "American Civil War", using assisted input 80, search engine optimizer system 1000, expands the mathematical equation using the data mining module 500 to drill and find within the content of the top results 199, what the user is searching. In this case, a list of command instruction will appear in the user's terminal based on KFA (key featured associations), military leaders, and historical events found within the top results 199.

Deductive Versus Inductive Reasoning

Finally, using the Sherlock Holmes versus Watson paradigm the data mining module 500 will use deductive reasoning exclusions that attenuate content with confounding variables in order to stabilize and reduce sensitivity parameter variations due to the environment. Now, we can paraphrase Sherlock Holmes having him say "Elementary my dear Watson, if we eliminate using deductive reasoning the confounding elements of the search, as improbable as it may seem will simplify and elucidate the exact path that yields the final destination 299." FIG. 19D the user use the data mining module 500 to figure out the personal input 99 that elucidates the optimal content and thus using deductive reasoning solves the command instruction 95 or D5 has the optimal dataset 350 that yields the final destination 299.

Direct Searches End the Randomly Surfing the Web Process

Once input maps and directly plots static or dynamic output the search process is over and is displayed on the user's browser 10.

Figure 20:
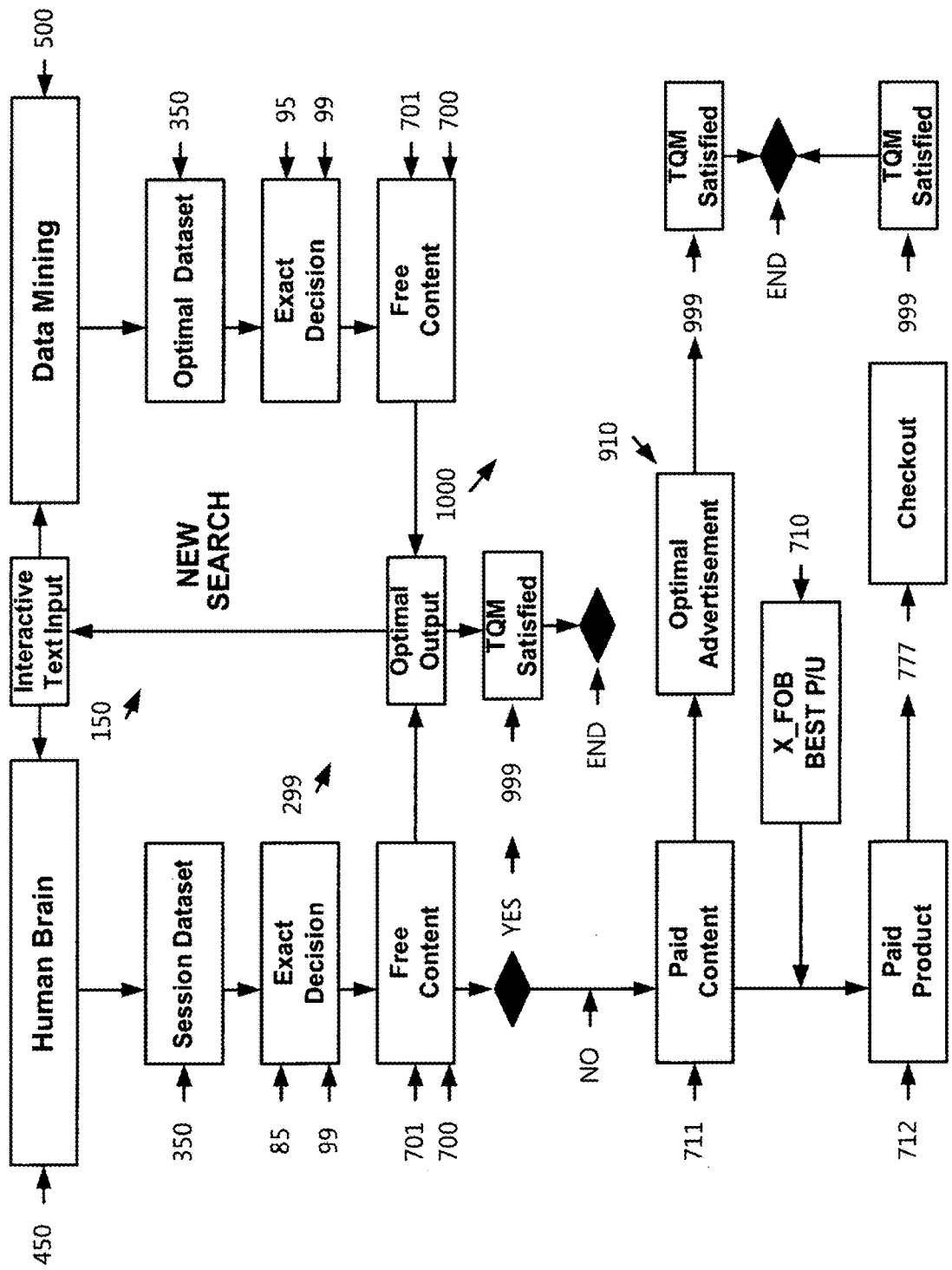
FIG. 20 presents a block flow diagram of the X_FOB method.

FIG. 20 presents a block flow diagram of the X_FOB method. The human brain module 450 and the data mining module 500 after each valid search 150 command instruction determine corresponding assisted input [Bx] now session dataset 350, and the smart input [Cx] after the optimal dataset 350. Both the human brain module 450 and the data mining module 500 interacts with the user until personal input 99 containing an exact decision 85 or 95 is encountered that yields the final destination 299. If the final destination is determined to be free content 701, the search engine optimizer system 1000, displays the optimal output and the user is TQM Satisfied 999 and the search process either continues with a new search or ends.

When the content is deemed to be a purchase, then sales module 700 offers the X_FOB 710, once the system knows the destination of FOB pickup location. Paid content 702 can be provide using the revenues of the advertisement module 910, the sales module 700 will display the advertisement and use the revenues to pay for the viewing of the intellectual property such as a copyrighted video of the user's favorite musical band, once the display is done the user is TQM Satisfied 999 and the search process either continues with a new search or ends.

When the content is a download product purchase, the sales module 700 will begin a X_FOB 710 best price/unit search, and perform the financial transaction upon receiving the checkout 777 command instructions the user is TQM Satisfied 999 and the search process either continues with a new search or ends.

Figure 21:
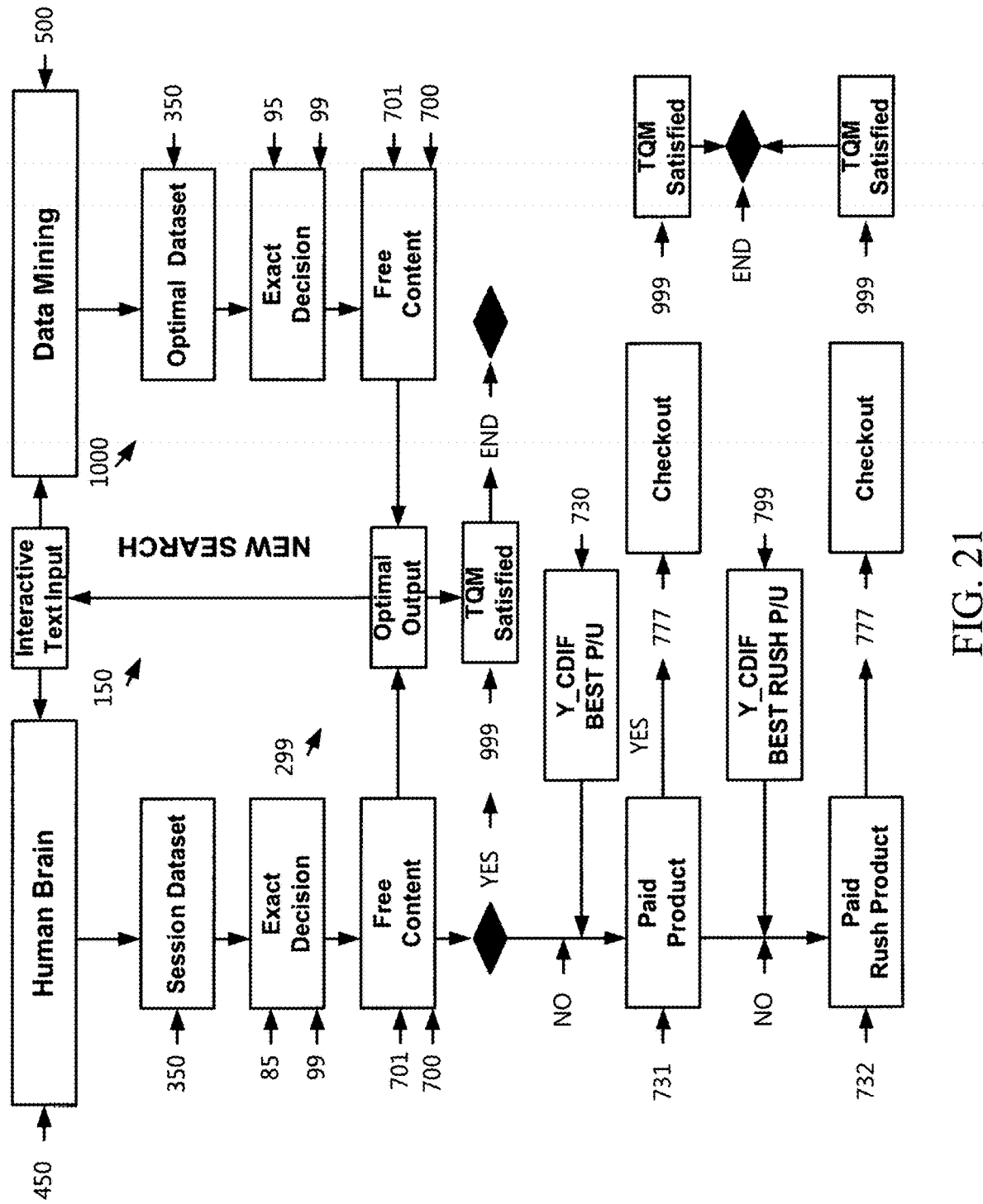
FIG. 21 presents a block flow diagram of the Y_CDIF method.

FIG. 21 presents a block flow diagram of the Y_CDIF method. The human brain module 450 and the data mining module 500 after each valid search 150 command instruction determine corresponding assisted input [Bx] now session dataset 350, and smart input [Cx] after the optimal dataset 350. Both the human brain module 450 and the data mining module 500 interacts with the user until personal input 99 containing an exact decision 85 or 95 is encountered that yields the final destination 299. If the final destination is determined to be free content 701, the search engine optimizer system 1000, displays the optimal output and the user is TQM Satisfied 999 and the search process either continues with a new search or ends.

When the content is deemed to be a paid product that requires shipping, insurance, freight, then sales module 700 offers the Y_CDIF 730, once the system knows legs (A+B). The user interacts with sales module 700, until the checkout command instruction 777 is received, and the transaction is executed and the user is TQM Satisfied 999 and the search process either continues with a new search or ends.

When the content is deemed to be an emergency paid product and time and not price is the primary variable that requires shipping, insurance, freight, then sales module 700 offers RUSH Y_CDIF 799, once the system knows legs (A+B). The user interacts with sales module 700, until the checkout command instruction 777 is received, and the transaction is executed and the user is TQM Satisfied 999 and the search process either continues with a new search or ends.

Figure 22:
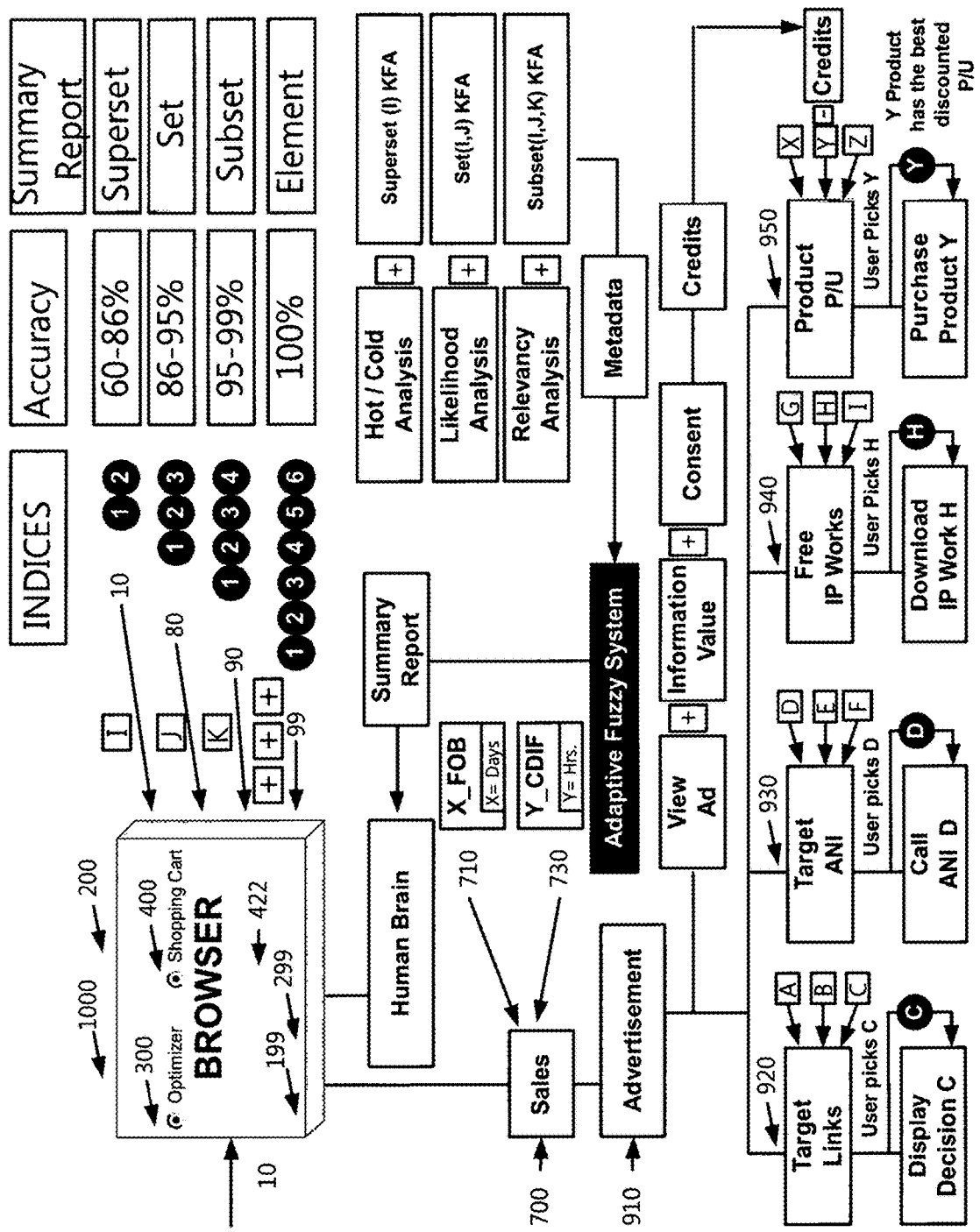
FIG. 22 presents a block flow diagram advertisement module.

FIG. 22 presents a block flow diagram advertisement module. The search engine optimizer system 1000 uses optimizer system 300 and shopping cart system 400 to gather from the end user's browser interactive, assisted, smart and personal input (10, 80, 90, 99).

Interactive input 10 has 1 or 2 managerial relationship indices to solve for a Superset (I) with top results 199 having an accuracy of 60% when having a single index and 86% when having two indices. Assisted input 80 has 2 or 3 managerial relationship indices to solve for a Set (I, J) with top results 199 having an accuracy of 86% when having two indices and 95% when having three indices. Smart input 90 has 3 or 4 managerial relationship indices to solve for a Subset (I, J, K) with top results 199 having an accuracy of 95% when having three indices and 99% when having four indices. Personal input 99 yielding a checkmate combination with 6 managerial relationship indices that automatically yields a final destination 299 having an accuracy of 100%.

All Superset (I), Set (I,J), Subset (I,J,K) have their own unit object in the superset of regular expression chain of command, and when requested display the summary report object, that contains the top (n) results of the particular improved environment, and also the key featured association and feedback equations that permit deductive reasoning analysis.

Superset (I) Expansions

Each Superset (I) can have a plurality of subordinates by using combinations of key featured associations acting as independent variables (J) and (K) sub filters each possessing their own unit object. For example, the searchable environment or Superset (U) can be subdivided by country domains, language or quadrants [[LL, LR, RL, and RR]] based on the human brain equations.

Set (I, J) Expansions

Each Set (I,J) can have a plurality of subordinates by using combinations of key featured associations acting as independent variables (I) (when null) and (K) sub filters each possessing their own unit object. For example, the Battle of Gettysburg event can be part to Superset ("Historical Battles") or to Superset ("American Civil War").

Set (I, J) Expansions

Each Subset (I, J, K) can have a plurality of subordinates by using combinations of key featured associations acting as independent variables (I, J) (when null) sub filters each possessing their own unit object. For example, the 33160 event can be part to Superset ("Florida") or to Superset ("Restaurants") and Set ("Florida","Restaurant") and so forth . . . The sales module 700 and advertisement module 910 collaborate to offer the X_FOB module 710 and Y_CDIF 730 to enable interaction between the end user and corporate sponsors. The search engine optimizer system 1000 simulates the human brain by performing the hot/cold analysis upon detecting a Superset (I) object, Relevancy analysis upon detecting a Set (I, J) object and the Likelihood analysis upon detecting a Subset (I, J, K) object. For each identifiable Superset, Set and Subset object the search engine optimizer 1000 and deductive reasoning search engine 200 creates metadata and stores the human brain equation use both left brain [L] equation English language key featured associations, and right brain [R] equation geospatial key featured association, and then gain factors the top results 199, and then using deductive reasoning feedback glyphs equation 422 or N1 that attenuates content with confounding variables in order to stabilize and reduces sensitivity parameter variations due to the environment as being an evolving fuzzy system.

The evolving fuzzy system can be describes as: (EFS) can be defined as self-developing, self-learning fuzzy rule-based or neuro-fuzzy systems that have both their parameters but also (more importantly) their structure self-adapting on-line.

They are usually associated with streaming data and on-line (often real-time) modes of operation. In a narrower sense they can be seen as adaptive or evolving fuzzy systems. The difference is that evolving fuzzy systems assume on-line adaptation of system structure in addition to the parameter adaptation, which is usually associated with the term adaptive or evolving. They also allow for adaptation of the learning mechanism. Therefore, evolving assumes a higher level of adaptation.

Metadata can be describes as: "is structured information that describes, explains, locates, or otherwise makes it easier to retrieve, use, or manage an information resource. Metadata is often called data about data or information about information." "An important reason for creating descriptive metadata is to facilitate discovery of relevant information. In addition to resource discovery, metadata can help organize electronic resources, facilitate interoperability and legacy resource integration, provide digital identification, and support archiving and preservation."

Metadata serves the same functions in resource discovery as good cataloging does by allowing resources to be found by relevant criteria; identifying resources; bringing similar resources together; distinguishing dissimilar resources and giving location information."

The search engine optimizer system 1000 using summary reports objects derived from the Evolving Fuzzy system metadata and human brain equation can now offer and display with the highest precision advertisement that satisfy the end user and thus yield direct sales.

The advertisement module 910 uses the metadata from interactive, assisted, smart and personal input (10, 80, 90, 99) summary report objects 299 to figure out the best target links 920, target ANI 930, targeted advertisements 940 to view free content, valorized optimal advertisements 950 to view and make consent or advertisement decisions that permit the sharing of information with corporate sponsor and in turn receive credits or currency to view, download or purchase intellectual property audio, digital and video works for free or at a discounted price.

The shopping cart system 400 offering a list of target links 920 and billing the corporate link owner upon detecting the command instruction decision to display the link. For example, the end user is shown a list of corporate sponsor links (A, B, C). End user selects command instruction C, sending the user to corporate sponsor link C. The advertisement module 910 now bills corporate sponsor C, for performing the targeted advertisement.

The shopping cart system 400 offering a list of target ANI 930 and billing the corporate ANI owner upon detecting the command instruction decision that instantiates a call. For example, the end user is shown a list of corporate sponsor ANI or telephone numbers (D, E, F). End user selects command instruction D, now a call is instantiate between end user (origin) and corporate ANI D (destination). The advertisement module 910 now bills corporate sponsor D, for performing the targeted telephone call.

The shopping cart system 400 offering a list of links with free IP works 940 and bills the Site owner upon detecting the command instruction decision to display the link. For example, the end user is shown a list of corporate sponsors that will pay for a free view, listen and/or download of a licensed IP digital, audio or video work (G, H, I). End user selects command instruction H, views the corporate sponsor H advertisement. The advertisement module 910 now bills corporate sponsor H, for showcasing their advertisement, and the end user can freely view, listen and/or download the licensed IP digital, audio or video work that corporate sponsor H purchased.

The shopping cart system 400 offering a list of valorized optimal advertisement 950 with a list of available discount prices upon using coupons, watching sponsored advertisement, and or sharing personal information with corporate sponsor using X_FOB 710 and Y_CDIF 730 methods. For example, the end user is shown a list of corporate sponsors that will pay for a free view, listen and/or download of a licensed IP digital, audio or video work (X, Y, Z). End user selects command instruction Y, views the corporate sponsor Y advertisement. The advertisement module 910 now bills corporate sponsor Y, for showcasing their advertisement, and the end user can freely view, listen and/or download the licensed IP digital, audio or video work that corporate sponsor Y purchased.

At this point, the end user decides to purchase the product that paid for the free license. Instantiating a transactional advertisement and the end user will receive further credits should they consent to share information with corporate sponsor X. The shopping cart system 400 will negotiate for the best P/U, and request for additional licensing credits based on the sale. Let us suppose, corporate sponsor X campaign credits the end user with 50 cents for viewing their advertisement, and may credit the end user up to 1 dollar depending on the amount of shared information while filling a survey. Now, then what if the end user decides to purchase one hundred (100) products, and due to the dollar amount of the sale the user may wind up receiving shipping and handling free, supplement credits to purchase more licensed IP digital, audio or video works, and of course a better P/U. The shopping cart system 400 in this case can document that corporate sponsor X advertisement was displayed, and as a direct consequence the end user consented to purchase 100 products from corporate sponsor X. The advertisement module 910 and the sales module 700 collaborated in performing a documented transactional advertisement.

Figure 23:
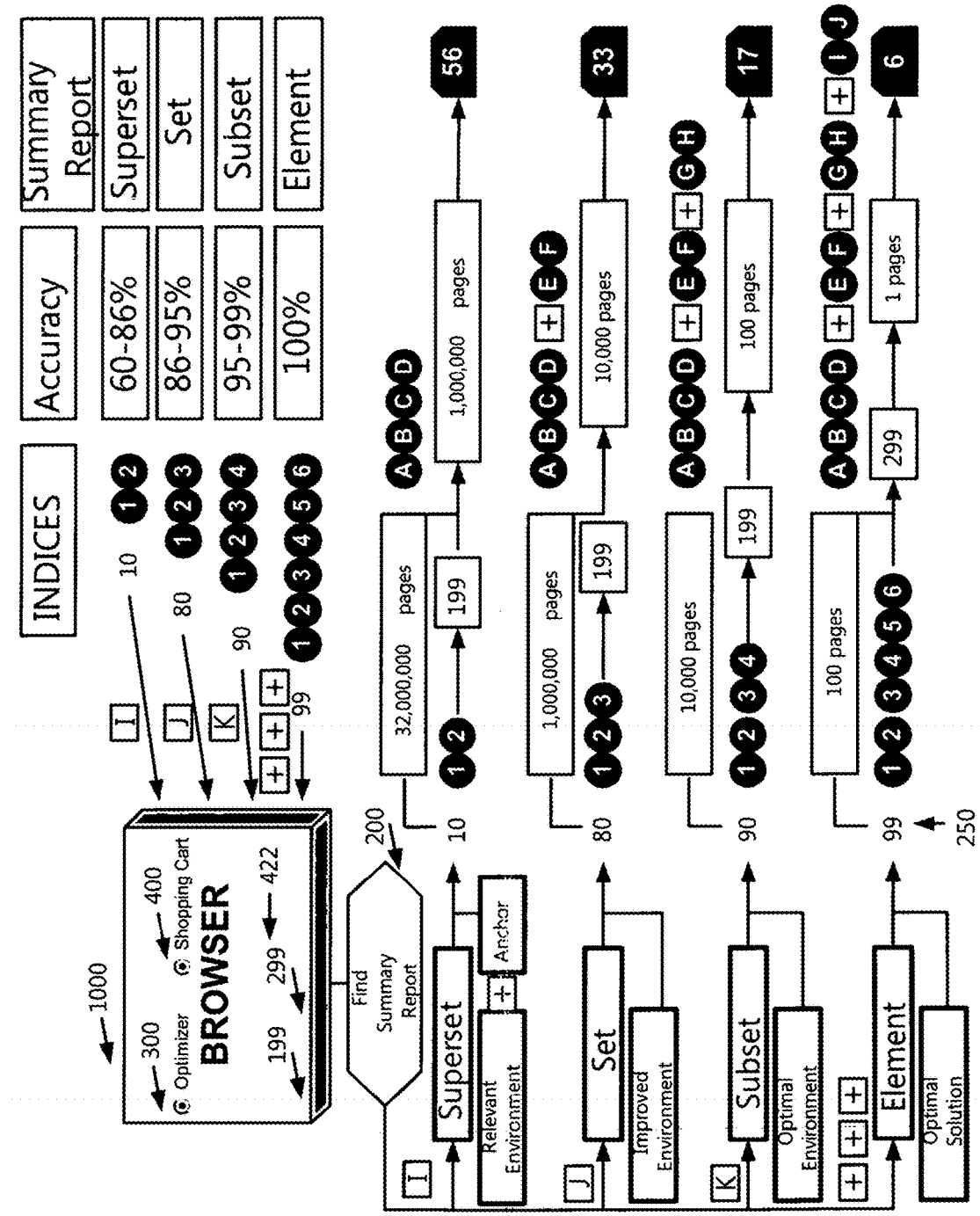
FIG. 23 presents an exemplary of summary report objects.

FIG. 23 presents a block flow diagram of summary report objects the search engine optimizer system 1000, working in conjunction with a deductive reasoning search engine 200 continuously scan, scan and gather the environment. In this case, the searchable environment is the Internet, that the human brain organizes and the right side of the brain partitions the searchable environment into a plurality of super blocks, blocks, sub blocks, mini blocks and elements, whereas the left side of the brain performs the same task using rules of linguistics based on the frequency and direct relationships between keywords and term clusters.

Using the end user browser the optimizer system 300 and shopping cart system 400 and to scan and gather from the end user's browser interactive, assisted, smart and personal input (10, 80, 90, 99). The mimicking the human brain to simulate deductive reasoning to create a language based equation, a geospatial based decision, a human decision equation to interpret numerical and text data and convert the interpreted data into statistical glyphs objects representing the mathematical equation used to determine the optimal partition of the Internet.

At this point, the Deductive reasoning search engine 200 or optimizer system 300 based on the number of indices find the best-fit summary report object. Each request has a Dominant tendency of the brain and an anchor that binds the final destination to a relevant environment comprising of 1 billion pages, and is a partition of the Internet search environment that has a 1 trillion pages.

The anchor filters the relevant environment comprising Interactive input 10 to map Superset (I) with 32,000,000 pages having an accuracy of 60%, and then the primary index relationship (I) solves for the top results 199 after creating an improved environment comprising of 1 million pages, and is a partition of the relevant and searchable environments.

Using the secondary index relationship (J) Assisted input 80 filters the improved environment map Set (I, J) with 10,000 pages having an accuracy of 95% and solves for the top results 199 after creating an optimal environment.

Using a right side of the brain checkmate combination (K) Smart input 90 filters the optimal environment to map Subset (I, J, K) with 100 pages having an accuracy of 99% and solves for the top results 199 after creating an optimal solution.

Using both a left and right side of the brain checkmate combination (+++) personal input 99 filters the optimal solution having an accuracy of 100% and solves for the final destination 299.

The logic basis to finding the top results 199 within the relevant environment is 99, improved environment is 56, optimal environment is 33, optimal solution is 17 and optimal element is 6. Note: the searchable environment is 305

In conclusion interactive input 10, assisted input 80 and smart input 90 intrinsically have confounding elements that hide the final destination 299. The Hot/Cold, Likelihood and Relevancy analyses figure out key featured association of the mathematical equation that gain factor measured quality of pages and thus improves the precision of the search to 95% accuracy.

To reach 100% accuracy and precision the confounding elements of the search must be eliminated. The optimizer 300 and shopping cart 400 systems allows the user to select personal input 99 containing exact decisions 95 that create direct search 250. Each direct search 250 uses deductive reasoning means of the feedback glyphs equation 422 or N1 that attenuates content with confounding variables in order to stabilize and reduces sensitivity parameter variations due to the environment. Direct searches 250 eliminate the randomly surfing the web trial and error process and in turn automatically yields the final destination 299.

The personal Input 99 allows the process to be commercialized permitting the shopping cart system 400 to put buyers and sellers together. At this point, free content and downloads are immediately, sent to the end user as output. Otherwise X_FOB 710 decisions and Y_CDIF 730 are made available to the user.

X_FOB decisions, which measures the FOB price per unit of merchandise being made available through ocean and land transportation means to its physical warehouse originating from participating retailers, wholesalers and suppliers where time is measured in X days dimensions and thus the term X_FOB.

Y_CDIF decisions, which measures the CDIF (cargo duties insurance freight) P/U of forecasted inventory in hand merchandise through air transportation means and door to door services to the end user and time is measured in Y hours dimensions and thus the term Y_CDIF;

The shopping cart system 400 storing 'The Price' summary reports and pronounced 'the price' and thus the term Z_PRICE, by using X days dimensions X_FOB calculations and Y hour dimension Y_CDIF calculations based on said inventory control of "In Hand" and domestic rush FOB, and also purchasing forecasted inventories lots based on demand, economies of scale, historical trends and storage capacities.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

Figure 24:
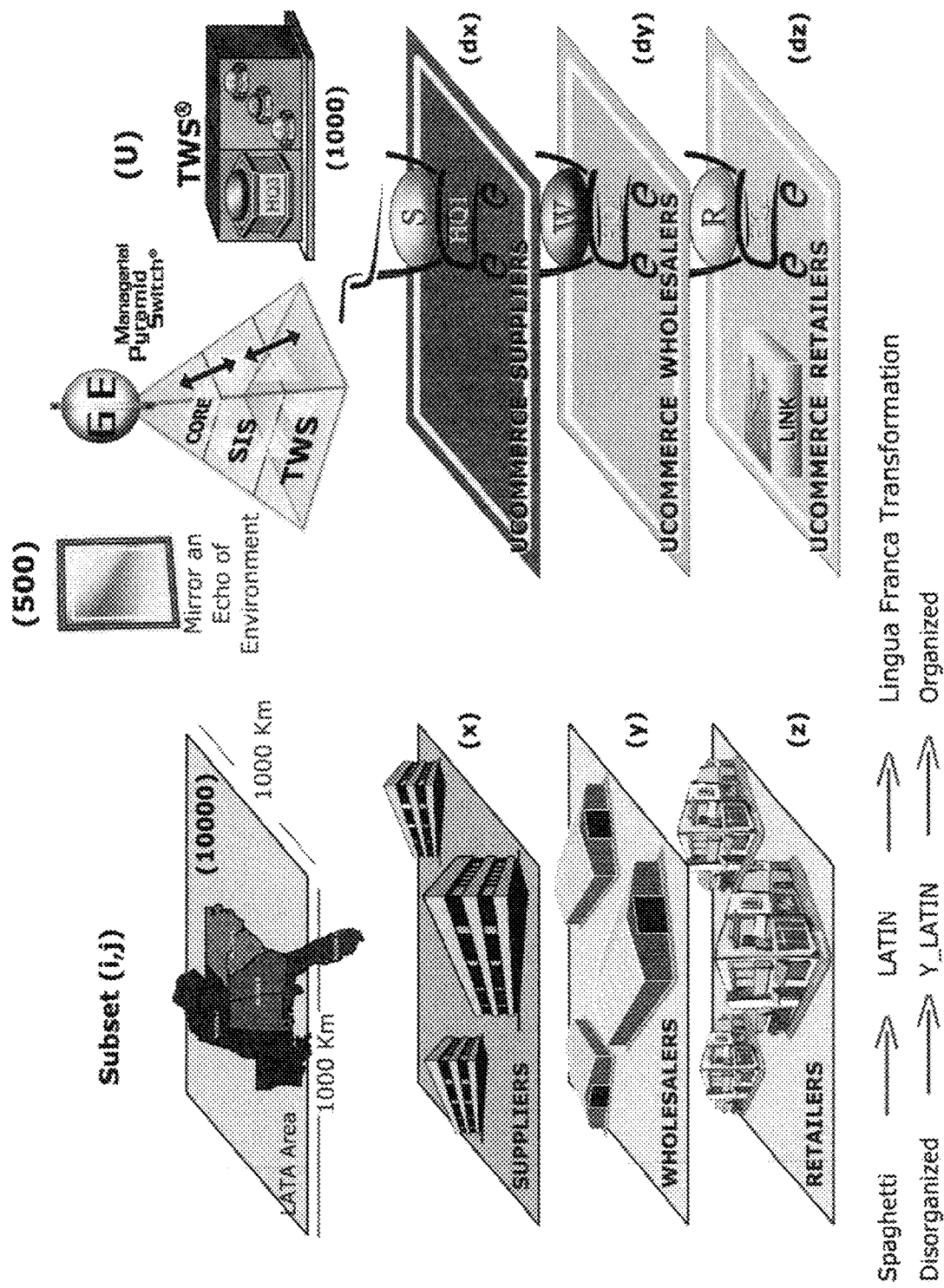
FIG. 24 Converting and Simplifying a subset (i, j)

FIG. 24 Converting and Simplifying a subset (i, j), and creating a mirror of the environment (500) that is converted, standardized and transformed to remove the spaghetti phenomena of disassociated <R> Retailers, <S> Suppliers and <W> Wholesalers belonging to a geographical area (10000), in this case Southeastern USA. These 3rd parties are managed and controlled by a particular <U> UCommerce Warehouse that regulates and rations the available inventory based on cost and need.

The system integrates an x or Retailers, y or Suppliers and z or Wholesalers, and then optimizes its inventory means into dx, dy and dz respectively that are available to a UCommerce warehouse. All of the messages from these 3rd party inventory means are integrated and standardized as Vectors CDR that possess Leg A origin, Leg (T, U) Tandem destination and Leg B final destination points for the worldwide delivery of merchandise. Using business rules, the system can purchase one item for one end user or in mass for a plurality of customers.

Figure 25:
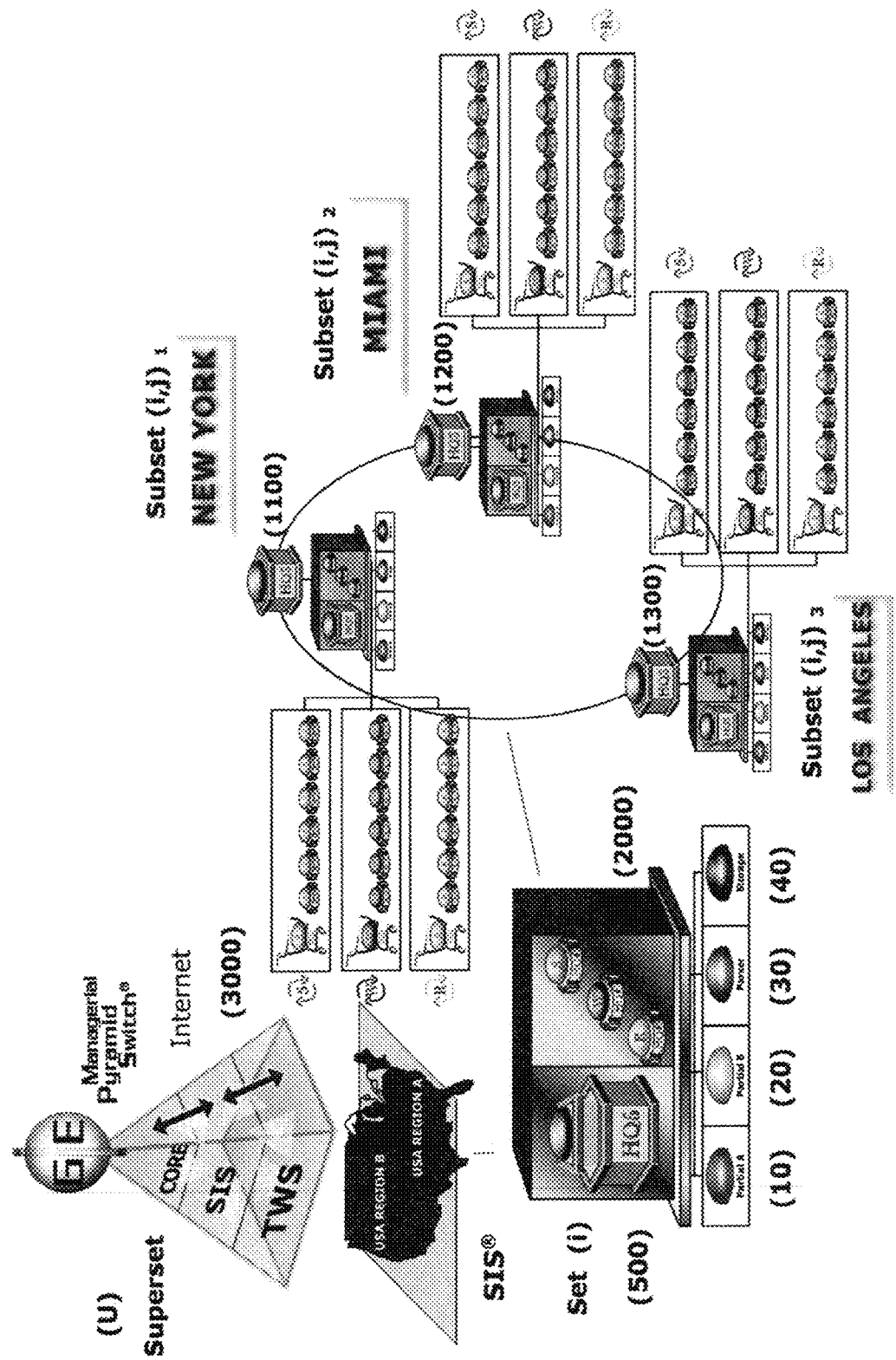
FIG. 25 UCommerce Set(x) USA

FIG. 25 UCommerce Set(x) USA is a diagram that shows how all of the inventories belong to the United States belonging to a SIS® (2000). This organization of computers has the means to interact and process transactions in parallel with its parent MPS® (3000) and the Superset (U) that has global scope. This specific organization of computers consists of a SIS® that possesses Partial A (10), Partial B (20), Parser (30) and Storage (40) functions that manage and control a plurality of subordinates (i, j) 1 (1100) situated in New York City, N.Y., (i, j) 2 (1200) situated in Miami, Fla., and (i, j) 2 situated in Los Angeles, Calif.

Each of the subordinate also possesses Partial A (10), Partial B (20), Parser (30) and Storage (40) functions that manage and control LATA Areas or Regions that match/merge regional scope transactions or the portion of the transaction under their command.

Figure 26:
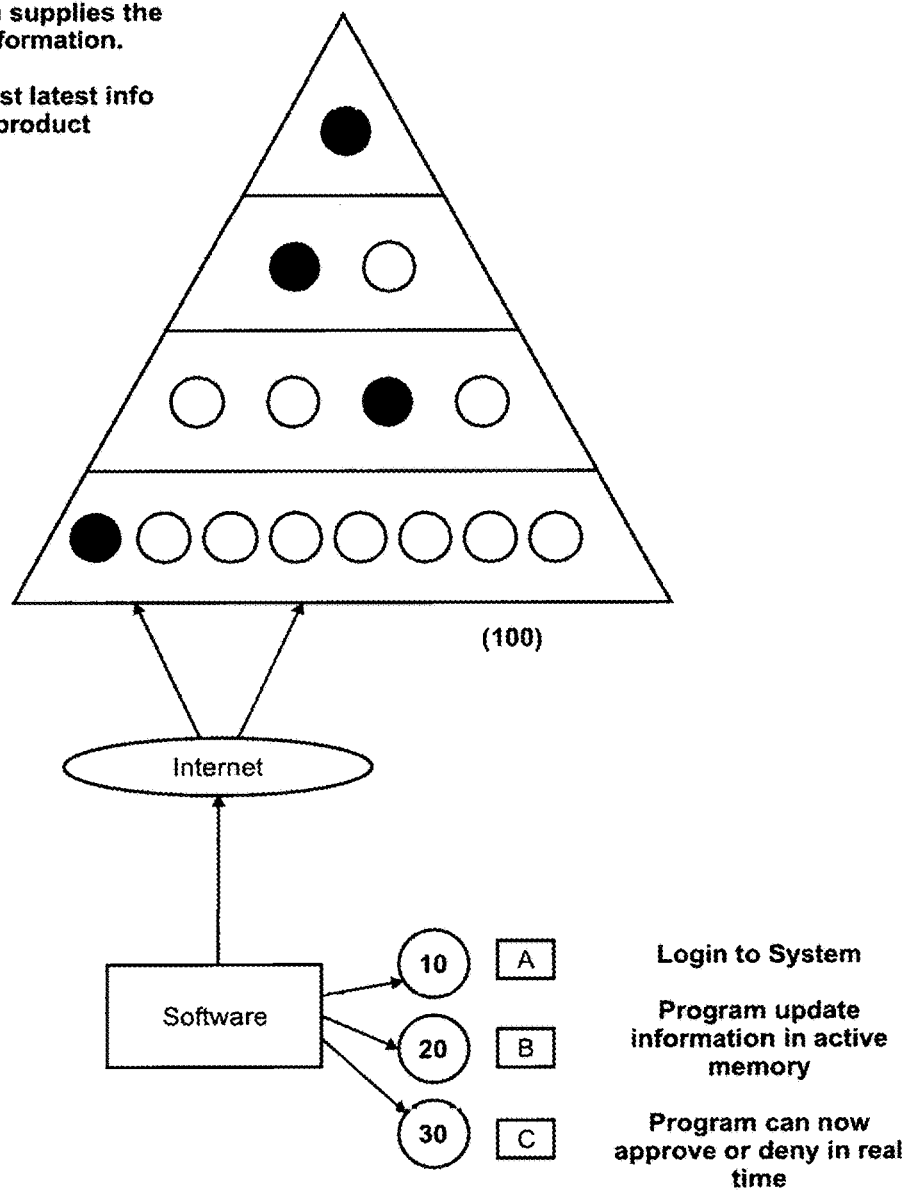
FIG. 26 Updating client's information

FIG. 26 shows how each Intelligent Component interfaces with a database, and a third-party interface to get the latest data. Once each node has the latest information and updates the information in its active memory, it approves or denies an order, provides prices to an end user, and assigns (by country) the U-Commerce value for their inventory. Parent Intelligent components can alternatively only validate the information of a given group of sibling intelligent components having the highest U-Commerce value to a given continent, region, and or country.

Figure 27:
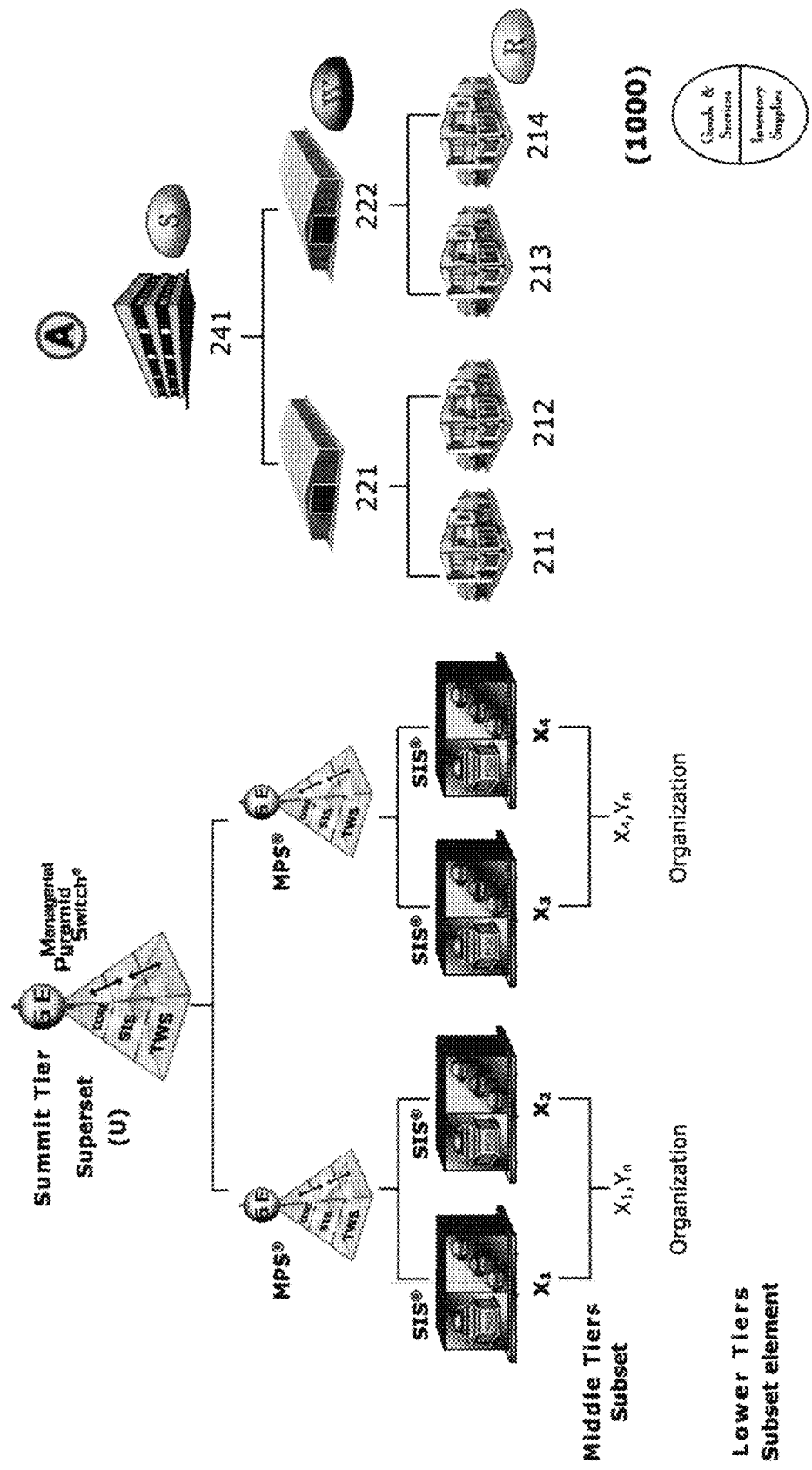
FIG. 27 is a schematic representation of how an UCommerce organization, expressed as (U) the Superset, is subdivided into Sets and Subsets.

FIG. 27 is a schematic representation of how an UCommerce organization, expressed as (U) the Superset, is subdivided into Sets and Subsets.

On the left hand side, (U) is represented by the Internet scope MPS®, Sets X1 and X2 by a plurality of Continental MPS® and Subsets (X1, Y1), (X2, Y2), (X2, Y1) and (X2, Y2) by the Regional scope SIS®. Each SIS® has a plurality of subordinates TWS® that monitor and control geographical LATA areas or Area Codes.

On the right hand side, a plurality of 3rd party retailer (211 to 214), wholesaler (221 to 222) and supplier (241) organizations are integrated to the UCommerce supplier system (1000), permitting goods and services worldwide to be distributed to the end users in optimal conditions, based on their needs.

Collectively, the Billing Engine via the Storage function of each MPS®, SIS® and TWS® stores the Information in environmental bitmap formats, so that the system has at its disposal the inventory of each 3rd party from point A to point B as optimal based on a quantity and shipping method selected by the customer. In this case, when an end user requests a quote, the system immediately checks for each local, regional, continental and Internet scope retailer, wholesaler and supplier inventory distribution means for the best case scenario that satisfies the consumer.

Once the best-case scenario is identified, the system creates a Vector CDR with Legs (A, B, U, T) with the associated cost and delays.

Figure 28:
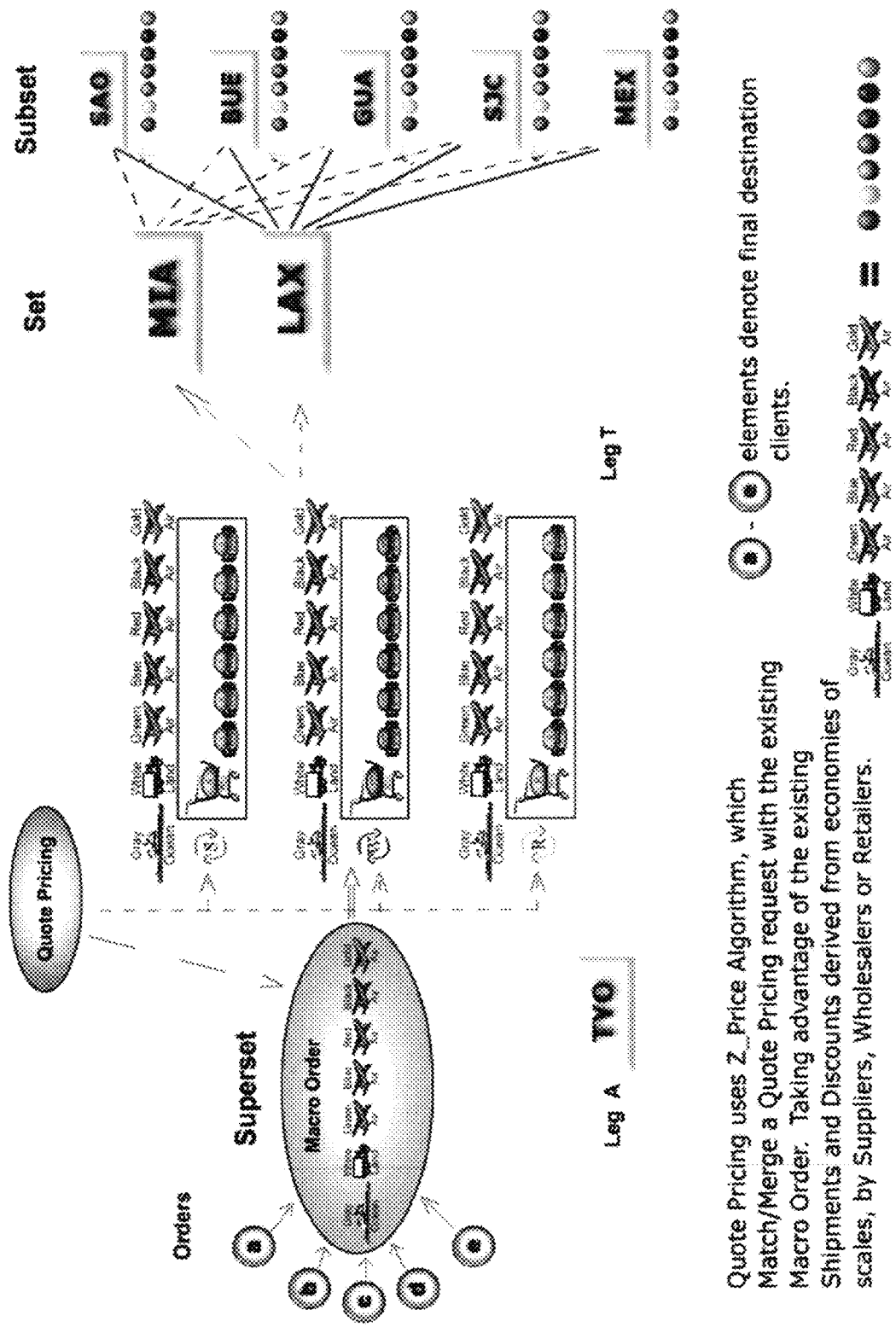
FIG. 28 is a schematic representation of the Z_PRICE Match/Merge process

FIG. 28 is a schematic representation of the Z_PRICE Match/Merge process, where incoming queued merchandise is incorporated with real time online sales quotes to maximize cost efficiencies. (1) An X_FOB Macro Superset of merchandise exists from a plurality of <R> Retailers, <S> Suppliers and <W> Wholesalers that belong to the Japan region and that are in the process of being shipped via air, land and sea to the <TYO> Tokyo, Japan Leg A UCommerce warehouse. Assigning transportation time dimensions of arrival, departure and cost to each partial Vector from 3rd parties to Leg A, will permit the supplier to optimize each existing container to lower purchase discount rates and minimize transportation cost per item. The supplier system assigns prorated cost to each line item of a quote, and determines the system's lowest cost which comprises of the distribution means of participating 3rd parties <R>, <S> and <W>. The information is stored in Environmental Bitmap formats based on Product_ID, Warehouse_ID and Shipping Method. A plurality of shipments that have as a common denominator a (4) Leg T warehouse such as <MIA> Miami, Fla. or <LAX> Los Angeles, Calif., both in the USA as sets, and their destination points (5) Leg B such as points<SAO> Sao Paulo, Brazil, <BUE> Buenos Aires, Argentina, <GUA> Guatemala City, Guatemala, <SJC> San Jose, Costa Rica, or <BOG> Bogotá, Colombia as subsets or Macro Y_CDIF Orders. (5) Each Y_CDIF macro order merchandise dimension is nationalized via customs and then they are shipped to the specified client's location.

Figure 29:
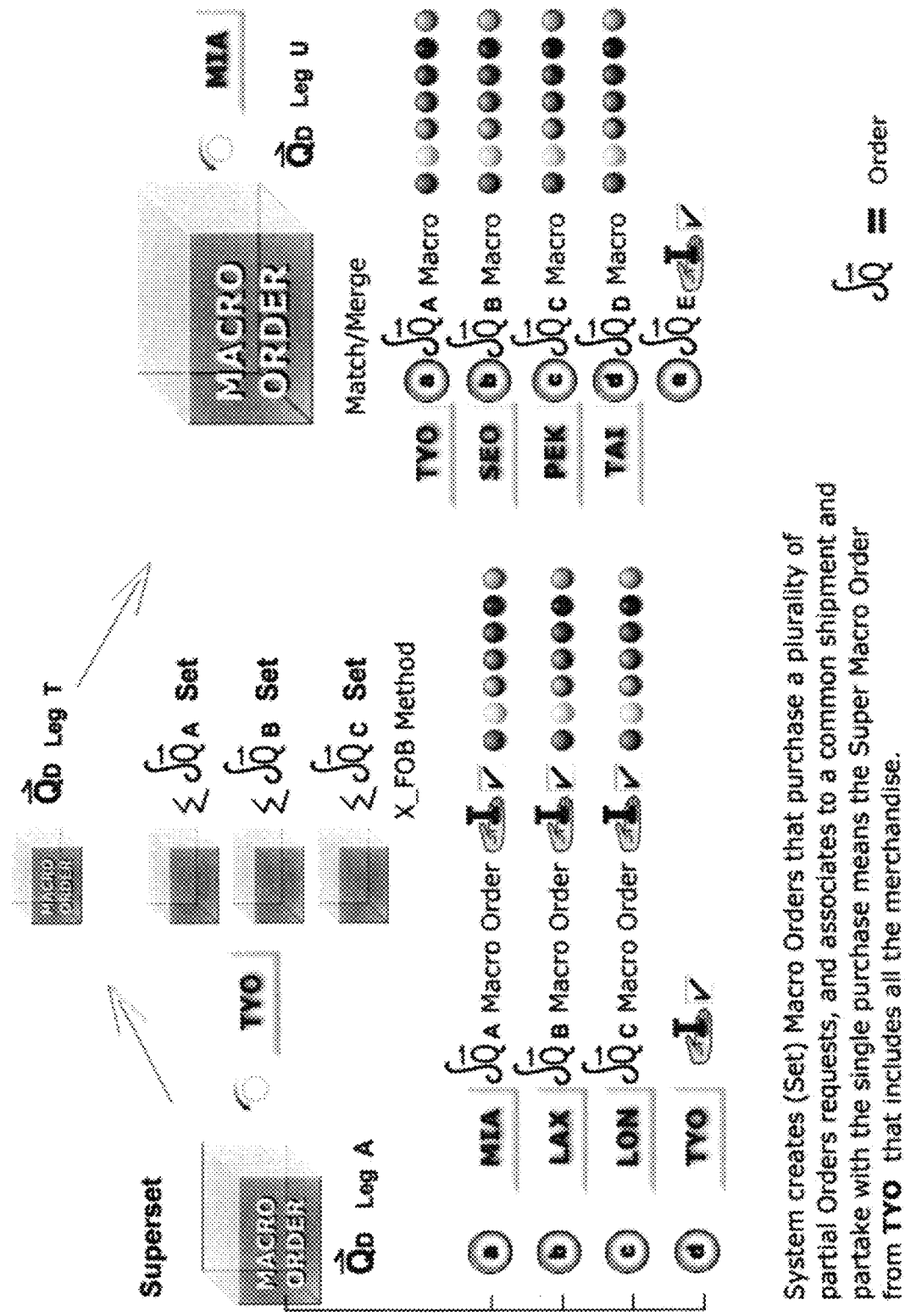
FIG. 29 is a schematic representation of Lump Sum Z_PRICE Purchases

FIG. 29 is a schematic representation of Lump Sum Z_PRICE Purchases derived from the supplier, that match/merges a plurality of quotes and buys the collectively as a single Order. (1) The system match/merges a plurality of quotes from a massive amount of end users utilizing the supplier system. For example: using for continental UCommerce warehouses such as <MIA> Miami, Fla., <LAX> Los Angeles, Calif., <LON> London, United Kingdom, and <TYO> Tokyo, Japan, that exist as air, land and sea dimensions that have X_FOB delays, are associated and broken down in as partial orders that are eventually match/merged in the optimal UCommerce warehouse, that possesses further route dimensions of incoming dimensions from other supplier distribution means already in progress, such as <TYO> Tokyo, Japan, <SEO> Seoul, Korea, <PEK> Peking, Communist China, or <TAI> Taipei, China, as an in route Y_CDIF macro order that are traveling to the their (3) final destination port and upon being nationalized distributed as distinct orders to the specified client's location.

Figure 30:
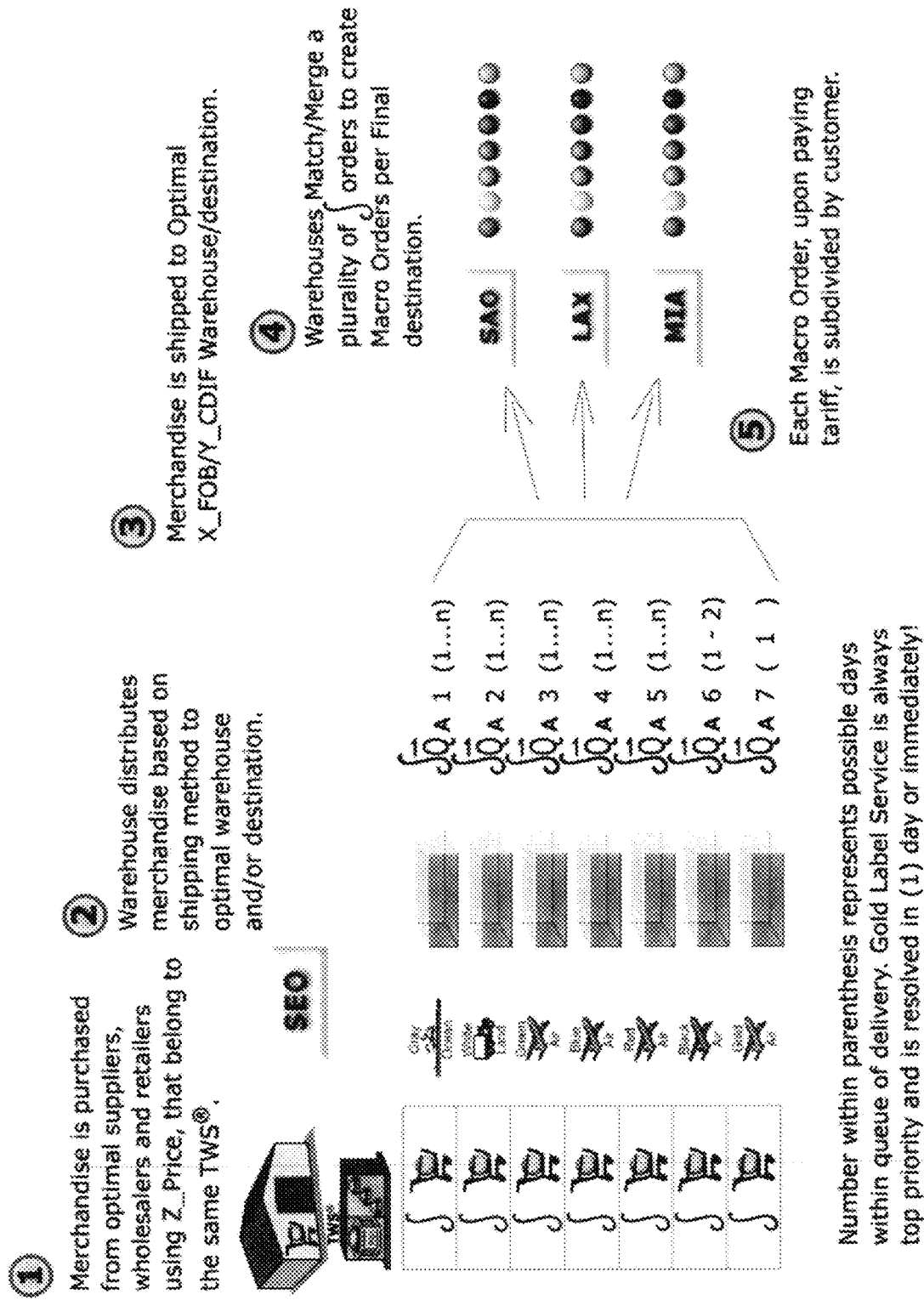
FIG. 30 is a schematic representation of an aggregate Z_PRICE Transportation matrix

FIG. 30 is a schematic representation of an aggregate Z_PRICE Transportation matrix that consists (1) of a plurality of merchandise monitored and controlled by a TWS® that were purchased via the Z_PRICE method. (2) The warehouse distributes the merchandise based on the air, land, sea and X_FOB time dimensions from Leg A and is shipped optimal to (3) Legs (T, U) as X_FOB or Y_CDIF Macro Orders. (4) The plurality of incoming X_FOB/Y_CDIF Macro Orders is match/merged to the optimal UCommerce warehouse. (5) Once, the system creates large containers of merchandise to be shipped and nationalized at the final destination ports, and then its partition large containers into individualized containers belonging to an end user.

Figure 31:
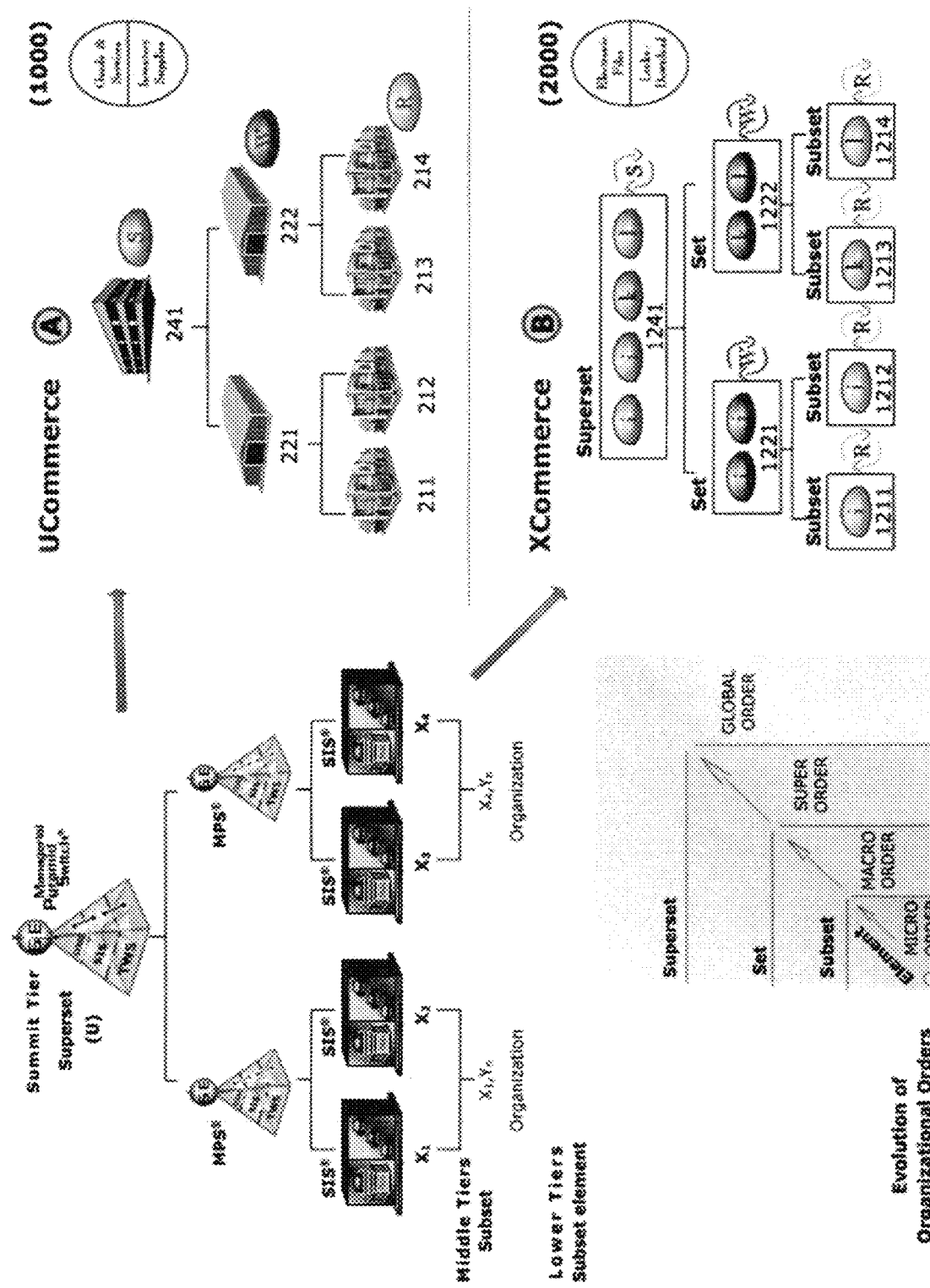
FIG. 31 is a schematic representation of the UCommerce overview that permits the inventory control of physical and electronic merchandise.

FIG. 31 is a schematic representation of the UCommerce overview that permits the inventory control of physical and electronic merchandise. The left hand side consists of a Managerial Pyramid Switch® Architecture that organizes the globe as a superset (U) and is further logically partitioned into sets, subsets and elements. These concepts are the basis for Micro, Macro, Super and Global Orders. In this case, a Micro Order is all of the traffic belonging to a specific element, such as an UCommerce warehouse, a Macro Order is all of the traffic belonging to a specific subset such as a Continental Region, a Super Order is all of the traffic belonging to a specific set such as a Continent, and finally a Global Order consists of all of the traffic belonging to the Superset.

(A) consists of a classical UCommerce configuration of (241) Suppliers, (221, 222) Wholesalers and (211 to 214) Retailers 3rd parties, making (1000) goods and services available to the supplier system. (B) consists of the logical and geospatial distribution of the content of the Internet (U) based on KEYWORDS magnitude and transformed into Simple, Hybrid and Complex Pyramid Structures.

Figure 32:
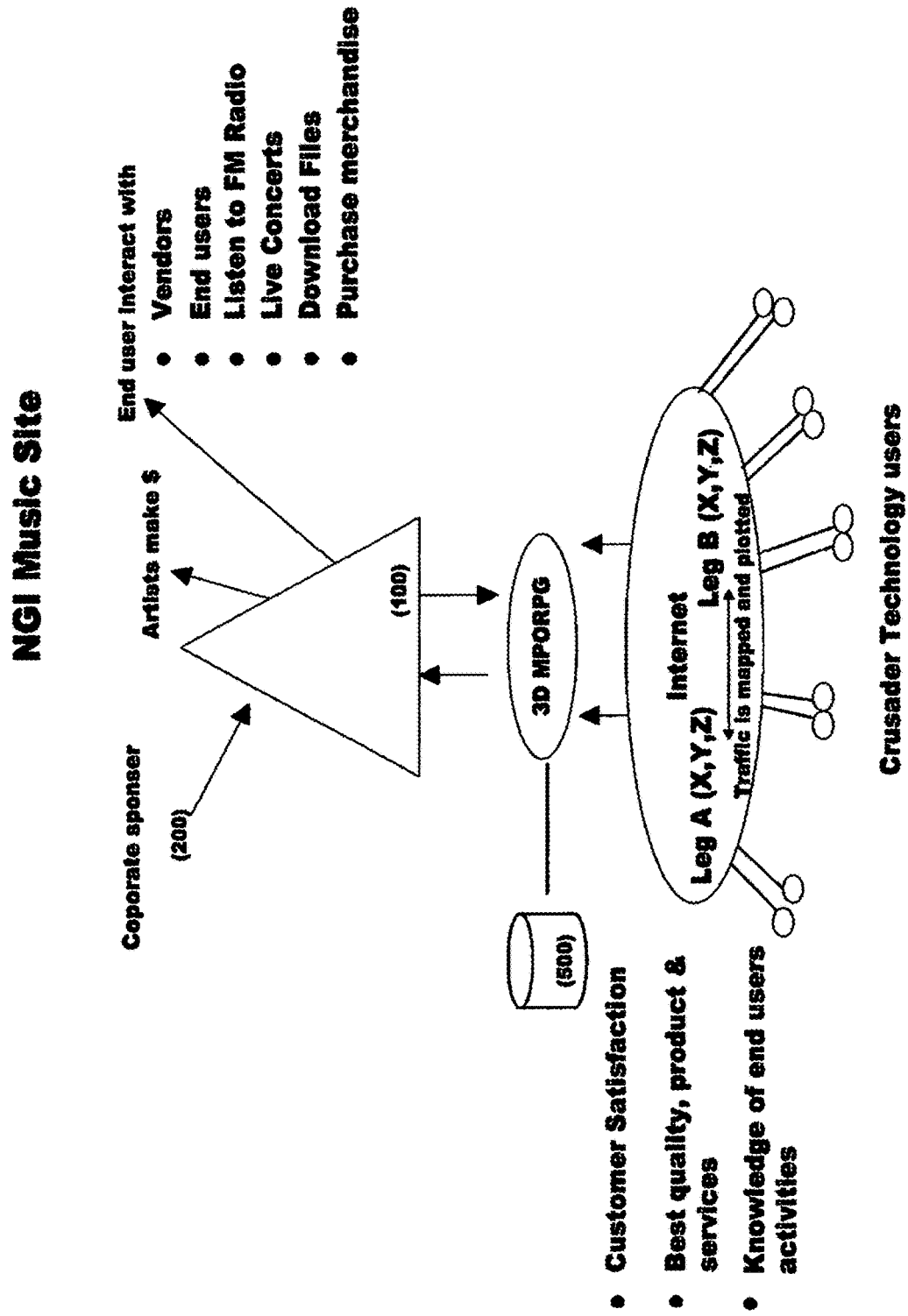
FIG. 32 Music (NGI) Next Generation Internet Site

FIG. 32 is a diagram of a Music (NGI) Next Generation Internet Site, describes a Parallel Telecommunication and Simulation Networks derived from U.S. Pat. No. 6,614,893 that consists of (V) that consist of the Vector trajectory of a call from origin to destination through a telecommunications network. The system (10) maps each Telecommunications Network junction point computers (34) with its own junction point simulation computers (32) that work together as a (20) virtual rendition and simulation network (20) of the telecommunication network (30). The Simulation Computers consists of a plurality of tiers of computers (24 and 26) that allow end users (28) to interact with the system. The system first normalizes and simplifies the complexity of the existing infrastructure and then delegates specialized functions such as Data Mediation, Network Trending and Fraud Management to any node that belongs to the system eliminate the needs of bottlenecks that are created by Centralized designed architectures or those that depend of $3^{rd}$ party platforms.

Figure 33:
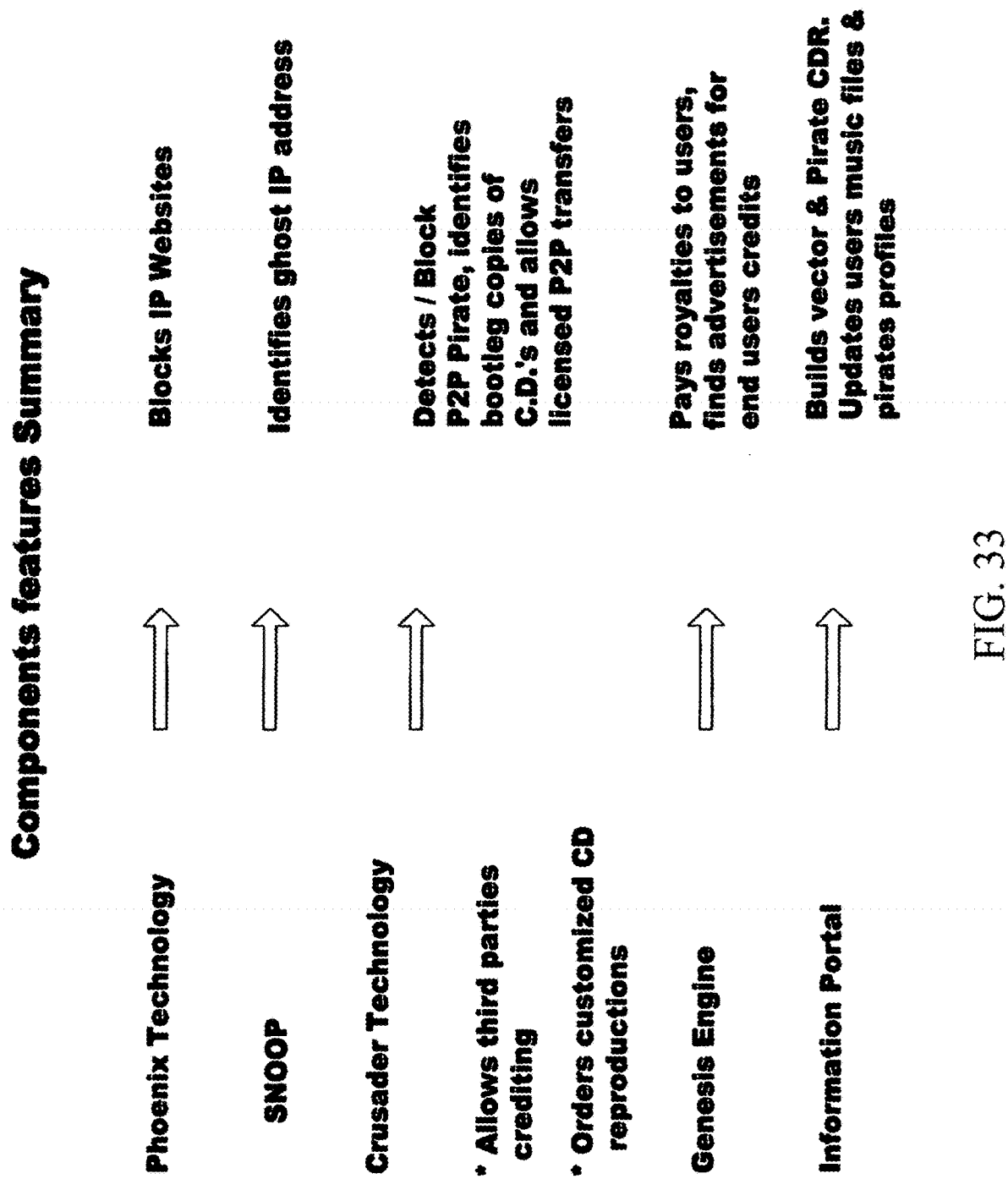
FIG. 33 is a schematic representation of Component features

FIG. 33 is a schematic representation of Component features concurrent independent working systems that make of the Music (NGI) next generation Internet site such as Crusader Technology, Genesis Engine, Informational Portal, Phoenix Countermeasures Technology and SNOOP.

To those in the art P2P technology levels as follows, Level 0 is a classical copy file from computer to computer in a network using UNIX, Level 1 is NAPSTER (P2P), and Level 2 is fast-forward P2P that continues a file transfer if interrupted, Level 3 implies that Leg A can create ghost IP images of it own so that detection is more difficult, Level 4 complicates matters even further by allowing transmitters to have ghost IP images or even worst a plurality of virtual handles for transmission or reception geometrically increasing the difficulty of blocking a file transfer. Note: VDSL or T3 bandwidth will inevitably make P2P blocking very difficult, unless a real time system such as Phoenix Countermeasures exist. For this reason, Leg A and Leg B are detected and the system upon decting a pirate file transfer attempts to block.

Figure 34:
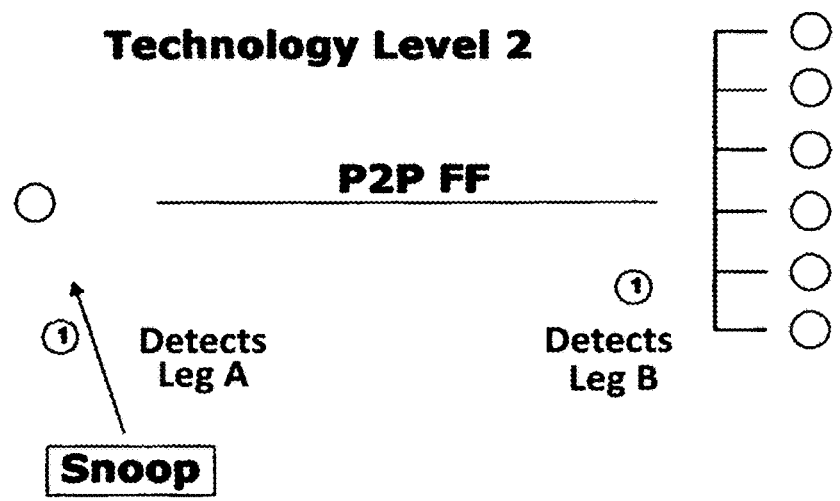
FIG. 34 is a schematic representation of Phoenix Countermeasures technology.

FIG. 34 is a schematic representation of Phoenix Countermeasures technology. Show how to stop technology level 2 P2P pirate file transfers. First, the SNOOP becomes aware by scanning specific web site of IP Addresses that P2P activities exists. Second, Informational Portal, starts to identify, distill, analyze, Leg A, Leg B and music data info to determine of the file is being pirated. After careful evaluation of the file content the system determines that an unlicensed end user is trying to download a protected file. Third, Phoenix portal attempts to block both Leg A and Leg B file transmissions and record the incident.

Figure 35:
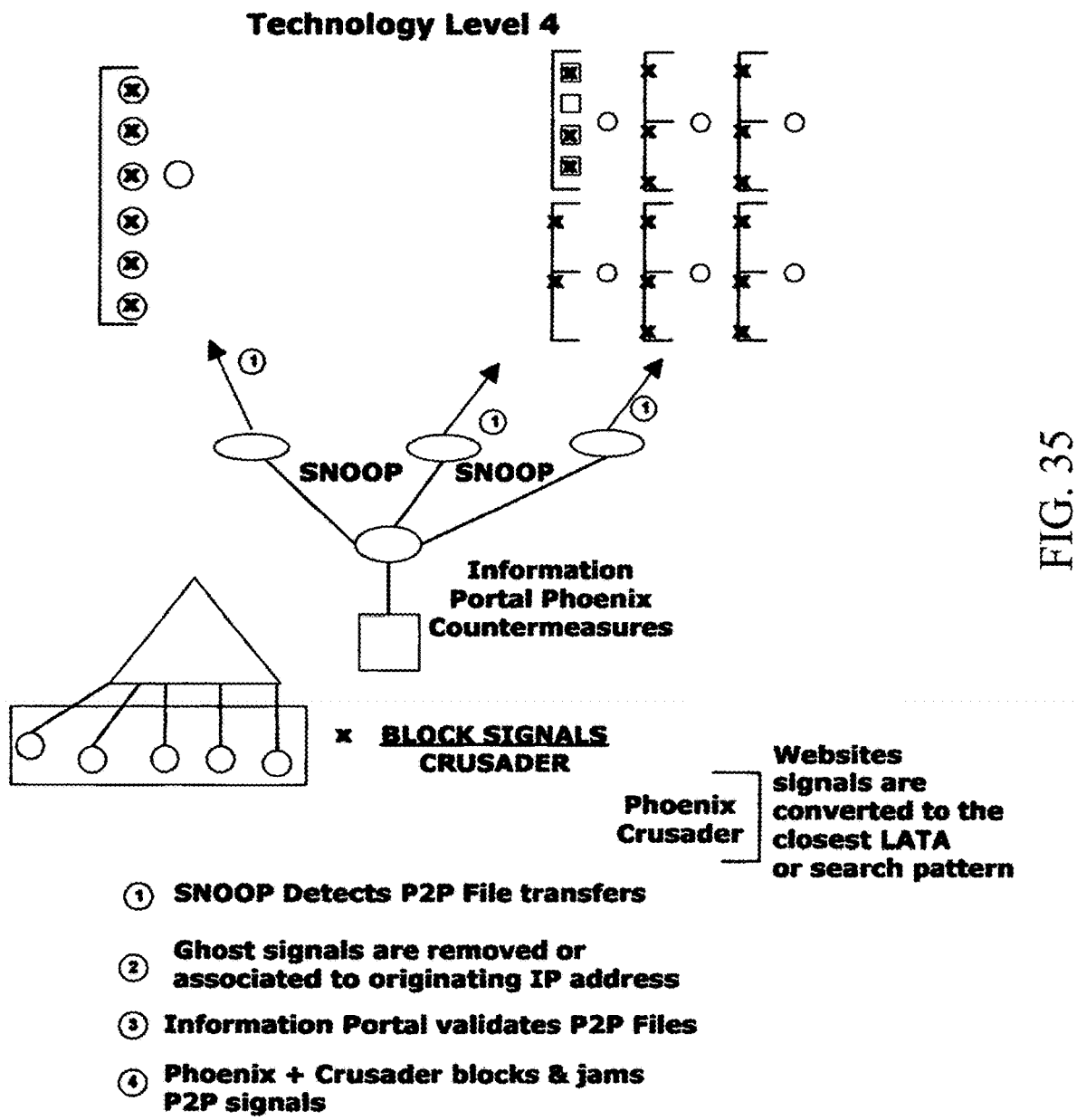
FIG. 35 is a schematic representation of how Phoenix Countermeasures and Crusader technology stops P2P transmissions.

FIG. 35 is a schematic representation of how Phoenix Countermeasures and Crusader technology stops P2P transmissions. First, the SNOOP becomes aware by scanning web sites of IP addresses that P2P activities exist. Second, Informational Portal starts to identify, distill and analyze Leg A, Leg B, music data, ghost data, for both users and software doing the linkage info to determine if the file is being pirated. Third, after careful evaluation of the file content the system determines that an unlicensed end user is trying to download a protected file. Fourth, Phoenix countermeasures, sets a warning flag to stop ghost images and notifies based on LATA of origin Crusader Technology nodes to blockade ghost images. Phoenix Countermeasures, coordinates the blockades of all the ghost and real IP address until the file transfer is killed. SNOOP broadens search to Leg A, Leg B and Ghost IP Address, musical file to further identify further ghost and the Informational Portal and Phoenix countermeasures gets updated attempts to block Leg A and Leg B file transmissions and record the incident.

Figure 36:
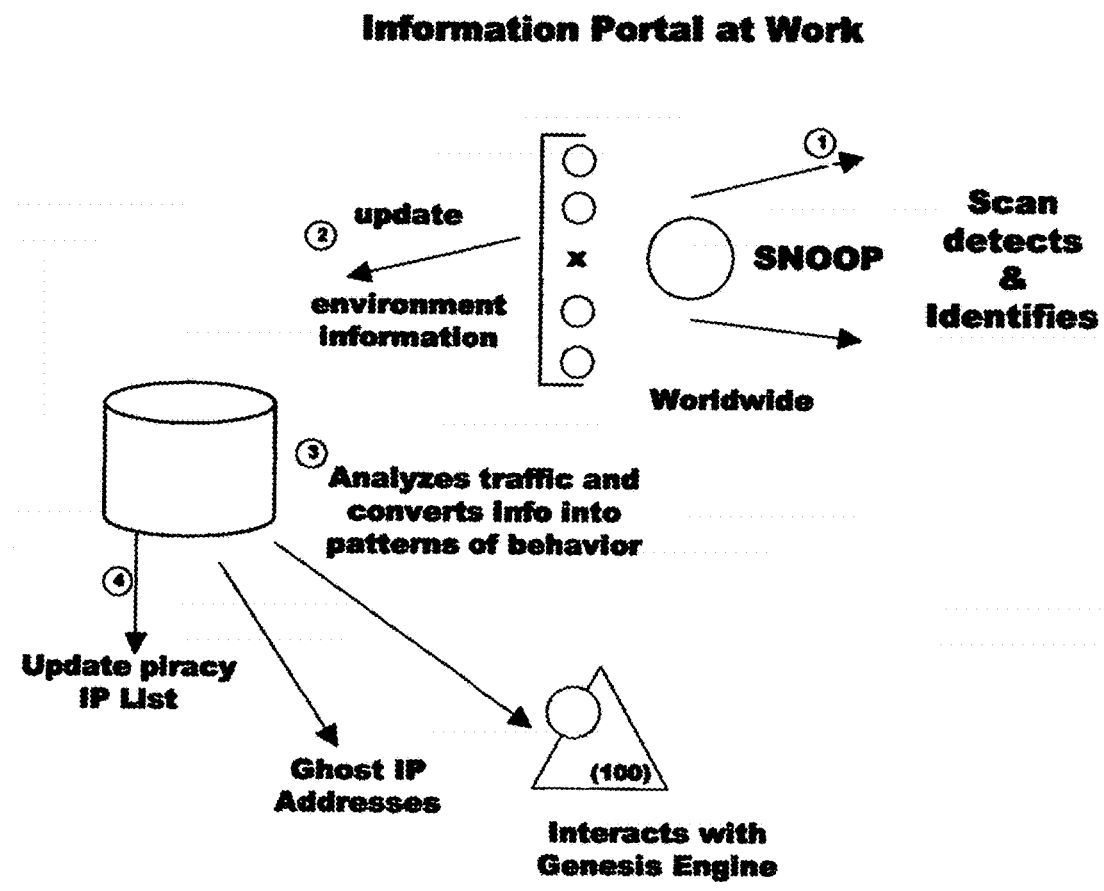
FIG. 36 presents a schematic representation of Informational Portal at work.

FIG. 36 is a schematic representation of Information Portal at work. SNOOP is the eyes and ears of the system to scan, detect and analyze traffic in the environment. This information is converted, distilled and primed to a *lingua franca* Vector CDR and Pirate CDR data structure by the Genesis Engine (100). As a Pirate file is derived its characteristics are flag to SNOOP to search for these new conditions. Each new instance that contains a new IP Address is encountered a ghost path has been identified.

Figure 37:
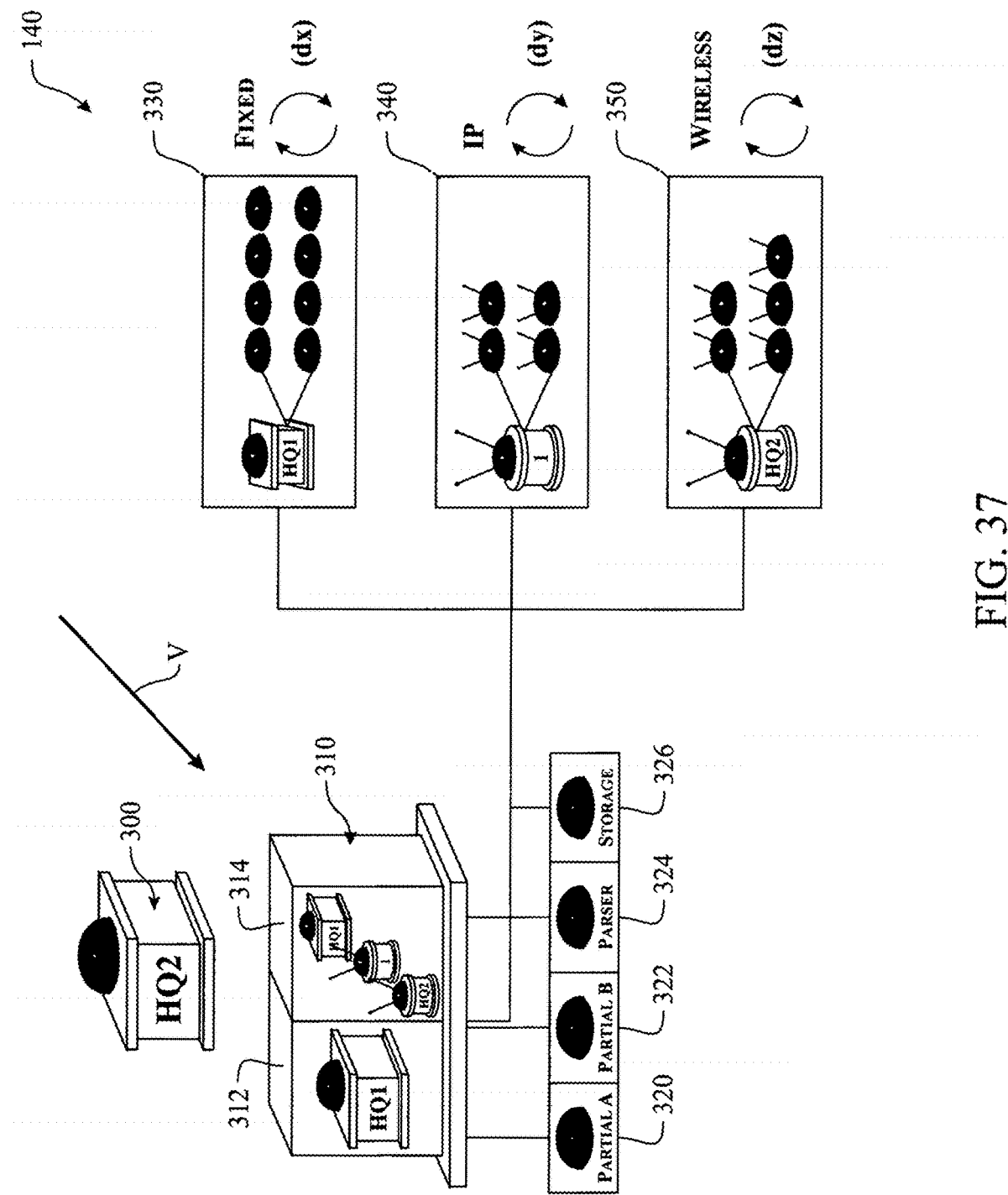
FIG. 37 presents a schematic representation of a lower tier cluster of the HIVE.

FIG. 37 presents a schematic representation of a lower tier cluster of the HIVE which is integrated into the Genesis Engine Supercomputer, that the lower tier cluster of the HIVE behaving as a macro switch that assimilates all of the fixed, Internet Protocol (IP) Telephony and wireless messages within a geographical location.

Figure 38:
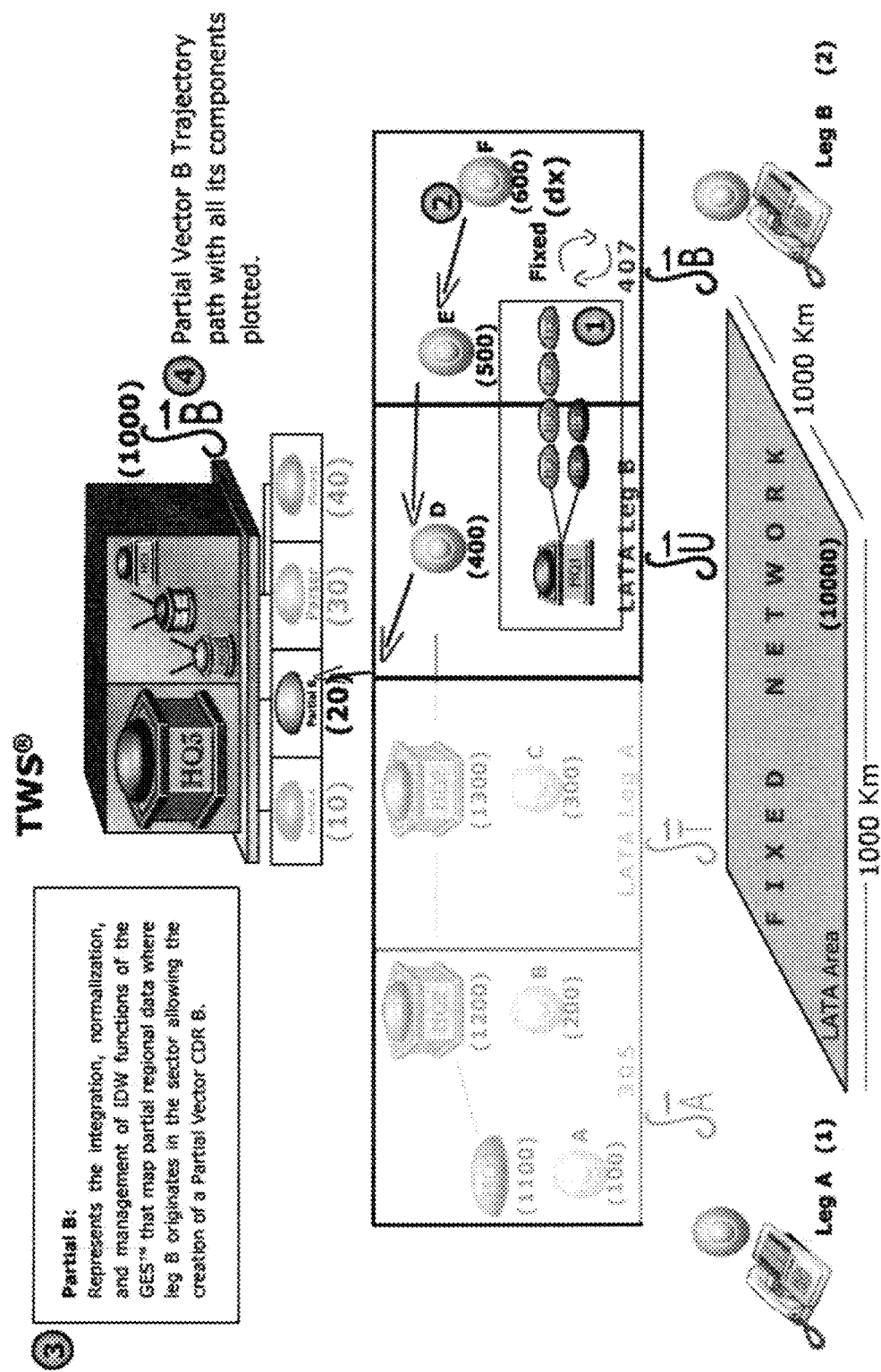
FIG. 38 presents a schematic representation of the TWS® Partial B function

FIG. 38 The TWS® Partial B function is a schematic representation of detecting through the environment (10000) the different circuits (400), (500) and (600) of the call required to plot the trajectory, in particular Leg B side components. The system detects messages from the echo of the fixed environment (dx) that are (1) immediately converted into *lingua* franca messages. Then the call is determined to exceed (2) the LATA domain of the TWS® (1000), and the system Partial B function (20) to build (3) Partial Leg B Vector CDR with Leg B side information. Then the (4) Partial Leg B Vector CDR is sent to the Call Owner, so it can match/merge the resultant correlated Vector CDR.

Figure 39:
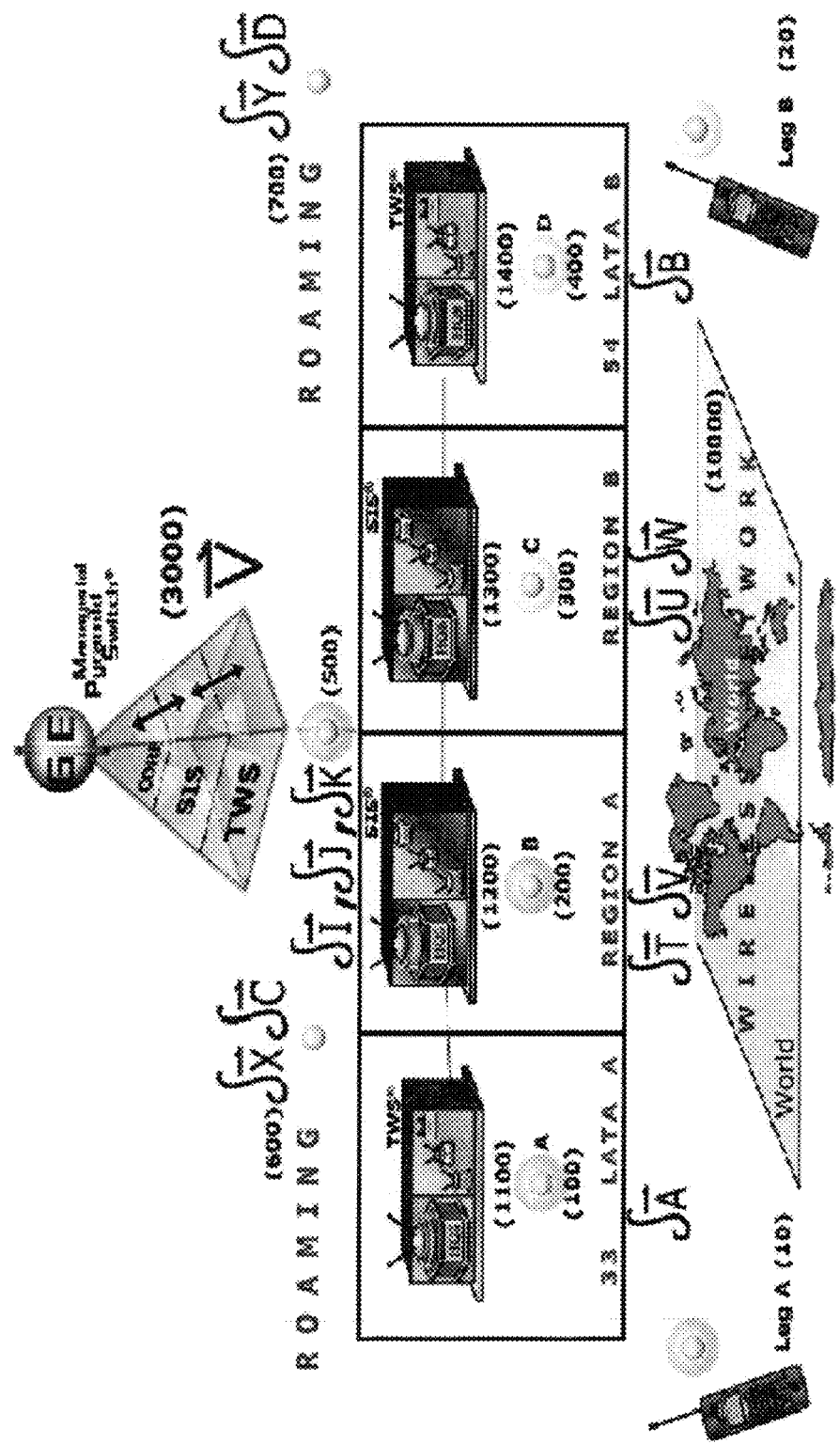
FIG. 39 presents a schematic representation building a MPS® International Complex Call

FIG. 39 Building a MPS® International Complex Call is a schematic representation of generating a correlated resultant Vector CDR from a call that resides within the domain of a plurality of Wireless LATA Areas (10000/10001), in this case the world. This call is the worst case scenario illustration that tags at least four calls. The connected call uses at least two NPE: POP Leg A (100), the origin, and POP Leg B (400), the destination, and Partial Vectors: Legs (T, V) (300), Legs (U, W) (400) and Legs (I, J, K) (700) that represent transport segments, and Legs (X, C) (800) and Legs (Y, D) (900) roaming segments. The MPS® uses five Intelligent Components: TWS® HQ3 Leg A (1100), TWS® HQ3 Leg B (1400), SIS® HQ5 Leg A (1200), SIS® Leg B (1300) and MPS® HQ11 (3100). SIS® HQ9 North America or SIS® HQ7 East USA (not shown in the figures) and/or TWS® LATA Leg A (1300) nodes may own the Complex Call depending on available resources when the call instantiated, and are responsible for generating the Vector Resultant CDR after validating at least four CDR and a plurality of Partial Vectors. As the vector trajectory is being built via the forward and rearward packet messages, the following nodes must gather the missing gaps of information, validate, verify and then complete their corresponding components, in this case Partial Vectors: Legs (X, C) by (1100), Legs (Y, D) by (1600), Leg A by (1200), Leg B by (1500), Legs (T, V) by (1300), Legs (U, W) by (1400) and Legs (I, J, K) by (2100), required to match/merge the Vector CDR.

Figure 40:
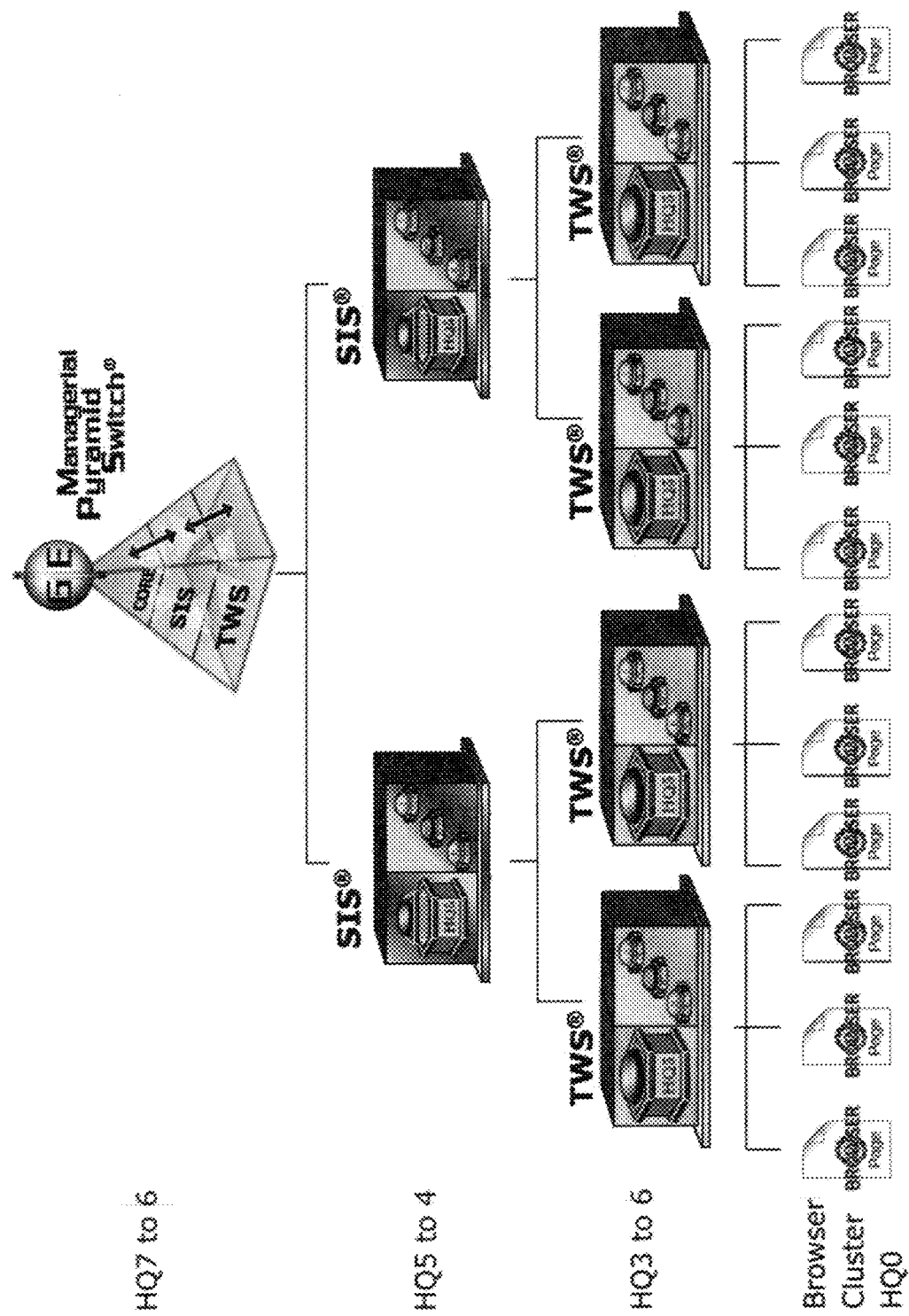
FIG. 40 presents a schematic representation of the Ucommerce/Xcommerce MPS®

FIG. 40 presents a schematic representation of the Ucommerce/Xcommerce MPS®

The HIVE

Patent Tree Disclosure by Reference in View and Support of Interference

Related Applications (U.S. patent application Ser. No. 11/584,941/Issued U.S. Pat. No. 7,809,659)

The technology uses fuzzy math to measure the quality, performance and strength of the traffic traveling through the environment, so that human intelligence can perform strategic planning, and using Business Intelligence programs better understand the needs of the end users. By incorporating the MPS® into a UCommerce method and system, the supplier system will be able to identify inefficiencies, match/merge multiple quotes to take benefit of economies of scale, perform savings optimizing the traffic patterns of the movement of merchandise from Leg A (origin) to Leg B (destination) using X_FOB and Y_CDIF, and convert all of the suppliers, wholesalers, retailers, warehouses and links to possess geospatial, demographic and debit card functionalities to improve product, quality and service.

An expert system Supercomputer, commercially known as UCommerce, is provided to incorporate a plurality of independent nodes, also referred to herein as intelligent components which work together in an organized and hierarchical manner to represent all of the network platform components, the human resources of an organization and the consumers interactions with the system.

An expert system Supercomputer is provided to incorporate a plurality of independent nodes, also referred to herein as Intelligent Components which work together in an organized and managerial hierarchical manner to represent all of the products, services, human resources and consumers of the organization. The system will assimilate a plurality of concurrently working sovereign distribution centers, such as Retailers, Suppliers, Wholesalers and UCommerce warehouses. This concept is further expanded to integrate geospatial components to each message from the environment and allows each network to interact with the MPS®. The technology utilizes business rules to determine, based on traffic volumes and available resources, the node of the system that performs the match/merge. Therefore, Intelligent Components make decisions using business rules, permitting them to perform complex tasks once the Quote or Order Owner builds the Vector CDR, and they have all of the Partial Vector components. This ability of the lower nodes of the hierarchy to complete most tasks permits the system to avoid unnecessary and redundant activities. This permits the system to work independently at a lower throughput when the centralized SMP is absent. The HQ leader of each Switch has the ability and authority to create an environmental bitmap that consists of a summary data of their entire organization. The highest HQ leader gathers, distills and disseminates the environmental data, so it can assign, control, coordinate and synchronize directives to its entire organization to process tasks. The solution of large and/or complex networks requires geospatial data which denotes a 3D mentality, the hierarchy organization and plurality of networks were transformed into a Pyramid like structure, since it constitutes a better representation of the reality and elucidates the magnitude of the problem that is being solved.

An expert system Supercomputer, commercially known as XCommerce, works in an organized and hierarchical manner to represent all of the links, content of the Internet and the massive traffic volumes derived from the consumers interactions with the environment.

The Internet is considered a global telecommunications network with 1,000,000,000 subscribers, and thus most of the business rules apply. UCommerce and XCommerce are business intelligence applications designed to give the end users the latest information. In order to eliminate redundancy, raw data must be converted by a Supercomputer into primed data with patterns of behavior for real time financial evaluation to dynamically adapt to the changes of the environment. The parallel clustered multi-tiered Supercomputer consists of a plurality of nodes, where each one is programmed with Artificial Intelligence software programs, commercially known as Intelligent Components or IC, to perform processing power predefined and ad hoc tasks based, that must be logistical rationalized based on the requirements derived from the environment.

The cluster is also known as the Superset (U). The cluster is divided into three geospatial tiers: a) Global, b) Regional, and c) local possessing specialized Data Mitigation, Network Trending, Provisioning, 'Data Mart' and Business Intelligence functionality relying on a sharable Extreme Large Data Base (XLDB) tier. Each of the nodes or IC is assigned a geospatial area of coverage range from 0, small geographical areas, to 7, the world, a managerial hierarchy system denoted as HQ. Each Intelligent Component possesses the following characteristics and functions:

Database means with real time information of the inventory and the latest prices of retailers, suppliers, wholesalers and UCommerce warehouses that will give customers products and services delivered door to door at the optimal price and time. The system will consider the world as a single supra macro region, and thus the consumer will readily have available same ocean, land and air cargo such as blue, red and black label services from local, regional or global products and services. This method offers small and large customers the ability to locally buy and sell worldwide merchandise, thus allowing them to compete anywhere in the world without the need of storing physical inventory.

Total Quality Management or TQM functionality that analyzes and identifies product, quality and service designed to determine customer satisfaction and perceived value.

Data Manipulation or DM process consists of gathering, reading, priming and inserting Network Platform Equipment transactions into a structured format that can be used for billing, call routing and vectoring, fault management, fraud detection and network statistics.

Management Information Systems or MIS methods that organize, transform, distribute and replicate organizational detailed and summarized *lingua* franca information created by each transactional processes and activities, are transformed and organized into a relational manner from the environment.

Expert Information Systems or EIS mechanism permits business intelligence software to evaluate information in a structured way for decision makers, such as the CEO and a president of an organization, to understand where and why things happen in an organization. With this information, the visionaries of an organization can make tactical adjustments and strategic course corrections.

Inventory Control means depending on the Intelligent Component's assigned managerial hierarchical geospatial area of coverage assignment as Local, Regional or Global.

All of the Intelligent Components work collectively and independently from each other, and still simultaneously perform the task analyzing, evaluating, gathering and processing information from the environment in real time, or from the moment of incipiency of receiving the fuzzy logic piece of information that triggers new and updates pending activities or tasks. The cluster of computers must be subdivided into a superset, set, subset and element, grouping the following Managerial Pyramid Switch® architecture with local, regional, global and informational sub cluster partitioning to help build three geospatial tiers:

The Summit Tier or Managerial Pyramid Switch® or MPS® Information Portal HQ7 coordinates the Data Mart cluster used for Business Intelligence and Invoicing that work with Crusader Technology Software via the Internet that allows users to have access to their business and personal information in real time. The system analyzes each Crusader Technology Software interaction to better understand what the client values in order to keep the subscriber satisfied. HQ6 is the master node of the cluster (U) that has control of all of the financial institutions interfaces, human resources and Network Platform Equipments of an organization. Consequently, each Intelligent Component has the four cluster configurations as follows: HQx ([I], [J], [K]y, [T]), where x ranges from 0, local, to 7, global geospatial scope, [I] Global (Superset), [J] Region (Set), [K] Local (subset), y denotes the element, and [T] XLDB or Data Mart Cluster.

The Middleware Tier or Synergy Interface Switch® or SIS® controls UCommerce warehouses based on continent HQ5, continental region HQ4 or LATA (Local Access and Transport Districts) HQ3.

The Lower Tier or Team Work Switch® or TWS® controls a plurality of points of presence based on the organization suppliers HQ2, warehouses HQ1 or retailers HQ0. These HQ2 to HQ0 collectively constitute the workhorse of the system, and Intelligence has control of users' requests and replies to the system. These Intelligent Components coordinate and synchronize the entire billing, provisioning and TQM functionality requests and replies. They also have the ability to interact with 3rd parties organizations and supply them with a summary of all of the data they have processed.

Virtually simulate 3rd parties organization functionality by storing via software interface, district via TWS®, region via SIS® or globally via MPS® to reduce the need of having to rely on the centralized mainframe. Each Intelligent Component or Intelligent Data Warehouse must only synchronize the latest inventory once every predefined cycle, and then the artificial intelligence programming will optimize and maximize its organizational management logistics. The nodes of the system will interact directly with the provisioning and physical or queued inventory of each member of a 3rd party distribution means.

Intelligent Components can request to members of the same group or Team Work Switch® any excess buffer resources to complete a task (lateral synergy). Members of a TWS® can coordinate the resources of any parent and their subordinates to complete a task. Members of different regional cluster can synergistically collaborate to process tasks via Synergy Interface Switch® and perform worldwide tasks thanks to the summit cluster or Managerial Pyramid Switch®.

Intelligent Components can be programmed to behave and to be the substitute of one or more nodes in performing organizational tasks, so that collectively the 'HIVE' works as a Super Intelligent Component engulfing a global supplier system. The supplier system has specialized interaction means with the environment that gather, distill, analyze and then standardize and convert the raw information into primed *lingua* franca data, which in turn is quantified, qualified, organized and transformed, so that Information Entropy is achieved and consequently the chaos and anarchy or 'Spaghetti Phenomena' is eliminated. Collectively, multiple Intelligent Components work together to parallel and simulate an existing organization that possesses an UCommerce supplier system.

Each primed *lingua* franca message by the system has a single version of the truth vector trajectory that assigns a discrete amount of Intelligent Components, so they can communicate amongst themselves or members of the organization and the Internet clients. Based on the vector trajectory, each message has an owner and the path of all of the participating Intelligent Components required to process a given activity, so they can communicate amongst themselves via forward and rearward chaining. Proactively, the human resources of the organization use business intelligence software that can send parameters to the master node of each TWS® (subset), SIS® (set) and MPS® (superset) that permits humans to control, coordinate and synchronize directly their network. The software sends the parameters to a single or plurality of clusters, so they can optimally analyze, assign, calculate, distribute, prioritize and weight the rate of messages and timing limitations for the next queue of incoming messages, based on the conditions of the environment and historical trends.

HQ3 and higher are also Intelligent Data Warehouses, performing data warehouse functions, and are programmed to monitor and control multiple nodes. They act as virtual simulation of the organization. HQ2, HQ1 and HQ0 that are designed to remove redundancy, geospatially distribute activities, and to correlate and update information. Intelligent Components are programmed to valorize with supply side economics the limited resources and capacities of the network with their parents, peers and subordinates (lateral and vertical synergy), so that the system does not tax the capacity of the existing network in real time.

Intelligent Components are programmed to immediately create, plot and update purchase orders as soon as new messages from the environment are processed. Intelligent Components analyze the latest environmental conditions to manage and organize the flow of information within their organization, from predefined point A to point B routes to avoid clogs and saturation maximize throughput, and assign and prioritize cluster nodes via synergy that have substantial buffer resources since unused resources are considered waste or garbage, which is the independent variable that is directly related in creating saturation.

Thus, network traffic is analyzed by supersets, sets, subsets, groups of elements and by element domain, based on the known latest working conditions of each Intelligent Component, network routing traffic patterns and throughput limitation of each given domain. The TWS®, SIS® and MPS® perform the non obvious task of removing complexity in order to be a real time system by eliminating data redundancy, filtering, quantifying, qualifying data as good or garbage, and minimizing waste before beginning to transmit the data through the managerial hierarchy system.

Related Applications (U.S. patent application Ser. No. 11/584,271) "Parallel computer network and method for telecommunications network simulation to route calls and continuously estimate call billing in real time" comprising:

Computer network system assimilates, replicates, simulates and transforms data into a *lingua* franca standard, so that the plurality of networks, providing services through local, regional and global traffic trending, can be gathered, distilled and disseminated to better understand competition, churn and the consumer's needs.

Accordingly, there is an established need for a real time billing that makes sure that all the transactions are rated in a timely manner to avoid fraud and insure that the consumer at large gets the best quality and service of product. This technology overcomes the drawbacks and limitations of the prior art by allowing multiple concurrently working nodes to convert and transform the information in real time into a standardized method that enables the system to distribute the load and tasks within its available resources at the incipiency of a call regardless of traffic volumes. By means of having the nodes clustered and then interconnected with a fiber network, the mission critical throughput raw capacity is derived, unfortunately calls patterns are not bell shaped uniform distributions and instead are volatile and asymmetric in nature that render some resources out of the loop and overwhelm others with volumes that exceed the rated capacity. To solve this dilemma, a 3D Pyramid, like an structure architecture, was developed to create a mirror image of the environment, where each individual Network Platform Equipment (NPE) becomes a basic block of the system. This architecture permits the association and linking of multiple blocks to build a complex managerial organizational hierarchy that possesses a plurality of networks. The blocks are interactive data flow coordinators that simplify and transform raw environmental data into primed, normalized, network wide, *lingua* franca, and correlated geospatial data that permits human intelligence to interactively make real time decisions.

The use of Partial Differential Equations permits the system to handle two or more independent calls, eliminating the unnecessary flow of data upwards towards the summit tiers that tend to saturate the system. Once the geospatial data is normalized and plotted, the summit tier uses routing algorithms to fill the missing gaps of information to match/merge the Vector CDR without placing any burden to the summit tiers. The ability to distribute the tasks gives the "HIVE" greater latency, redundancy, and robustness, which is the basic requirement for mission critical systems. The MPS® model coordinates, controls, delegates, distributes and synchronizes the activities of the environment by using the Vector CDR methods, and a system that eliminates redundancy. In other words, the MPS® works at optimal throughput levels by removing the erroneous tendency of delegating all the activities to the unmanaged centralized Symmetric Multiprocessor Platform that clogs the system once the traffic volume exceeds 5% of the rated capacity. Another feature is to partition geographically the organization (X_LATIN), so that traffic can be load balanced, which is critical for the purpose of billing and identifying the exact location of each circuit. Information that is transformed and normalized into *lingua* franca geospatial data (LATIN) permits the system to simulate, recreate and render the vector trajectory of each call at incipiency.

Modifications as per the Managerial Pyramid Switch® multi-tier system:

Rule 0: All the messages of each Network Platform Equipment are integrated, mapped, normalized, and standardized to a *lingua* franca organizational geospatial data structure known as Y_LATIN or simply LATIN.

Rule 1: TWS® or HQ0-HQ3 receives the raw feeds from the Network Platform Equipment immediately via SS7 packets. The node scans through the data using a filtering mechanism to identify each call or Network Platform Equipment message.

Rule 2: The Parser function gathers, distills, and converts the information into a format that any node can understand, and converts it into a message with a predefined data structure.

Rule 3: TWS® determines via a lookup table the Intelligent Component responsible for analyzing a given call, and immediately assigns a Call Owner.

Rule 4: SIS® Intelligent Components must identify the tandem circuits of a call, and derive a single version of the truth.

Rule 5: MPS® calls that travel through the global domain. The Intelligent Components are responsible for coordinating, controlling, managing, and monitoring the activities of their organization to maximize efficiency and effectiveness.

Rule 6: A call consists of at least two Partial Vectors CDR and the following components: carriers, dynamic and fixed cost, geospatial coordinates, networks, and message protocols.

Rule 7: Leg A Owner gathers all the information of the origination network and must match/merge the resultant Vector CDR once the call is released.

Rule 8: Leg B Owner gathers all the information of the destination network.

Using the benefit of U.S. Ser. No. 11/584,271 Abstract "a telecommunication network that interacts with a plurality of concurrently operating sovereign, multinational organization networks that render their worldwide subscribers local, local long distance, international, Voice over IP, Internet and Wireless services; and an artificial intelligence billing mechanism configured to integrate information from a plurality of independent networks within said system using an incomplete set of available call-related data. The system matches, merges, correlates and rates independent billing segments of each call or transaction to create a resultant single-version-of-the-truth billing entity."

Using the benefit of U.S. Ser. No. 11/584,271 dependent claim 3 "(A) a plurality of links meeting at a junction point describing the organization hierarchy of the network, with the links in communications with each other as well as lower tier and higher tier nodes;
(B) said system arranged and configured to correlate billing entities, perform data manipulation (DM, error and fraud handling, messages and packets monitoring, network traffic system statistics, system failures, and transactions at each junction point;
(C) each junction point device having the capacity to process information to and from the telecommunication network infrastructure environment including a plurality of class 5 Central Office Switches, Platform Equipment, Cell Sites, and Mobile Telecommunications Central Offices clustered together by the worldwide Internet, satellite transmissions and network hyperlinks."

Using the benefit of U.S. Ser. No. 11/584,271 dependent claim 5 "integrating a parallel-distributed computer system into a telecommunications network to define a plurality of concurrently operating independent nodes distributed throughout the telecommunications network into a managerial hierarchical arrangement comprising tiered groups of nodes within the network."

Using the benefit of U.S. Ser. No. 11/584,271 dependent claim 9 "transforming said gathered information into a *lingua* franca standard gathered at computer nodes and data warehouses of the system; and deriving a virtual copy of the network in the form of an echo of all the packet traffic that is broadcast to the lower tiers of the hierarchy, by obtaining the messages from the actual complex Telecommunication network infrastructure, such that the environment data is immediately simplified, normalized and then integrated to possess geo-spatial attributes that enable the system to simulate the activities of Network Platform Equipment and perform a MPORPG like representation of their activities in real time."

Using the benefit of U.S. Ser. No. 11/584,271 dependent claim 14 "further comprising, once a node identifies a new transaction and determines an owner using said business rules, the step of having the call owner create a Vector CDR that is the single version of the truth."

Using the benefit of U.S. Ser. No. 11/584,271 dependent claim 15 "after the step of identifying the owner and the call trajectory, the step of assigning a unique SSN of the call for future reference."

Using the benefit of U.S. Ser. No. 11/584,271 dependent claim 16 "breaking the calls down into a plurality of components and tandem routes that make up the calls, wherein the Vector and the SSN communicate to each node which computer owns the call and instruct which computers will perform particular functions, wherein the validity and uniqueness of each transaction is confirmed for accounting purposes."

Related Applications (U.S. patent application Ser. No. 11/584,941/Issued U.S. Pat. No. 7,809,659)

Intelligent Components are programmed to eliminate clog and saturation at the point of attack, so that the system can reach Information Entropy at the organizational level which is a necessary condition to be considered a real time invention. Intelligent Data Warehouses stabilize the flow of financial conditions, criteria, inventories, shipping cost and tariffs required for billing, and update to the Information System or XLDB Data Mart with transactional statistics that are made available to the rest of the Intelligent Components to better optimize resources and available bandwidth. Each Intelligent Component is programmed to be autonomous, and through means of the managerial hierarchy and synergy, can work in parallel with others to function as a single unit. They process all of the information forming a virtual instance organizational environment.

The members of the hierarchical management pyramid analyze, update, monitor, control, validate, verify and administer information that in turn eliminates the 'Spaghetti Phenomena', which in turn permits Informational Entropy once primed data has balance, harmony and proportion. This fact alone removes the need for a central mainframe and also shows that garbage in equals to garbage out and that raw data derived from the chaos and anarchy of the environment is meaningless, and that the real time solution consists of simultaneously synchronizing the workload (MIS), optimizing throughput (Engineering), proactively satisfying clients demands (TQM) and updating human intelligence with good information (EIS); and the fact that they are all of the required or mandatory at once is not obvious in nature.

Each Intelligent Component has its own location identification means, one said summit parent simulation computer being located at each of a plurality of subordinates. Depending on the size of the network, the architecture of how computers are linked together might require a plurality of scopes, each with its own parent and subordinate. For the purposes of this invention, retailers, wholesalers and suppliers are available. Furthermore, each node must belong to the main cluster or 'HIVE', and to a geospatial specific domain local, regional or global cluster.

Every single activity and purchase order is made in parallel, starting from the point of origin and ending at the point of destination, and by rearward chaining of routing vector information through the simulation network to the point of origin. The Managerial Pyramid Switch® Architecture provides a computer network system which plots a purchase order providing the lowest prices and the best terms and conditions available for that transaction at that moment, and a request is initiated and continues in real time as the activity progresses.

The Managerial Pyramid Switch® Architecture provides such a computer network, which minimizes bandwidth usage by performing, cleaning, standardizing, organizing and transforming the raw data from the 'Spaghetti Phenomena' or clog or saturation or Legacy System environment, so that UCommerce supplier system can analyze and evaluate the best usage network resources to satisfy the needs of the customers in the following manner:

a) The 'HIVE' administers, coordinates, controls, mimics, manages the live network and also reflects a concurrent and parallel working simulation of the live network call routing activities and transactions.

b) The heart of the system is the business intelligence TQM functions that make sure to predict when a customer becomes dissatisfied to immediately avoid churn, and also enable the supplier system to bill and manage the follow of money in real time.

c) The three clusters of tiers belonging to the managerial hierarchy update their subordinate components by sending only summarized information packets to their organizational subordinates. Consequently, these updates facilitate network wide information in real time to each intelligent component, so that the decisions are based on facts, and not lookup tables or hard coded predefined routing patterns. This is the basis for the development of the two new methods: Z_PRICE and W_RANK.

Related Applications (U.S. patent application Ser. No. 10/926,446/Issued U.S. Pat. No. 7,050,813) "Parallel computer network and method for telecommunications network simulation to route calls and continuously estimate call billing in real time"

Intelligent components HQ0 that monitor the task of each independent end user. The intelligent components verify the new information and notify the independent end user client with the latest prices and inventory availability. The end user is notified via a message signal that their quote data has been optimized. The system displays the newly optimal data in the screen. To those in the art independent end user describes unique end user.

All the components work collectively and independently from each other, and still simultaneously perform the task analyzing, evaluating, gathering and processed information from the environment in real time or from the moment of incipiency of receiving the fuzzy logic piece of information that triggers new and updates pending activities or tasks.

Information Portal is the summit tier that works with the software via the Internet that allows users to have access to their business and personal information in real time. The system analyzes each software interaction to better understand what the client values in order to keep the subscriber satisfied.

The traditional Internet is an open system that many experts says bring chaos and anarchy, whereas NGI uses client/server authentication, firewall, and snoop technology to identify each end users that interact with the system. It is mandatory to confirm the end user's profile so that the system can know to which areas of the supplier system it may grant access.

(2) Language: The supplier system follows the client/server system, where the Genesis Engine Architecture is the Server, and the end users Crusader Technology software are the clients. Today for example some companies are boosting that they are inventing faster file-sharing mechanisms, when we all know that the Record Industry Association sued a company like Napster and was able to force them to pay royalties to copyright holders. The significance of this lawsuit is a clear message from the courts that our society is based on law and order and not anarchy and chaos. Thus law and order in the Internet and international trade should be a key component when designing innovation for the next Generation Internet.

Information Portal Server/Crusader Technology Client Software.

All the components work collectively and independently from each other, and still simultaneously perform the task analyzing, evaluating, gathering and processed information from the environment in real time or from the moment of incipiency of receiving the fuzzy logic piece of information that triggers new and updates pending activities or tasks.

An Intelligent component can programmed to belong any of the following multiple tiers. (1) Each Intelligent Component is also an independent working entity.

(2) Genesis Drones: HQ2-HQ0 domain has control of all the users request and replies to the system.

Note: These servers coordinate and synchronize the entire billing, provisioning and TQM functionality request and replies. HQ2, HQ1 and HQ0 are designed to remove redundancy and to locally correlate and update information. They share resources with parent, peers, and subordinates (lateral and vertical synergy) so that the system does not tax the capacity of the existing network in real time. They immediately create, plot and update purchase orders as soon as the first message of the call or transaction are scanned in the network.

Intelligent Data Warehouse HQ3-HQ5 Virtually simulate Domain, Regional and Summit tier members of the organization to reduce the need of having to rely on the centralized mainframe. The must only be synchronized once every cycle, and then they will act virtual servers to which they belong. They will send updates to the machines they are virtually simulating so that the actual servers can make the proper adjustments as if they had received the entire traffic of transaction themselves (local virtual instances of the organization).

To request to members of the same group any excess buffer resources to complete a task (lateral synergy). To coordinate available resources and activities of any parent node and their subordinates to work as team to complete a task (vertical synergy). Node can work together to behave as a single Intelligent Component entity (parallel clustered computers). The intelligent components reflecting the input and output of information from the environment of a computer network system:

Collectively multiple Intelligent Components work together to parallels and simulated an existing organization that possesses a supply chain logistical network. Each message is converted to a *lingua* franca standard so that all the Intelligent Components can communicate amongst themselves, members of the organization and subscribers. The components send request and replies via forward and rearward chaining. The parent Intelligent Component controls the rate of messages within their own organization and the duration of a next cycle based pre-established human resources criteria. HQ3 and higher are also Intelligent Data Warehouses perform data warehouse functions are programmed to monitor and control multiple nodes. They act as virtual simulation of the organization.

Virtual Reality Servers VRS2-VRS0 are specialized nodes that operate through MPORPG computer software. Crusader allows end user to interact with the supplier in standalone mode, or to interact with other users by using MPORRG software. The Virtual Reality Server and Crusader Technology paradigm deals with the ability to be able to interact with a 3D world supplier and perform live financial transaction, interact with individuals and/or virtual animated characters and the ability to listen and view merchandise and works of copyright holders. Virtual Reality Servers are an integrated part of the Genesis Engine architecture clustered and connected together to model and recreate 3D Cyberspace Internet site. Crusader Technology computers also become part of the Genesis Engine Supercomputer while the member logins to the supplier's system. Immediately after, Media Prophet and Command Centre transfer subscribers with the latest billing information even tracking live call billing.

The Genesis Engine architecture is also responsible for physical and programmatically distributing available bandwidth and available HQ0 drones. The Genesis Engine Intelligent Components can work in any of the different functions:

First, Genesis Engine Soldiers HQ2-HQ0 are responsible for filtering, priming, and converting all messages into a *lingua* franca.

Second, Genesis Engine Leader is responsible for controlling, coordinating and managing all available resources within their level of Command and Control.

Third, Virtual Reality Server gives each subscriber an interactive 3D virtual Reality of the Customer Service Center for the Telecommunication organization.

Fourth, Virtual Reality Client is a 3D interactive computer program that allows the member to have the feeling that he or she is physically present in the real world.

Fifth, The Virtual Reality Server interface is responsible for updating the billing information of each subscriber on the fly. Calls that are active will be a best guess estimate, since formal rating occurs once the call disconnects and the network wide information is validated.

Sixth, the summit tier HQ6 and HQ12 Intelligent Components after analyzing the latest traffic patterns determine routing Vectors for all request and replies, whether individually or for clusters of transactions, from point A to point B and monitor and change the priorities as necessary to avoid a network trouble area or to maximize available bandwidth usage. Thus, network traffic is analyzed, and the latest working conditions, which contains the latest network routing traffic patterns that the hive has chosen.

VRS 2 to 0 broadcast to the end users the latest information that was derived by the Genesis Engine. The VRS possess a clone copy of the subscribers that each Crusader Technology is watching. When a change is identified the system automatically updates each end users using a reverse Ad Hoc Query mechanism, this is done to save considerable bandwidth that redundant query makes. Another advantage is that each server sends the information as soon as the supplier system has enough resources. Different versions of the software may exist based on the needs of each user. Furthermore, Crusader Technology is not a blind dummy that follows the trends obtained by the Genesis Engine; it uses the latest primed patterns of behavior to better identify conditions that the end user has customized. The end user customizations made to the software as data feed information and patterns of behavior are updated consist of the key decision making component. The computer responsibility is to read through the mountains of information, and give them to the end users the latest and most accurate billing information, product and service.

Related Applications (Ser. No. 11/085,678) "Method and Apparatus for Distribution of Real Time Audio and Video over the Internet"

Crusader Technology is a software that is a hybrid Firewall system that filters out unlicensed P2P transactions.

Phoenix Countermeasures: consist of an independent set of nodes that analyzes the known traffic and determine patterns of behavior to filter out copyrighted materials from the ocean of files transmitted over the Internet. This software is also responsible for killing P2P file transfers that are uploading/downloading unlicensed files. This program is responsible for modifying and updating SNOOP search patterns.

SNOOP consists of a plurality of spyware software that continuously detect-P2P file transfer over specific IP Addresses and websites based on geographical location. Each P2P requires a transmitter and receiver end users that are identified and the updated by Informational Portal.

Licensing: the system promotes the sale of electronic and physical products and services. The system makes sure that all the audio and video files that are P2P files transferred are licensed. When the system identifies a P2P file transfers it will block the transaction until Leg A and/or Leg B pay for the appropriate licensing. End users are permitted to transfer ownership to other computers that belong to the same user provided they have Crusader Technology and the end user accepts the terms and conditions of the software.

Intelligent Components scan and detect through search patterns a plurality of IP address to identify the traffic that has the potential of being unlicensed P2P file transfer.

Intelligent Data Warehouses that coordinate resources to make blockades of unlicensed P2P file transfers. The object is to identify common pirated, protected file musical signatures list so that scan nodes can identify each file without having to perform unnecessary and redundant time consuming activities.

The system must validate and verify each end user with accurate geographic locations, age of the person and other data mining demographics to proactively avoid churn and fraud.

Each node will have software that allows interaction and processing of financial transactions with the supplier system, while protecting the privacy of the individual. This software will block any unlicensed P2P file transfer activity it detects and notify the supplier system with the latest gathered data. To those in the art this software denotes a client application of Crusader, and the supplier system the server of the HIVE supercomputer.

The system apparatus includes a data warehouse for logistics, planning, and provisioning, to facilitate the distribution of merchandise of items, which cannot be sent through the computer such as books and t-shirts to members via e-merchants. Once the end user interaction software is installed any file sharing program will be able to bill, monitor and validate each transaction, audio and video transfer and merchandise purchase.

Rule #1: Supplier system identifies best match between corporation and individual based on usage.

Rule #2: Information is kept anonymous.

Rule #3: Advertisements have consensual value.

Rule #4: Software must be able to gather feedback of the individual and store it in the form of a profile.

Rule #5: Personalized advertisement

Rule #6: Identify, validate and verify a P2P.

Rule #7: Information Portal and Genesis Engine Supercomputer collaborate by creating Vector CDR billing entity for each detected transaction.

Virtual Maestro is an Artificial Intelligence TQM tool that continuously requests end user feedback or interest of music and audio video digital files.

Virtual Maestro will also make surveys of concerts and of certain products and services to better improve the quality of the content of the supplier system.

Virtual Maestro will give a ticket for each answer the end user make. At a specific moment in time the supplier will award free concert tickets local to the zip code, travel, or prizes.

Encryption The system encrypts messages that are sent via forward and rearward chaining and not the electronic files it licenses. Since, the system has Phoenix countermeasures content doesn't require this added complexity, notwithstanding certain files can be shown as non-licensed previews and would have to be encrypted decrypted and later destroyed by Crusader Technology once the time limit of usage count expires.

A method commercially known as Crusader Technology to firewall each P2P interaction of each end user. Crusader Technology node can work collectively to help blockade site and end users that use ghosting technologies to perform illicit activities.

A method commercially known as Phoenix Countermeasures blockades unlicensed downloads/uploads. A method commercially known as Informational Portal updates all end users profiles and interactions. The Genesis Engine Drones also monitor and control Crusader Technology clients to interact with the system and insure that each end user's software is working properly by using encrypted registration algorithms, self diagnostics and validating specific hardware information obtained at registration or account update time Incorporated by reference Related Applications (Ser. No. 12/778,228 or U.S. Pat. No. 8,239,229) "Parallel computer network and method for real time financial resource management, inventory control, and online purchasing U.S. Pat. No. 8,239,229 claim 1. "each cluster artificial intelligence storing 'the price' summary reports and pronounced 'the price' and thus the term Z_PRICE, by using X days dimensions X_FOB calculations and Y hour dimension Y_CDIF calculations based on said inventory control of "in-hand" and domestic rush FOB, and also purchasing forecasted inventories lots based on demand, economies of scale, historical trends and storage capacities;" and wherein upon normalizing the X_FOB and Y_CDIF data the system can use available inventory, shipping and handling to find a Z_PRICE for its end users.

"2. The computerized system as recited in claim 1, wherein each cluster for each relevant and particular transaction concurrently plot the optimal shipping trajectory provides the lowest billing rate available, wherein the purchase order contains pricing data enabling billing to commence the moment the financial resources are made available and is initiated and continued in real time as the transaction progresses."

"3. The computerized system as recited in claim 1, wherein each cluster allows each node to convert each message interacting with the system into a *lingua* franca, with vector trajectory information and ownership, to provide the flexibility to operate in conjunction with antiquated financial institution and supplier technologies."

"4. The computerized system as recited in claim 1, wherein the simulation network searches for the best FOB prices from one of the supplier system distribution warehouses in such a manner that a customer can request out-of-stock merchandise to be made available quicker than traditional land transportation by paying air express."

"7. The computerized system as recited in claim 1, wherein the system allows each node to have the best price, quantity, and availability of all the participating warehouses, suppliers, wholesalers, and retailers by incorporating an intelligent inventory delivery algorithm.

12. The computerized system as recited in claim 7, wherein the system allows each node to have the best price, quantity, and availability of all the participating warehouses, suppliers, wholesalers, and retailers by incorporating an intelligent inventory delivery algorithm.

19. The computerized system as recited in claim 12, wherein the system facilitates a partial satisfaction of a whole purchase order by customers and multiple suppliers collectively."

Related Applications (Ser. No. 11/223,226) "Method and Apparatus for Distribution of Real Time Audio and Video Over the Internet"

Significantly, the system of the present invention incorporates a distinct architecture, hereinafter referred to as the "Genesis Engine Architecture," a term coined by the present inventor. The Genesis Engine system is comprised of a parallel-distributed cluster supercomputer, preferably absent a central processor, which performs Real Time Billing, Data Mining and Traffic Management. More particularly, the architecture consists of the following four basic tier groups: (1) Command Centre and Information Portal; (2) Media Prophet; (3) Genesis Engine Drones; and (4) IP Virtual Reality MMOPRPG Servers.

The Command Centre is the summit tier group and functions as an Intelligent Data Warehouse. It acts as the brain of the supplier system, processing the information of the environment into a *lingua* franca and then, based on defined business rules, sets forth criteria, resource allocation and task priorities, so that subsystems can work at maximum effectiveness and efficiency as a direct result of having a clear understanding of the environment. Upon receiving a final Billing Entity, the Command Centre distributes credits, funds, licensing and royalties, to the appropriate parties.

The Information Portal is an Intelligent Data Warehouse that keeps track of all the end users activities, network faults, integrity and executed transactions, and organizations resources to identify the characteristics and qualities that satisfy consumers at large. The Information Portal is an independent system of nodes that are integrated into, and cooperate with, the Command Centre. After confirming receipt of Billing Entity Information, via forward chaining, from a Genesis Engine Drone, end users/owners of the Data Warehouse can update value advertisements and revalorize the opportunity cost of specific profiles. The system must promote sales, while attempting to allow the public to have free audio and video music. Accordingly, the system must limit the number of advertisements for credits that end users can receive, by utilizing algorithms that determine the value of a plurality of discrete advertisement real opportunity costs. The watering down of media value is a necessary component to remove the central tendencies and inefficiencies of mass-media type advertisements. For instance, the value of the first and single advertisement has a premium over the tenth advertisement for the same product during any 24-hour period.

The Media Prophet is the middle tier group and an Intelligent Data Warehouse that is distributed amongst the territorial boundaries of local, state and national geographical areas. It mimics, and is programmed to find and match, the most Valorized Optimal Advertisement from multiple competing corporate sponsors attempting to get the attention of the same specific individual. The system can be filtered and monitored at the Zip Code, NPA, LATA, Region, National, Continental or Global level, based upon known individual demographics and X, Y, Z GIS coordinates. Significantly, this enables corporations to specify distinct areas of coverage, or billing the exact territorial franchise store by ANI range, IP Address or Zip Code. Based upon the end user's willingness to provide information, the system negotiates the best value, and then verifies that the individual has consented and has provided the up-to-date credits for displaying and rendering of the advertisement they want to view. The Supplier System takes into account uniqueness, demographics, and frequency or usage of advertisement, within a monthly and yearly period. For example, age is a key component of the decision making of the Media Prophet, since alcohol or tobacco products cannot be sold to minors. The system must also determine an exact commercial, based upon the end user's location and the laws governing the display and rendering of the advertisement.

The Genesis Engine Drones make up the lower tier group, and function as an Intelligent Component programmed to remove redundancy and perform the match/merge correlation of billing entities at the incipiency of their detection. Telecommunication nodes monitor the SS7 packets that the network equipment performs for the system of the present invention, and a partial weighted value data algorithm is used due to the vast traffic and complexity of the Internet. Each activity that the system performs creates a Billing Entity that has Vector CDR, which is required to have knowledge of ownership within the managerial hierarchy as well as the actual location of the end user.

The system incorporates Crusader Technology, a term coined by the present inventor, defining computer software comprised of a hybrid firewall system which filters out unlicensed P2P transactions, blocks potentially pirated downloads, and interacts with a supplier system to offer a consumer the best quality, product and service, along with a comprehensive array of available shipping methods. By communicating, controlling, displaying, encrypting, managing, rendering, transferring, validating and verifying, interaction with the supplier system, Crusader Technology is able to customize, update and profile the end user by utilizing an Artificial Intelligence Point of Sale Application referred to as virtual "Customer Service Representative (CSR)." Virtual CSR functions to help identify the product best matching the end user's needs. Active and Virtual CSR will also reserve MMPORPG resources in order to group several end users to create a virtual concert hall. They will also deliver via Crusader Technology all upcoming activities, concerts, and the latest statistical information of a band.

The Active CSR consists of individuals that work for the Casino Resort organization and who are used to inspect, validate and verify the identity of a given end user. In this manner, the system is able to utilize a multitude of methods to service a particular customer, using state-of-the-art personalized presence by means of audio and video feeds match of sample digital samples, software security encryption, and protective human inputs. The Active CSR can assign betting limits in accordance with a particular gaming establishment's management guidelines, effect room reservations for accommodations, and offer package deals. Some Active CSR's are law enforcement agents that must manually perform security permissions to distinct areas of the Casino Resorts, particularly where minor are not permitted and where licensing mandates compliance of the law.

The Virtual CSR consists of an interactive Artificial Intelligence, which is part of the Massively Multiple Online Player Real Player Game (MMOPRPG), 3-D virtual environment that has been trained to perform interactive Point of Sale (POS) functions, and to help facilitate the end users' to access to the goods and services provided by the supplier system of the present invention. The Virtual CSR permits individuals to change servers that belong to the MMPORPG Virtual Reality Environment.

Client Based Casino Software: technology level 1 through means of a software, the end user interacts with a with a Casino server that allows the end user to interact with a Casino virtual session. This Client Based Casino Software allows the online players to gamble via a graphical environment that is responsible for the lion share of the processing power to perform each of the end user's activities. The server objective will validate and verify the end user activities, lines of credit, and each user's personal profile.

Server Based Casino Software: technology level 2 consists of a client-server paradigm where the client software is a means to display gaming functionality. The calculations and determination of winner can optionally occur, for security reasons, through another parallel working server protected by a firewall that generates the encrypted winning numbers. The server is responsible of synchronizing all of the client software end users and replying the results of winning numbers. This method protects the Casino from fraud by the end user, and chances of success are based on the unregulated software odds.

MMOPRPG Based Casino Software: technology level 3 is a large scale expansion of the Server Based Casino Software by allowing a plurality of concurrent servers to deliver a MMOPRPG (Massively Multiple Online Player Real Player Game), 3-D virtual environment. This enables thousands of end users to participate simultaneously with up-to-scale virtual buildings. The advantage of this method is that it allows end users to interact amongst themselves, while preserving them as a fictitious character and preserving their anonymity. Another benefit of this system is that at login each end user is validated to use the system, and it has the latest files and resources to use the program.

The data warehouse of merchandise, digitized music and video works, is created and placed on a physical data storage medium, such as a compact disk, in a transferable computer file on the Web, or in a physical Casino facility. Once the end user interaction software is installed, any file-sharing program will be able to bill, monitor and validate, every action gambling transaction, audio and video file transfer, and merchandise purchase.

The method preferably includes the additional steps of encrypting financial transactions, and performing licensed P2P transfers of audio/video works.

What is claimed is:

1. A method performed on a computing network comprising a set of computers each having a processor and a memory incorporating an artificial intelligence based system software which imparts artificial intelligence methods to system hardware, the computing network communicatively coupled to a plurality of customer, retailer, supplier and wholesaler online transaction supplier systems, and a warehouse for facilitating a logistical distribution of door-to-door goods, and services to a customer, using a chosen shipping method, wherein each end user interacts with the computing network via a software application on a smart device, the method comprising:

(A) instantiating, on the smart device, a secure partition, encrypted registration algorithm, Peer To Peer (P2P) firewall interaction with the computing network, upon a computer in the set of computers identifying, validating and verifying a customer password, Global Positioning System (GPS) location, and specific hardware information obtained at registration of the customer with the computing network;

(B) processing, by the computing network, both encrypting and decrypting means to authorize a purchase order for the customer via the secure partition P2P firewall interaction;

(C) approving or denying the purchase order, by the computing network, wherein the approving or denying includes managing and controlling available inventory from the online retailer transaction supplier system, upon receiving approval from a financial institution for the purchase order;

(D) storing the purchase order, by the computing network, in a personal profile of the customer; and (E) presenting, by the computing network, on the smart device via the secure partition P2P firewall interaction, a transaction including the purchase order using a user interface.

2. The method of claim 1, wherein the processing and presenting are completed by a secure application within the secure partition of the smart device.

3. The method of claim 1, wherein the decrypting means are received via the computing network in communications with the computer network over a secure P2P firewall interaction between the computer network and the computing network at the online retailer transaction supplier system based on a request for the purchase order to display on the smart device.

4. The method of claim 1, wherein presenting the transaction and purchase order includes blocking illegal or fraudulent activities to execute outside of the secure partition on the smart device.

5. The method of claim 1, further comprising accessing an encrypted registration algorithm product of artificial intelligence software application executing within the secure partition of the secure device blocking illegal or fraudulent activities that execute outside of the secure partition of the smart device.

6. The method of claim 1, further comprising accessing an encrypted registration algorithm product of the artificial intelligence based system software executing instructions to interact with the computing system service requesting to facilitate the logistical distribution of door-to-door goods and services to a customer using a chosen shipping method, wherein the logistical distribution of door-to-door goods and services to a customer using a chosen shipping method is identified as Z_Price.

7. The method of claim 1, wherein the artificial intelligence based system software residing in the memory of the smart device interface executes a set of instructions to search the computing network and obtains a second secure communication to perform personalized searches of products using a Z_Price method;

the artificial intelligence software presenting a series of selectable command instructions to the customer, wherein the steps of presenting the selectable command instructions are enabled by the smart device interface and request a purchase order-based end user's finalized decision;

approving or denying, by the computer network managing and controlling available inventory from the online retailer transaction supplier system, upon receiving approval from a financial institution; and storing the series of selectable command instructions to the customer and decisions to derive the purchase order on the personal profile of the customer.

8. The method of claim 7, wherein the artificial intelligence based system software, residing in the memory of the smart device interface, executes a set of instructions to interact with a computing system service requesting for the Z_Price method uses an X_FOB method when the end user wants a set of goods from the purchase order to arrive as soon as possible, via water and land transport, and then delivered door-to-door.

9. The method of claim 7, wherein the artificial intelligence based system software, residing in the memory of the smart device interface executes a set of instructions to interact with computing system service requesting the Z_Price method uses a Y_CDIF method, when the end user wants a set of goods from the purchase order to arrive via air transport, and then be delivered door-to-door.

10. The method of claim 7, wherein the artificial intelligence based system software residing in the memory of the smart device interface executes a set of instructions to interact with the computing network requesting the Z_Price method uses a GOLD method when the end user wants a set of goods from a set of goods from the purchase order to arrive immediately.

11. The method of claim 7, wherein the artificial intelligence based system software residing in the memory of the smart device interface executes a set of instructions to interact with the computing network requesting the Z_Price method use the online retailer transaction supplier system, when the customer wants to download or purchase intellectual property audio, digital and video works for free or at a discounted price.

12. The method of claim 11 further comprising:

the artificial intelligence based system software residing in the memory of the smart device interface executing a set of instructions to obtain a second secure communication from a server at a second online retailer;

processing, by the computer network encrypting and decrypting means to authorize a purchase order at the online retailer transaction supplier system via a second secure partition P2P firewall interaction;

storing the purchase order on the personal profile of the customer; and presenting, by the smart device via the second secure P2P firewall interaction, the transaction using a user interface.

13. The method of claim 7, wherein the method is completed by at least one application executing in the secure partition of the smart device.

14. The method of claim 7, wherein the decryption means are received by the computing network at the online retailer transaction supplier system over a trusted P2P communication link from the computing system associated with the smart device.

15. A massive volume Input/Output (I/O) supercomputer system, the system comprising:

one or more computers, each computer in the one or more computers having a processor and a memory incorporating an artificial intelligence based system software, the massive volume I/O supercomputer system communicatively coupled to a plurality of online retailer transaction supplier systems, and at least one warehouse for facilitating logistical distribution of door-to-door goods and services to a customer using a chosen shipping method, (hereafter referred to as a Z_Price purchase order), upon an end user's smart device initiating a shopping cart secure partition encrypted registration Peer To Peer (P2P) firewall interaction with the massive volume I/O supercomputer system, the smart device performing instructions comprising:

(A) initiating a Z_Price purchase order with an online retailer transaction supplier system upon one computer of the one or more computers executing a set of instructions to identify, validate and verify the end user;

(B) interactively updating, and optimizing cost based on a chosen shipping method for the Z_Price purchase order, upon one computer of the massive volume I/O supercomputer system executing a set of instructions to determine whether a requested inventory is available from the online retailer;

(C) receiving approval for a Z_Price purchase order with an online retailer upon one computer of the massive volume I/O supercomputer system executing a set of instructions including encryption and decrypting means to request an approval from a financial institution to purchase the goods;

(D) storing the Z_Price purchase order with an online retailer upon one computer of the massive volume I/O supercomputer system executing a set of instructions to approve the Z_Price purchase order and updating a personal profile of the end user with said purchase; and (E) presenting the approved Z_Price purchase order on a user interface.

16. The system of claim 15, wherein the smart device further comprises at least one processor having a secure memory portion to instantiate an artificial intelligence application stored in the secure memory portion in the secure partition, that upon execution of the at least one processor, presenting, using the user interface the purchase order to the end user.

17. The system of claim 16, further comprising a near-field communication (NFC) transceiver within the secure partition of the smart device instantiating the artificial intelligence application using the user interface to present the purchase order to the end user, and the secure device blocking illegal or fraudulent activities that execute outside of the secure partition of the smart device from accessing the NFC transceiver.

18. The system of claim 16, wherein the decryption means are received by the massive volume 1/O supercomputer system at the online retailer transaction supplier system over a trusted P2P communication link upon one computer of the massive volume 1/O supercomputer system authorizing said trusted P2P communication link associated with the smart device.

19. The system of claim 16, wherein one computer of the massive volume I/O supercomputer system authorizes the encrypted means is received via a network in communication with the smart device.

20. The system of claim 19, wherein one computer of the massive volume I/O supercomputer system authorizes the encrypted and decrypted means are communicated over a secure connection between the smart device and the online retailer transaction supplier system.

* * * * *